US011851036B2

(12) United States Patent
Archer et al.

(10) Patent No.: US 11,851,036 B2
(45) Date of Patent: Dec. 26, 2023

(54) INTEGRATED GROUND PAD

(71) Applicant: Oshkosh Corporation, Oshkosh, WI (US)

(72) Inventors: David W. Archer, Hortonville, WI (US); Todd Burkard, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 610 days.

(21) Appl. No.: 16/840,860

(22) Filed: Apr. 6, 2020

(65) Prior Publication Data

US 2020/0231131 A1 Jul. 23, 2020

Related U.S. Application Data

(63) Continuation of application No. 16/389,029, filed on Apr. 19, 2019, now Pat. No. 10,611,347.

(60) Provisional application No. 62/829,922, filed on Apr. 5, 2019, provisional application No. 62/661,335, filed on Apr. 23, 2018.

(51) Int. Cl.
*B60S 9/12* (2006.01)
*E06C 5/38* (2006.01)
*B60S 9/10* (2006.01)
*B60S 9/00* (2006.01)
*B60S 9/02* (2006.01)
*E06C 5/04* (2006.01)
*B60G 3/24* (2006.01)
*B60G 7/00* (2006.01)

(52) U.S. Cl.
CPC . *B60S 9/12* (2013.01); *B60S 9/00* (2013.01); *B60S 9/02* (2013.01); *B60S 9/10* (2013.01); *E06C 5/38* (2013.01); *B60G 3/24* (2013.01); *B60G 7/00* (2013.01); *B60G 2200/422* (2013.01); *B60G 2202/135* (2013.01); *E06C 5/04* (2013.01)

(58) Field of Classification Search
CPC . B66C 23/78; B66C 23/80; B60S 9/00; B60S 9/12; B60S 9/02; B60S 9/10; E06C 5/38
See application file for complete search history.

(56) References Cited

U.S. PATENT DOCUMENTS

| 1,272,110 | A | * | 7/1918 | Robinson | E02F 9/062 |
| | | | | | 212/302 |
| 2,885,181 | A | * | 5/1959 | McCully | B60S 9/08 |
| | | | | | 248/188.4 |
| 3,021,016 | A | | 12/1959 | Noll et al. | |
| 3,024,870 | A | | 3/1962 | Kramcsak, Jr. et al. | |

(Continued)

*Primary Examiner* — Colleen M Chavchavadze
(74) *Attorney, Agent, or Firm* — Foley & Lardner LLP

(57) ABSTRACT

A stabilizer for a vehicle includes an actuator assembly configured to be coupled to a chassis of the vehicle and a ground pad coupled to the actuator assembly. The actuator assembly is selectively repositionable between an extended position and a retracted position to reconfigure the stabilizer between a lifting configuration and a storage configuration. The ground pad has a bottom surface configured to engage a support surface below the chassis. When the stabilizer is in the lifting configuration, the bottom surface of the ground pad engages the support surface. When the stabilizer is in the storage configuration, the ground pad is not in contact with the support surface.

12 Claims, 44 Drawing Sheets

(56) References Cited

U.S. PATENT DOCUMENTS

| | | | |
|---|---|---|---|
| 3,175,698 A * | 3/1965 | Dassler | E02F 9/085 |
| | | | 212/304 |
| 3,362,683 A * | 1/1968 | Hansen | B60S 9/12 |
| | | | 254/423 |
| 3,589,748 A | 6/1971 | Miller | |
| 3,642,242 A | 2/1972 | Danekas | |
| 3,677,417 A | 7/1972 | Keller et al. | |
| 3,754,777 A | 8/1973 | Riggs et al. | |
| 3,760,906 A | 9/1973 | McGee | |
| 3,874,515 A | 4/1975 | Leigh | |
| 3,981,514 A * | 9/1976 | Visser | B66C 23/80 |
| | | | 280/765.1 |
| 4,014,519 A | 3/1977 | Leigh | |
| 4,118,054 A * | 10/1978 | Vigerie | B66C 23/80 |
| | | | 280/765.1 |
| 4,266,809 A | 5/1981 | Wuerflein | |
| 4,383,617 A | 5/1983 | Hychalk | |
| 4,441,693 A * | 4/1984 | Silver | B66F 13/00 |
| | | | 254/420 |
| 4,546,996 A | 10/1985 | Hanson | |
| 4,609,204 A * | 9/1986 | Nekola | B66C 23/80 |
| | | | 280/766.1 |
| 4,834,215 A | 5/1989 | Smeal | |
| 4,941,546 A | 7/1990 | Nist et al. | |
| 4,949,808 A | 8/1990 | Garnett | |
| 5,538,274 A | 7/1996 | Schmitz et al. | |
| 5,820,150 A | 10/1998 | Archer et al. | |
| 5,897,123 A | 4/1999 | Cherney et al. | |
| 6,092,975 A | 7/2000 | Cannon et al. | |
| 6,105,940 A | 8/2000 | Charette | |
| 6,561,718 B1 | 5/2003 | Archer et al. | |
| 6,726,236 B2 | 4/2004 | Cofer | |
| 6,840,540 B2 * | 1/2005 | Fugel | B66C 23/80 |
| | | | 280/763.1 |
| 6,860,332 B1 | 3/2005 | Archer et al. | |
| 6,883,815 B2 | 4/2005 | Archer | |
| 7,006,902 B2 | 2/2006 | Archer et al. | |
| 7,055,880 B2 | 6/2006 | Archer | |
| 7,387,348 B2 | 6/2008 | Archer et al. | |
| 7,389,826 B2 | 6/2008 | Linsmeier et al. | |
| 7,395,993 B2 | 7/2008 | Riedl | |
| 8,201,656 B2 | 6/2012 | Archer et al. | |
| 8,839,902 B1 | 9/2014 | Archer et al. | |
| 9,297,171 B1 | 3/2016 | Ligman | |
| 9,404,272 B1 | 8/2016 | Ligman | |
| 9,492,695 B2 | 11/2016 | Betz et al. | |
| 9,504,863 B2 | 11/2016 | Moore | |
| 9,550,475 B1 | 1/2017 | Walker et al. | |
| 9,580,961 B2 | 2/2017 | Kraemer | |
| 9,580,962 B2 | 2/2017 | Betz et al. | |
| 9,597,536 B1 | 3/2017 | Moore | |
| 9,776,846 B2 | 10/2017 | Ditty | |
| 9,790,171 B2 | 10/2017 | Guilloneau et al. | |
| 9,791,071 B2 | 10/2017 | Ditty et al. | |
| 9,814,915 B2 | 11/2017 | Moore | |
| 9,827,953 B2 | 11/2017 | Kraemer | |
| 10,144,389 B2 | 12/2018 | Archer et al. | |
| 10,174,868 B2 | 1/2019 | Ditty et al. | |
| 10,336,596 B2 | 7/2019 | Puszkiewicz et al. | |
| 10,357,995 B2 | 7/2019 | Palmer et al. | |
| 10,370,003 B2 | 8/2019 | Linsmeier et al. | |
| 2004/0046378 A1 | 3/2004 | Lagsdin | |
| 2009/137006 A1 | 5/2009 | Thorson | |
| 2013/0328295 A1 | 12/2013 | Borghi | |
| 2016/0106083 A1 | 4/2016 | Niitsuma et al. | |
| 2016/0244030 A1 | 8/2016 | Lehman et al. | |
| 2016/0340156 A1 | 11/2016 | Ost et al. | |
| 2017/0327354 A1 * | 11/2017 | Leicester | B66C 23/78 |
| 2018/0215354 A1 | 8/2018 | Linsmeier et al. | |
| 2018/0215597 A1 | 8/2018 | Linsmeier et al. | |
| 2018/0297597 A1 | 10/2018 | Linsmeier et al. | |
| 2019/0106083 A1 | 4/2019 | Archer et al. | |
| 2019/0137006 A1 | 5/2019 | Ditty et al. | |

* cited by examiner

INTEGRATED GROUND PAD

CROSS-REFERENCE TO RELATED PATENT APPLICATIONS

This application is a continuation of U.S. patent application Ser. No. 16/389,029, filed Apr. 19, 2019, which (a) claims the benefit of U.S. Provisional Patent Application No. 62/661,335, filed Apr. 23, 2018, and U.S. Provisional Patent Application No. 62/829,922, filed Apr. 5, 2019, and (b) is related to (i) U.S. patent application Ser. No. 16/389,630, filed Apr. 19, 2019, which claims the benefit of U.S. Provisional Patent Application No. 62/661,382, filed Apr. 23, 2018, (ii) U.S. patent application Ser. No. 16/389,653, filed Apr. 19, 2019, which claims the benefit of U.S. Provisional Patent Application No. 62/661,420, filed Apr. 23, 2018, (iii) U.S. patent application Ser. No. 16/389,570, filed Apr. 19, 2019, which claims the benefit of U.S. Provisional Patent Application No. 62/661,384, filed Apr. 23, 2018, (iv) U.S. patent application Ser. No. 16/389,600, filed Apr. 19, 2019, which claims the benefit of U.S. Provisional Patent Application No. 62/661,414, filed Apr. 23, 2018, (v) U.S. patent application Ser. No. 16/389,143, filed Apr. 19, 2019, which claims the benefit of U.S. Provisional Patent Application No. 62/661,419, filed Apr. 23, 2018, (vi) U.S. patent application Ser. No. 16/389,176, filed Apr. 19, 2019, which claims the benefit of U.S. Provisional Patent Application No. 62/661,426, filed Apr. 23, 2018, and (vii) U.S. patent application Ser. No. 16/389,072, filed Apr. 19, 2019, which claims the benefit of U.S. Provisional Patent Application No. 62/661,330, filed Apr. 23, 2018, all of which are incorporated herein by reference in their entireties.

BACKGROUND

Many types of vehicles, such as fire apparatuses, cranes, telehandlers, and excavators, include a manipulator that can be actuated or otherwise arranged to extend outward from the base of the vehicle to accomplish various tasks. Such manipulators often carry a load at or near their distal end, such as construction equipment, building materials, or one or more operators or emergency personnel. The manipulator is supported by the base of the vehicle, forming a cantilevered loading arrangement. Accordingly, when the manipulator extends laterally or longitudinally outward from the vehicle, there is potential for the center of gravity of the vehicle to shift outside of where the wheels or other tractive elements contact the ground, causing the vehicle to become unstable. This limits the amount of weight that the manipulator can support and the distance that the manipulator can extend.

To increase the capacity of the manipulator to carry heavier loads out greater distances from the base of the vehicle, many vehicles include outriggers. Outriggers are supports that extend outward from the base of the vehicle and downward to engage the ground. Typically, the outriggers will lift the vehicle such that the outriggers support a large portion of the vehicle weight. Outriggers may include a first actuator that moves a foot laterally outward and a second actuator that moves a foot vertically downward. Other types of outriggers include a single actuator that moves the foot laterally outward and vertically downward simultaneously. Vehicles commonly will include four outriggers, two extending from each lateral side of the vehicle, such that the outriggers can lift the entire base of the vehicle off of the ground and level the vehicle.

To facilitate storage of the outriggers within the base of the vehicle when not in use, outriggers typically include relatively small feet. Due to the large weight that each foot supports when in use, the feet would exert extremely large pressures on the ground if the feet were to contact the ground directly. This would have the potential to damage the ground and cause the feet to sink into the ground, reducing the stability of the vehicle.

To counteract this, vehicles utilize ground pads, which are separate components from the outriggers. Prior to extending the feet of the outriggers downwards, the ground pads are placed beneath the feet such that the ground pads extend directly between the feet and the ground. The ground pads have a considerably larger surface area than the feet such that the ground pad spreads the weight of the vehicle out over a large area. This reduces the pressure imparted on the ground by the outriggers, reducing the potential for damaging the ground or for the outriggers to sink into the ground. Because the ground pads are separate from the outriggers, the ground pads can be stored in a separate location that accommodates their large size. Being separated from the outriggers also facilitates the ground pads being placed around obstacles, such as curbs, parked vehicles, rocks, or tree stumps.

However, the ground pads must be manually removed from their storage location and placed beneath the outriggers by an operator prior to using the manipulator of the vehicle. The ground pads can be bulky and heavy, and it can be difficult to accurately align the ground pad with the foot of the outrigger until the foot is extended. Accordingly, the process of setting up the ground pads can be quite time consuming. In emergency situations, such as when using a fire apparatus equipped with an aerial assembly to evacuate a burning building, reducing the setup time of a vehicle is important. Further, the challenges associated with traditional ground pad configurations may reduce the likelihood of operators actually deploying and/or using the ground pads themselves. Such lack of use may present a lack of actual compliance with regulations governing ground pad use in the field.

SUMMARY

One embodiment relates to a stabilizer for a vehicle including an actuator assembly configured to be coupled to a chassis of the vehicle and a ground pad coupled to the actuator assembly. The actuator assembly is selectively repositionable between an extended position and a retracted position to reconfigure the stabilizer between a lifting configuration and a storage configuration. The ground pad has a bottom surface configured to engage a support surface below the chassis. When the stabilizer is in the lifting configuration, the bottom surface of the ground pad engages the support surface. When the stabilizer is in the storage configuration, the ground pad is not in contact with the support surface.

Another embodiment relates to a vehicle including a chassis, a series of tractive assemblies coupled to the chassis, and a stabilizer. The stabilizer includes an actuator assembly coupled to the chassis and a ground pad coupled to the actuator assembly. The actuator assembly is selectively repositionable between an extended position and a retracted position to reconfigure the stabilizer between a lifting configuration and a storage configuration. The ground pad has a bottom surface configured to engage a support surface below the chassis. The ground pad is selectively rotatable relative to the chassis about a substantially vertical axis.

Still another embodiment relates to a retrofit kit for use with a stabilizer of a vehicle. The stabilizer includes an actuator assembly having a first member coupled to a chassis of the vehicle and a second member that is selectively repositionable relative to the first member along an axis of extension. The retrofit kit includes a ground pad configured to be coupled to the actuator assembly such that the ground pad is rotatable relative to the chassis about a substantially vertical axis and a first alignment device configured to be coupled to at least one of (a) the chassis or (b) the first member. The first alignment device is configured to engage at least one of (a) the ground pad or (b) a second alignment device coupled to the ground pad when the actuator assembly is retracted such that the first alignment device rotates the ground pad about the substantially vertical axis.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
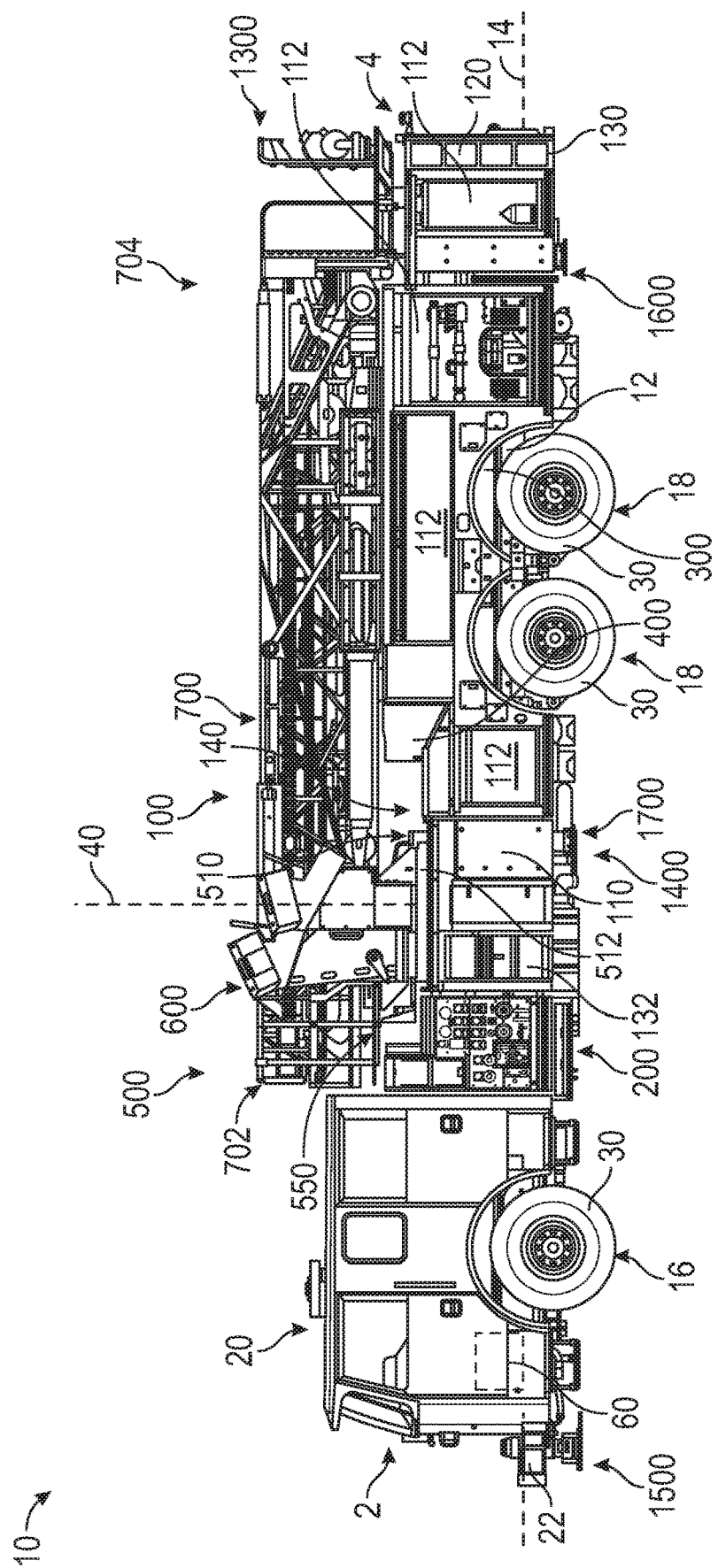
FIG. 1 is a left side view of a mid-mount fire apparatus, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes various components that improve performance relative to traditional systems. In one embodiment, the vehicle is a mid-mount quint configuration fire apparatus that includes a water tank, an aerial ladder, hose storage, ground ladder storage, and a water pump. The aerial ladder is coupled to the chassis between a front axle assembly and a rear axle assembly of the fire apparatus and rotatable about an axis. The water pump is positioned forward of the axis. The aerial ladder is extensible to provide a horizontal reach of at least 65 feet and a vertical reach of at least 70 feet. The aerial ladder may have a rated tip load of more than 250 pounds (e.g., 1,000 pounds, 1,250 pounds, etc.) when the aerial ladder is fully extended (e.g., without a basket coupled to a distal end thereof, etc.). The rear axle assembly may be a tandem rear axle having a gross axle weight rating of at least 36,000 pounds. The fire apparatus has an overall length (e.g., when viewed from the side, etc.) with (i) a first portion extending from the rear end of the body assembly to a middle of the rear axle and (ii) a second portion extending from the middle of the rear axle to the front end of the front cabin. The second portion is at least twice the length of first portion. The water tank may have a capacity of up to or more than 300 gallons.

Overall Vehicle

According to the exemplary embodiment shown in FIGS. 1-21, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. In yet other embodiments, the fire apparatus 10 is configured as a rear-mount, quint or non-quint, single rear axle or tandem rear axle, fire truck.

As shown in FIGS. 1-7, 10-13, 17, and 18, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly, shown as front cabin 20, coupled to and supported by the frame 12 and having a bumper, shown as front bumper 22; a prime mover, shown as engine 60, coupled to and supported by the frame 12; and a second assembly, shown as rear assembly 100, coupled to and supported by the frame 12.

As shown in FIGS. 1-7, 10, and 12, the front axle 16 and the rear axles 18 include tractive assemblies, shown as wheel and tire assemblies 30. As shown in FIGS. 1-4, the front cabin 20 is positioned forward of the rear assembly 100 (e.g., with respect to a forward direction of travel for the fire apparatus 10 along the longitudinal axis 14, etc.). According to an alternative embodiment, the cab assembly may be positioned behind the rear assembly 100 (e.g., with respect to a forward direction of travel for the fire apparatus 10 along the longitudinal axis 14, etc.). The cab assembly may be positioned behind the rear assembly 100 on, by way of example, a rear tiller fire apparatus. In some embodiments, the fire apparatus 10 is a ladder truck with a front portion that includes the front cabin 20 pivotally coupled to a rear portion that includes the rear assembly 100.

According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., the front axle 16, the rear axles 18, the wheel and tire assemblies 30, etc.). The final drive then propels or moves the fire apparatus 10. According to an exemplary embodiment, the engine 60 is a compression-ignition internal combustion engine that utilizes diesel fuel. In alternative embodiments, the engine 60 is another type of prime mover (e.g., a spark-ignition engine, a fuel cell, an electric motor, etc.) that is otherwise powered (e.g., with gasoline, compressed natural gas, propane, hydrogen, electricity, etc.).

As shown in FIGS. 1-7, 10-13, and 17-19, the rear assembly 100 includes a body assembly, shown as body 110, coupled to and supported by the frame 12; a fluid driver, shown as pump system 200, coupled to and supported by the frame 12; a chassis support member, shown as torque box 300, coupled to and supported by the frame 12; a fluid reservoir, shown as water tank 400, coupled to the body 110 and supported by the torque box 300 and/or the frame 12; and an aerial assembly, shown as aerial assembly 500, pivotally coupled to the torque box 300 and supported by the torque box 300 and/or the frame 12. In some embodiments, the rear assembly 100 does not include the water tank 400. In some embodiments, the rear assembly 100 additionally or alternatively includes an agent or foam tank (e.g., that receives and stores a fire suppressing agent, foam, etc.).

As shown in FIGS. 1, 2, and 10-12, the sides of the body 110 define a plurality of compartments, shown as storage compartments 112. The storage compartments 112 may receive and store miscellaneous items and gear used by emergency response personnel (e.g., helmets, axes, oxygen tanks, hoses, medical kits, etc.). As shown in FIGS. 5, 6, and 10-12, the rear end 4 of the body 110 defines a longitudinal storage compartment that extends along the longitudinal axis 14, shown as ground ladder compartment 114. The ground ladder compartment 114 may receive and store one or more ground ladders. As shown in FIGS. 3, 5, and 10-13, a top surface, shown as top platform 122, of the body 110 defines a cavity, shown as hose storage platform 116, and a channel, shown as hose chute 118, extending from the hose storage platform 116 to the rear end 4 of the body 110. The hose storage platform 116 may receive and store one or more hoses (e.g., up to 1000 feet of 5 inch diameter hose, etc.), which may be pulled from the hose storage platform 116 though the hose chute 118.

As shown in FIGS. 1-6 and 10-13, the rear end 4 of the body 110 has notched or clipped corners, shown as chamfered corners 120. In other embodiments, the rear end 4 of the body 110 does not have notched or clipped corners (e.g., the rear end 4 of the body 110 may have square corners, etc.). According to an exemplary embodiment, the chamfered corners 120 provide for increased turning clearance relative to fire apparatuses that have non-notched or non-clipped (e.g., square, etc.) corners. As shown in FIGS. 1-3, 5, 6, and 10-13, the rear assembly 100 includes a first selectively deployable ladder, shown as rear ladder 130, coupled to each of the chamfered corners 120 of the body 110. According to an exemplary embodiment, the rear ladders 130 are hingedly coupled to the chamfered corners 120 and repositionable between a stowed position (see, e.g., FIGS. 1-3, 5, 12, 13, etc.) and a deployed position (see, e.g., FIGS. 6, 10, 11, etc.). The rear ladders 130 may be selectively deployed such that a user may climb the rear ladder 130 to access the top platform 122 of the body 110 and/or one or more components of the aerial assembly 500 (e.g., a work basket, an implement, an aerial ladder assembly, the hose storage platform 116, etc.). In other embodiments, the body 110 has stairs in addition to or in place of the rear ladders 130.

As shown in FIGS. 1, 12, 17, and 18, the rear assembly 100 includes a second selectively deployable ladder, shown as side ladder 132, coupled to a side (e.g., a left side, a right side, a driver's side, a passenger's side, etc.) of the body 110. In some embodiments, the rear assembly 100 includes two side ladders 132, one coupled to each side of the body 110. According to an exemplary embodiment, the side ladder 132 is hingedly coupled to the body 110 and repositionable between a stowed position (see, e.g., FIGS. 1, 2, 17, 18, etc.) and a deployed position. The side ladder 132 may be selectively deployed such that a user may climb the side ladder 132 to access one or more components of the aerial assembly 500 (e.g., a work platform, an aerial ladder assembly, a control console, etc.).

As shown in FIGS. 1, 2, 12 and 13, the body 110 defines a recessed portion, shown as aerial assembly recess 140, positioned (i) rearward of the front cabin 20 and (ii) forward of the water tank 400 and/or the rear axles 18. The aerial assembly recess 140 defines an aperture, shown as pedestal opening 142, rearward of the pump system 200.

According to an exemplary embodiment the water tank 400 is coupled to the frame 12 with a superstructure (e.g., disposed along a top surface of the torque box 300, etc.). As shown in FIGS. 1, 2, 12, and 13, the water tank 400 is positioned below the aerial ladder assembly 700 and forward of the hose storage platform 116. As shown in FIGS. 1, 2, 12 and 13, the water tank 400 is positioned such that the water tank 400 defines a rear wall of the aerial assembly recess 140. In one embodiment, the water tank 400 stores up to 300 gallons of water. In another embodiment, the water tank 400 stores more than or less than 300 gallons of water (e.g., 100, 200, 250, 350, 400, 500, etc. gallons). In other embodiments, fire apparatus 10 additionally or alternatively includes a second reservoir that stores another firefighting agent (e.g., foam, etc.). In still other embodiments, the fire apparatus 10 does not include the water tank 400 (e.g., in a non-quint configuration, etc.).

As shown in FIGS. 1-3, 5-7, 10, 17, and 18, the aerial assembly 500 includes a turntable assembly, shown as turntable 510, pivotally coupled to the torque box 300; a platform, shown work platform 550, coupled to the turntable 510; a console, shown as control console 600, coupled to the turntable 510; a ladder assembly, shown as aerial ladder assembly 700, having a first end (e.g., a base end, a proximal end, a pivot end, etc.), shown as proximal end 702, pivotally coupled to the turntable 510, and an opposing second end (e.g., a free end, a distal end, a platform end, an implement end, etc.), shown as distal end 704; and an implement, shown as work basket 1300, coupled to the distal end 704.

Figure 12:
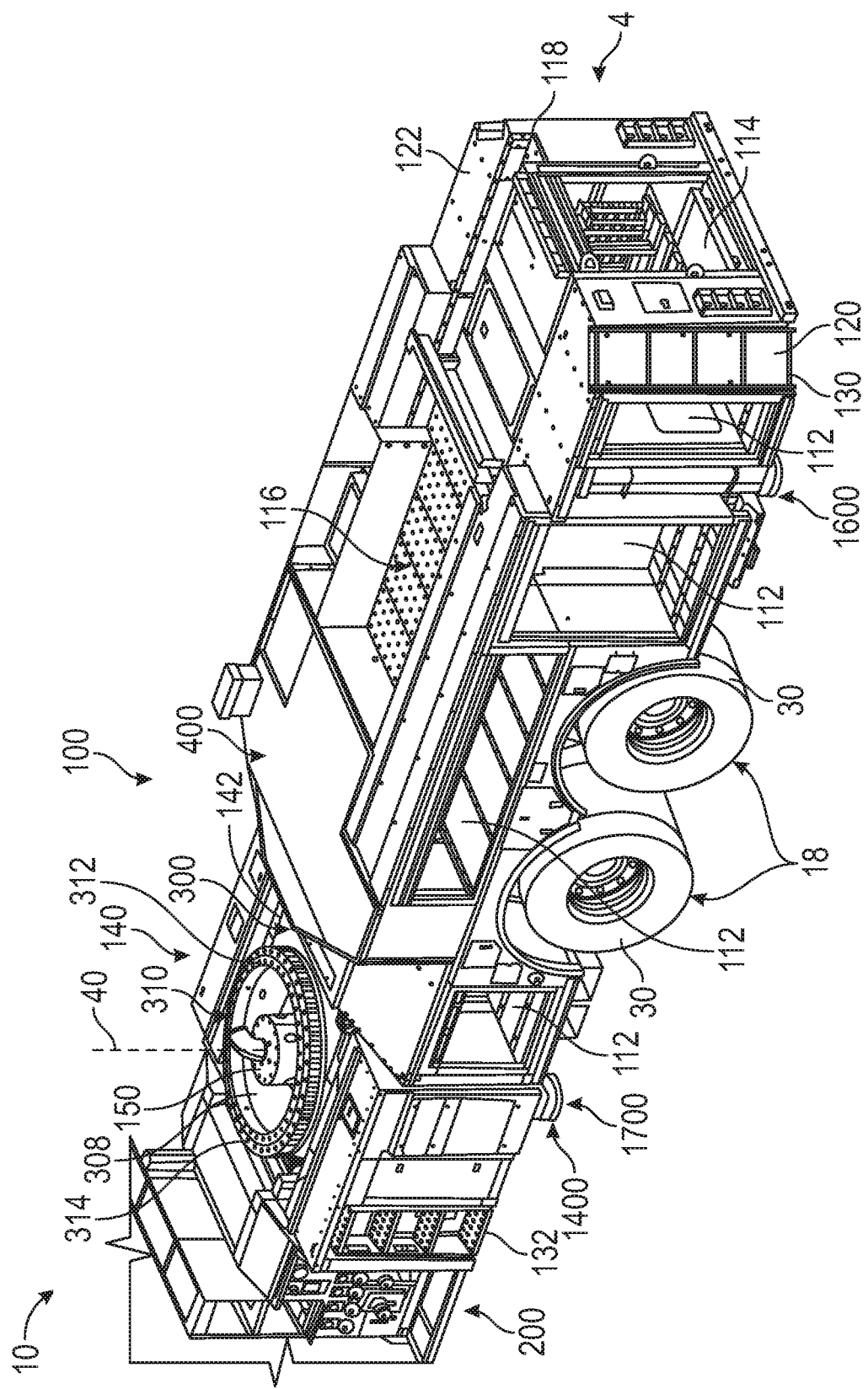
FIG. 12 is another rear perspective view of the rear assembly of FIG. 10 without a ladder assembly, according to an exemplary embodiment.
Figure 13:
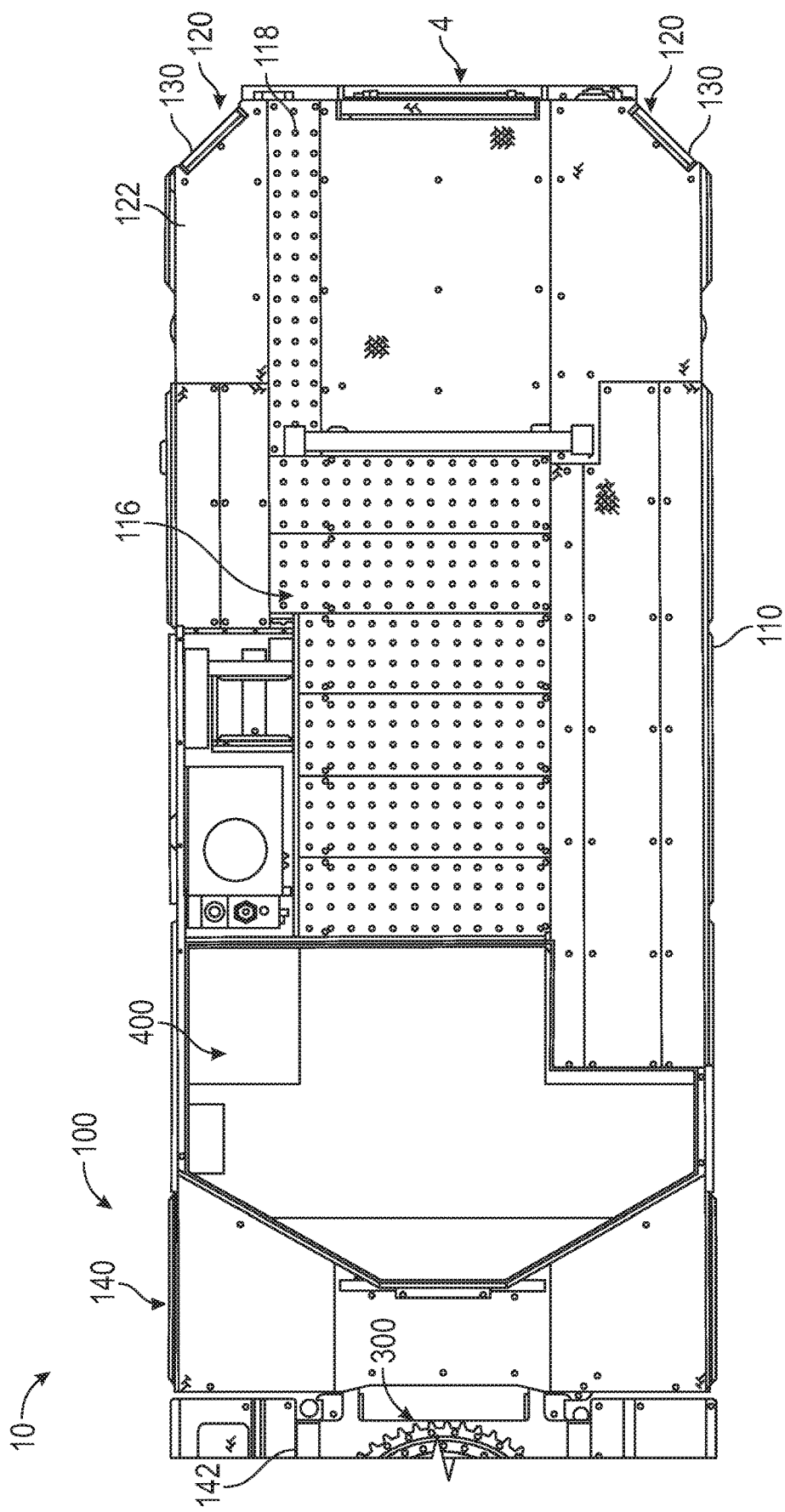
FIG. 13 is a top view of the rear assembly of FIG. 12, according to an exemplary embodiment.
Figure 14:
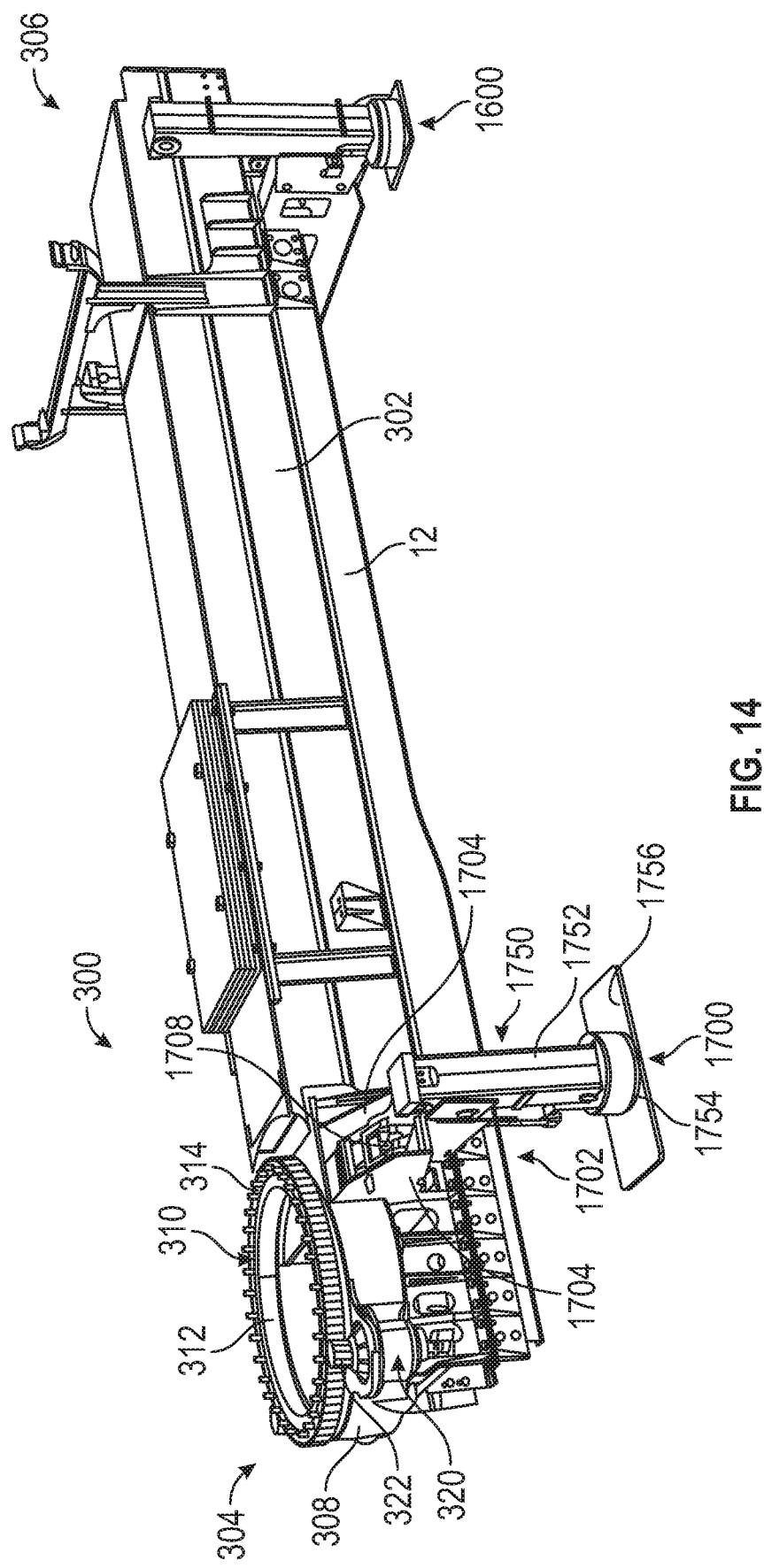
FIG. 14 is a perspective view of a torque box of the mid-mount fire apparatus of FIG. 1, according to an exemplary embodiment.
Figure 15:
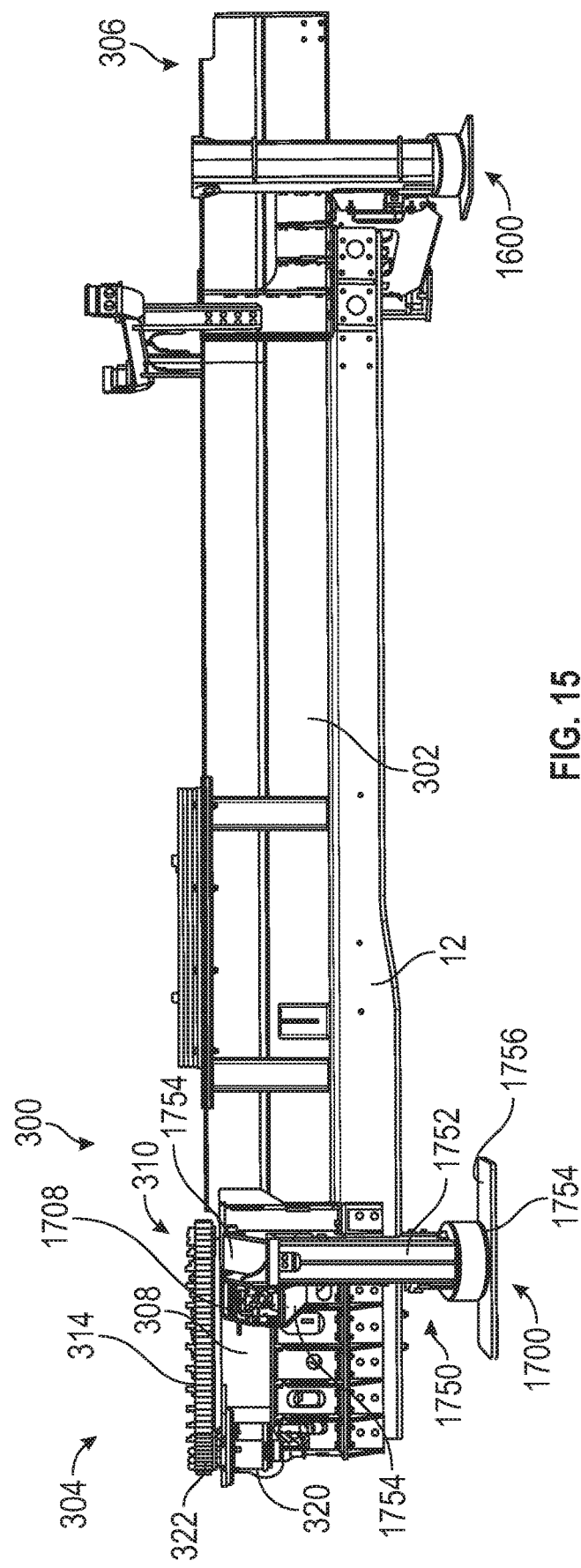
FIG. 15 is a side view of the torque box of FIG. 14, according to an exemplary embodiment.

As shown in FIGS. 1, 2, 4, 14, and 15, the torque box 300 is coupled to the frame 12. In one embodiment, the torque box 300 extends laterally the full width between the lateral outsides of the frame rails of the frame 12. As shown in FIGS. 14 and 15, the torque box 300 includes a body portion, shown as body 302, having a first end, shown as front end 304, and an opposing second end, shown as rear end 306. As shown in FIGS. 12, 14, and 15, the torque box 300 includes a support, shown as pedestal 308, coupled (e.g., attached, fixed, bolted, welded, etc.) to the front end 304 of the torque box 300. As shown in FIG. 12, the pedestal 308 extends through the pedestal opening 142 into the aerial assembly recess 140 such that the pedestal 308 is positioned (i) forward of the water tank 400 and the rear axles 18 and (ii) rearward of pump system 200, the front axle 16, and the front cabin 20.

Figure 2:
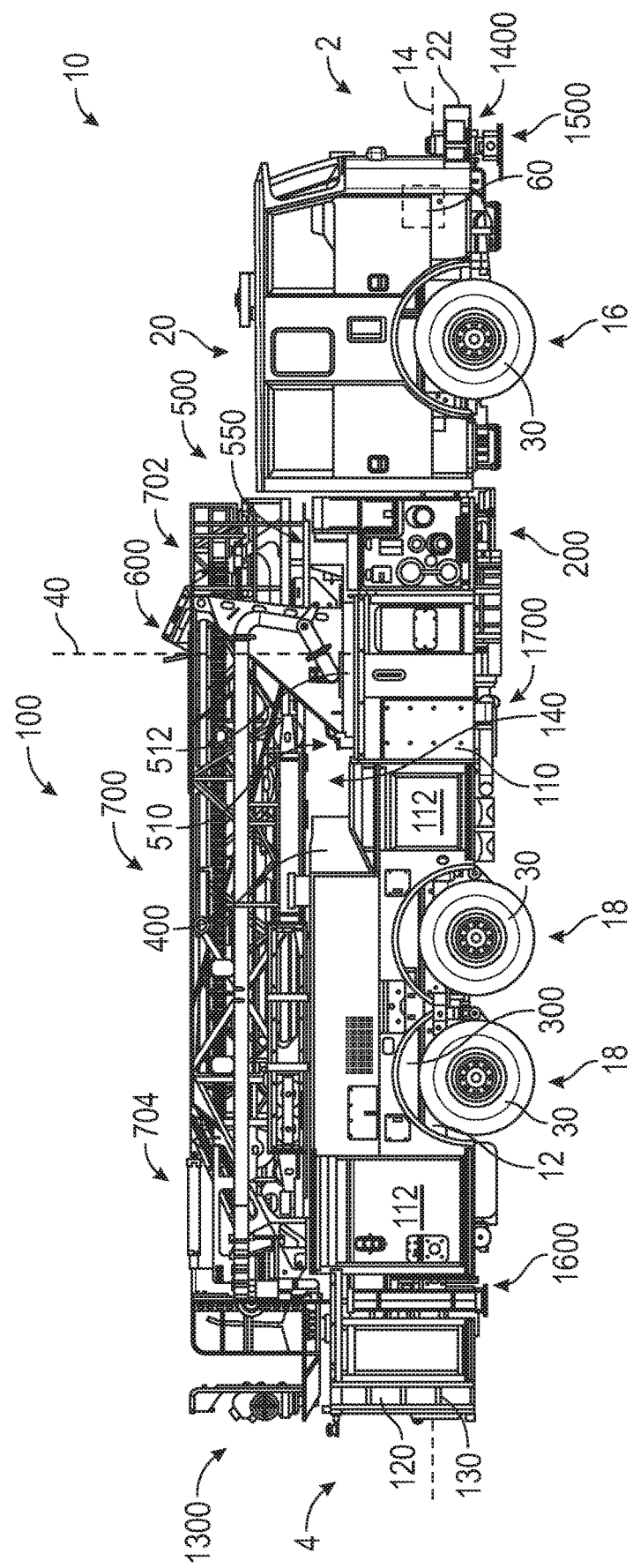
FIG. 2 is a right side view of the mid-mount fire apparatus of FIG. 1, according to an exemplary embodiment

According to the exemplary embodiment shown in FIGS. 1, 2, and 12, the aerial assembly 500 (e.g., the turntable 510, the work platform 550, the control console 600, the aerial ladder assembly 700, the work basket 1300, etc.) is rotatably coupled to the pedestal 308 such that the aerial assembly 500 is selectively repositionable into a plurality of operating orientations about a vertical axis, shown as vertical pivot axis 40. As shown in FIGS. 12, 14, and 15, the torque box 300 includes a pivotal connector, shown as slewing bearing 310, coupled to the pedestal 308. The slewing bearing 310 is a rotational rolling-element bearing with an inner element, shown as bearing element 312, and an outer element, shown as driven gear 314. The bearing element 312 may be coupled to the pedestal 308 with a plurality of fasteners (e.g., bolts, etc.).

As shown in FIGS. 14 and 15, a drive actuator, shown as rotation actuator 320, is coupled to the pedestal 308 (e.g., by an intermediate bracket, etc.). The rotation actuator 320 is positioned to drive (e.g., rotate, turn, etc.) the driven gear 314 of the slewing bearing 310. In one embodiment, the rotation actuator 320 is an electric motor (e.g., an alternating current (AC) motor, a direct current motor (DC), etc.) configured to convert electrical energy into mechanical energy. In other embodiments, the rotation actuator 320 is powered by air (e.g., pneumatic, etc.), a fluid (e.g., a hydraulic motor, a hydraulic cylinder, etc.), mechanically (e.g., a flywheel, etc.), or still another power source.

As shown in FIGS. 14 and 15, the rotation actuator 320 includes a driver, shown as drive pinion 322. The drive pinion 322 is mechanically coupled with the driven gear 314 of the slewing bearing 310. In one embodiment, a plurality of teeth of the drive pinion 322 engage a plurality of teeth on the driven gear 314. By way of example, when the rotation actuator 320 is engaged (e.g., powered, turned on, etc.), the rotation actuator 320 may provide rotational energy (e.g., mechanical energy, etc.) to an output shaft. The drive pinion 322 may be coupled to the output shaft such that the rotational energy of the output shaft drives (e.g., rotates, etc.) the drive pinion 322. The rotational energy of the drive pinion 322 may be transferred to the driven gear 314 in response to the engaging teeth of both the drive pinion 322 and the driven gear 314. The driven gear 314 thereby rotates about the vertical pivot axis 40, while the bearing element 312 remains in a fixed position relative to the driven gear 314.

As shown in FIGS. 1, 2, and 16-18, the turntable 510 includes a first portion, shown as rotation base 512, and a second portion, shown as side supports 514, that extend vertically upward from opposing lateral sides of the rotation base 512. According to an exemplary embodiment, (i) the work platform 550 is coupled to the side supports 514, (ii) the aerial ladder assembly 700 is pivotally coupled to the side supports 514, (iii) the control console 600 is coupled to the rotation base 512, and (iv) the rotation base 512 is disposed within the aerial assembly recess 140 and interfaces with and is coupled to the driven gear 314 of slewing bearing 310 such that (i) the aerial assembly 500 is selectively pivotable about the vertical pivot axis 40 using the rotation actuator 320, (ii) at least a portion of the work platform 550 and the aerial ladder assembly 700 is positioned below the roof of the front cabin 20, and the turntable 510 is coupled rearward of the front cabin 20 and between the front axle 16 and (iii) the tandem rear axles 18 (e.g., the turntable 510 is coupled to the frame 12 such that the vertical pivot axis 40 is positioned rearward of a centerline of the front axle 16, forward of a centerline of the tandem rear axle 18, rearward of a rear edge of a tire of the front axle 16, forward of a front edge of a wheel of the front axle of the tandem rear axles 18, rearward of a front edge of a tire of the front axle 16, forward of a rear edge of a wheel of the rear axle of the tandem rear axles 18, etc.). Accordingly, loading from the work basket 1300, the aerial ladder assembly 700, and/or the work platform 550 may transfer through the turntable 510 into the torque box 300 and the frame 12.

As shown in FIG. 12, the rear assembly 100 includes a rotation swivel, shown as rotation swivel 316, that includes a conduit. According to an exemplary embodiment, the conduit of the rotation swivel 316 extends upward from the pedestal 308 and into the turntable 510. The rotation swivel 316 may couple (e.g., electrically, hydraulically, fluidly, etc.) the aerial assembly 500 with other components of the fire apparatus 10. By way of example, the conduit may define a passageway for water to flow into the aerial ladder assembly 700. Various lines may provide electricity, hydraulic fluid, and/or water to the aerial ladder assembly 700, actuators, and/or the control console 600.

According to an exemplary embodiment, the work platform 550 provides a surface upon which operators (e.g., fire fighters, rescue workers, etc.) may stand while operating the aerial assembly 500 (e.g., with the control console 600, etc.). The control console 600 may be communicably coupled to various components of the fire apparatus 10 (e.g., actuators of the aerial ladder assembly 700, rotation actuator 320, water turret, etc.) such that information or signals (e.g., command signals, fluid controls, etc.) may be exchanged from the control console 600. The information or signals may relate to one or more components of the fire apparatus 10. According to an exemplary embodiment, the control console 600 enables an operator (e.g., a fire fighter, etc.) of the fire apparatus 10 to communicate with one or more components of the fire apparatus 10. By way of example, the control console 600 may include at least one of an interactive display, a touchscreen device, one or more buttons (e.g., a stop button configured to cease water flow through a water nozzle, etc.), joysticks, switches, and voice command receivers. An operator may use a joystick associated with the control console 600 to trigger the actuation of the turntable 510 and/or the aerial ladder assembly 700 to a desired angular position (e.g., to the front, back, or side of fire apparatus 10, etc.). By way of another example, an operator may engage a lever associated with the control console 600 to trigger the extension or retraction of the aerial ladder assembly 700.

Figure 16:
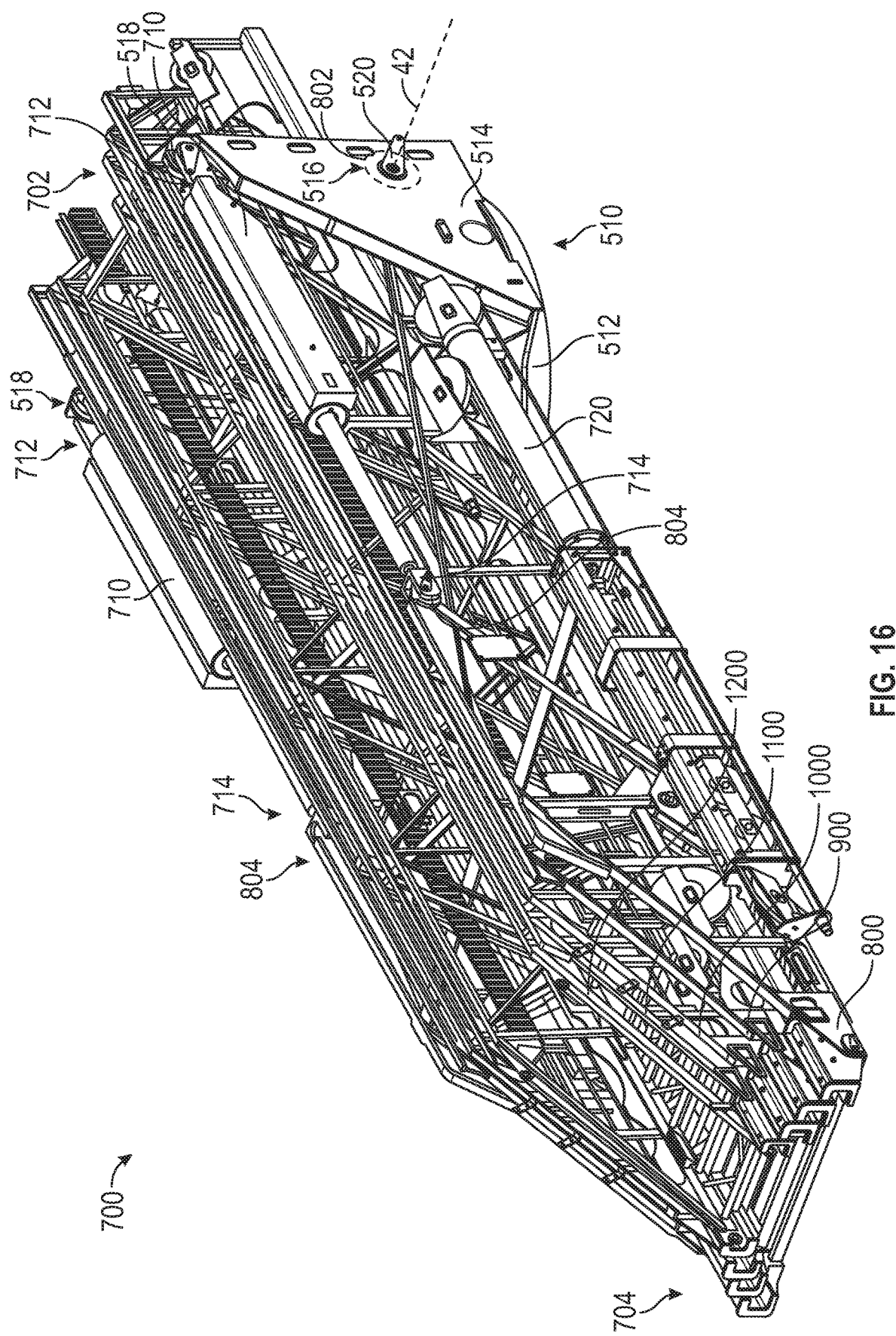
FIG. 16 is a perspective view of an aerial ladder assembly and turntable of the mid-mount fire apparatus of FIG. 1, according to an exemplary embodiment.
Figure 17:
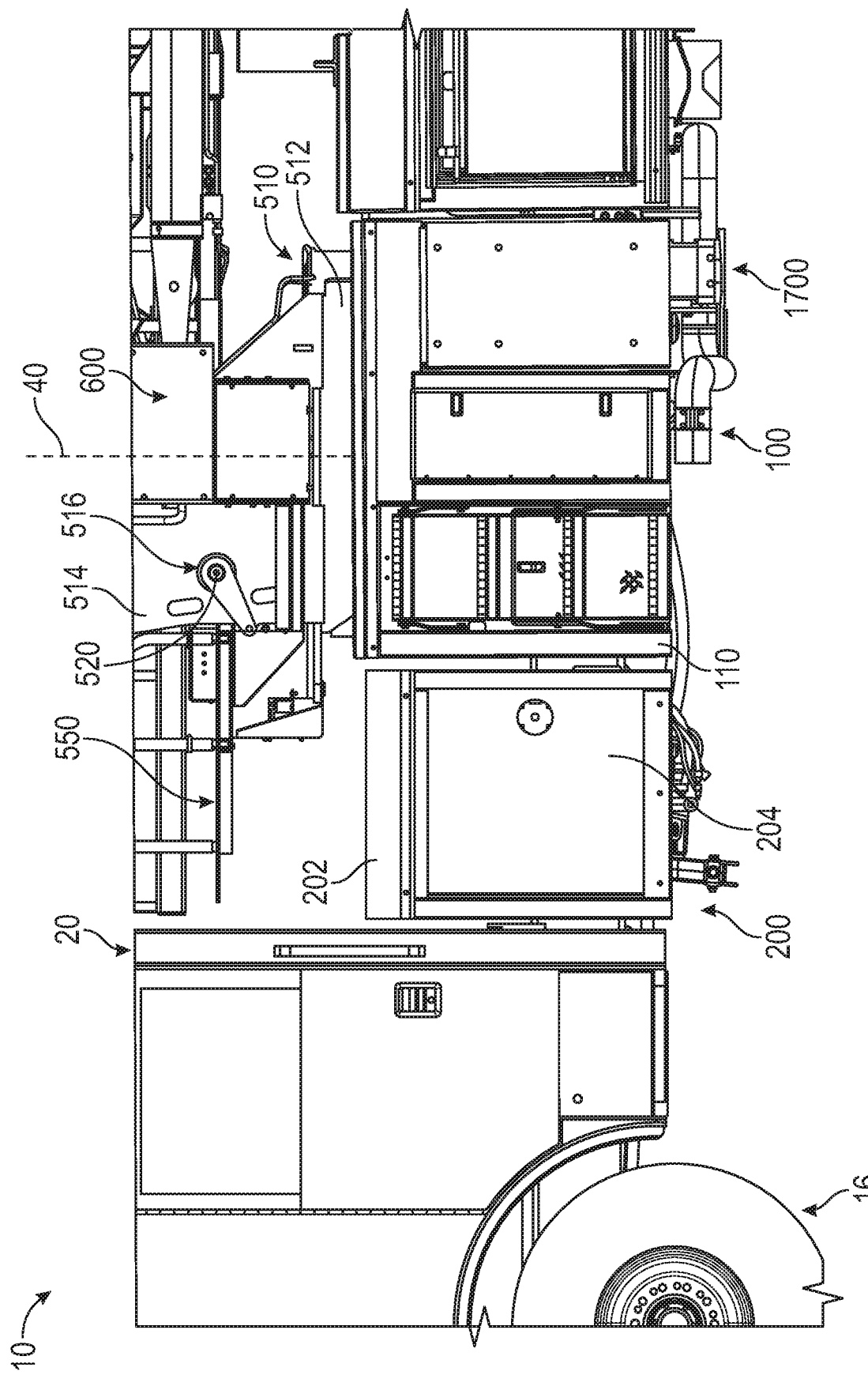
FIG. 17 is a side view of a pump housing of the mid-mount fire apparatus of FIG. 1 in a first configuration, according to an exemplary embodiment.
Figure 18:
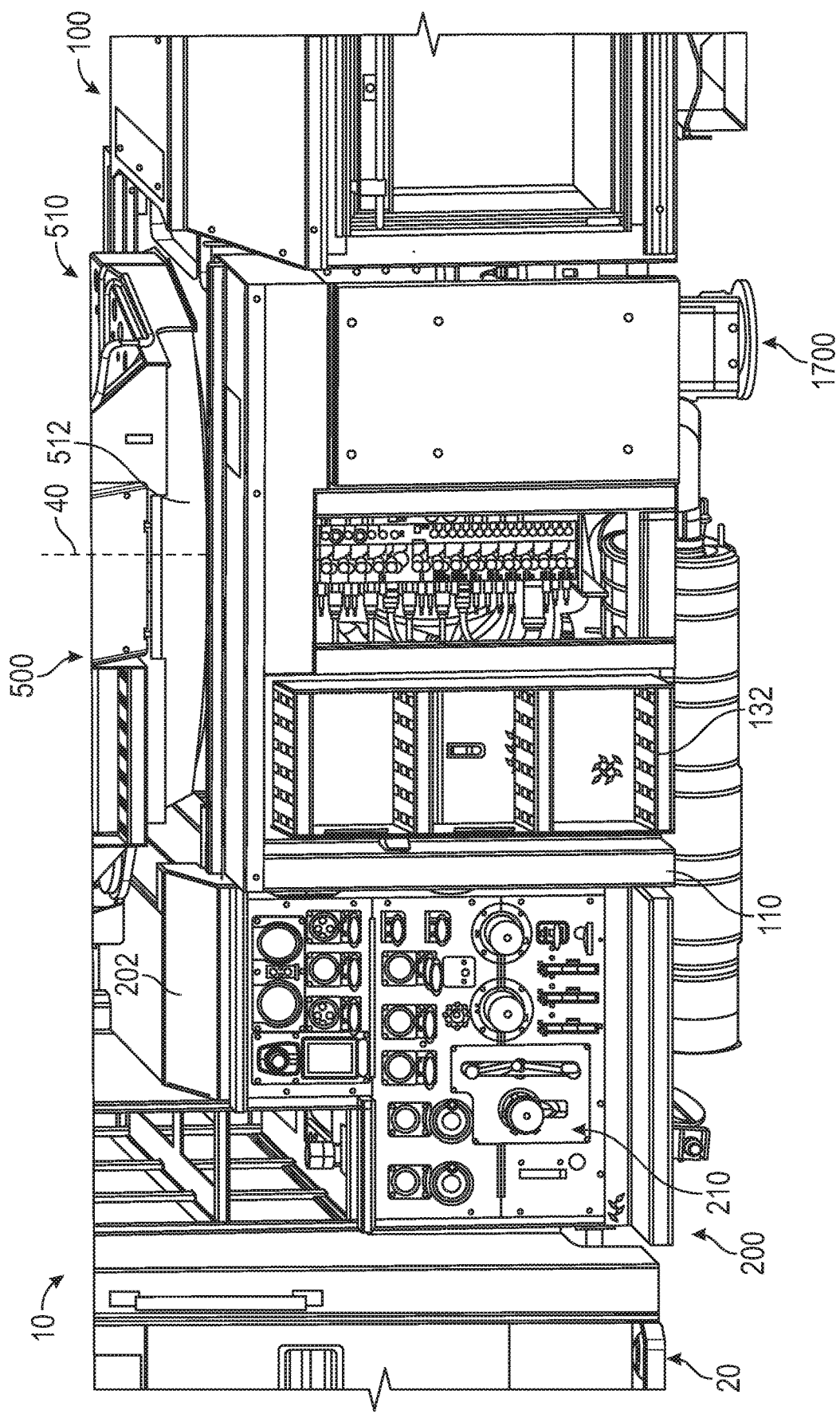
FIG. 18 is a side perspective view of a pump system within the pump housing of FIG. 17 in a second configuration, according to an exemplary embodiment.

As shown in FIG. 16, the aerial ladder assembly 700 has a plurality of nesting ladder sections that telescope with respect to one another including a first section, shown as base section 800; a second section, shown as lower middle section 900; a third ladder section, shown as middle section 1000; a fourth section, shown as upper middle section 1100; and a fifth section, shown as fly section 1200. As shown in FIGS. 16 and 17, the side supports 514 of the turntable 510 define a first interface, shown as ladder interface 516, and a second interface, shown as actuator interface 518. As shown in FIG. 16, the base section 800 of the aerial ladder assembly 700 defines first interfaces, shown as pivot interfaces 802, and second interfaces, shown as actuator interfaces 804. As shown in FIGS. 16 and 17, the ladder interfaces 516 of the side supports 514 of the turntable 510 and the pivot interfaces 802 of the base section 800 are positioned to align and cooperatively receive a pin, shown as heel pin 520, to pivotally couple the proximal end 702 of the aerial ladder assembly 700 to the turntable 510. As shown in FIG. 17, the aerial ladder assembly 700 includes first ladder actuators (e.g., hydraulic cylinders, etc.), shown as pivot actuators 710. Each of the pivot actuators 710 has a first end, shown as end 712, coupled to a respective actuator interface 518 of the side supports 514 of the turntable 510 and an opposing second end, shown as end 714, coupled to a respective actuator interface 804 of the base section 800. According to an exemplary embodiment, the pivot actuators 710 are kept in tension such that retraction thereof lifts and rotates the distal end 704 of the aerial ladder assembly 700 about a lateral axis, shown as lateral pivot axis 42, defined by the heel pin 520. In other embodiments, the pivot actuators 710 are kept in compression such that extension thereof lifts and rotates the distal end 704 of the aerial ladder assembly 700 about the lateral pivot axis 42. In an alternative embodiment, the aerial ladder assembly only includes one pivot actuator 710.

As shown in FIG. 16, the aerial ladder assembly 700 includes one or more second ladders actuators, shown as extension actuators 720. According to an exemplary embodiment, the extension actuators 720 are positioned to facilitate selectively reconfiguring the aerial ladder assembly 700 between an extended configuration and a retracted/stowed configuration (see, e.g., FIGS. 1-3, 16, etc.). In the extended configuration (e.g., deployed position, use position, etc.), the aerial ladder assembly 700 is lengthened, and the distal end 704 is extended away from the proximal end 702. In the retracted configuration (e.g., storage position, transport position, etc.), the aerial ladder assembly 700 is shortened, and the distal end 704 is withdrawn towards the proximal end 702.

According to the exemplary embodiment shown in FIGS. 1-3 and 16, the aerial ladder assembly 700 has over-retracted ladder sections such that the proximal ends of the lower middle section 900, the middle section 1000, the upper middle section 1100, and the fly section 1200 extend forward of (i) the heel pin 520 and (ii) the proximal end of the base section 800 along the longitudinal axis 14 of the fire apparatus 10 when the aerial ladder assembly 700 is retracted and stowed. According to an exemplary embodiment, the distal end 704 of the aerial ladder assembly 700 (e.g., the distal end of the fly section 1200, etc.) is extensible to the horizontal reach of at least 96 feet (e.g., up to 96 feet, more than 96 feet, 90 feet, 95 feet, 100 feet, etc.) or a vertical reach of at least 100 feet (e.g., up to 100 feet, more than 100 feet, 90 feet, 95 feet, 105 feet, etc.). According to an exemplary embodiment, the aerial ladder assembly 700 is operable below grade (e.g., at a negative depression angle relative to a horizontal, etc.) within an aerial work envelope or scrub area. In one embodiment, the aerial ladder assembly 700 is operable in the scrub area such that it may pivot about the vertical pivot axis 40 up to 50 degrees (e.g., 20 degrees forward and 30 degrees rearward from a position perpendicular to the longitudinal axis 14, etc.) on each side of the body 110 while at a negative depression angle (e.g., up to negative 15 degrees, more than negative 15 degrees, up to negative 20 degrees, etc. below level, below a horizontal defined by the top platform 122 of the body 110, etc.).

Figure 3:
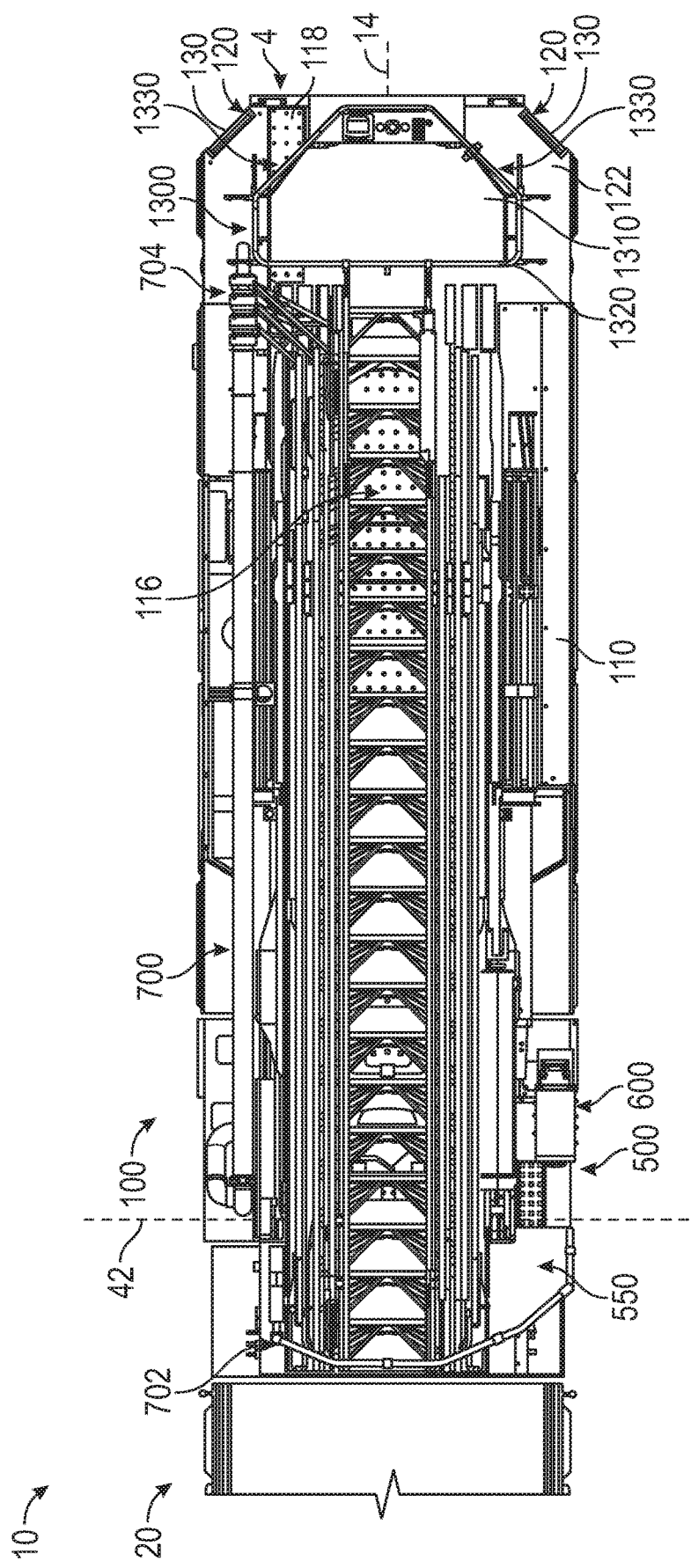
FIG. 3 is a top view of the mid-mount fire apparatus of FIG. 1, according to an exemplary embodiment.
Figure 4:
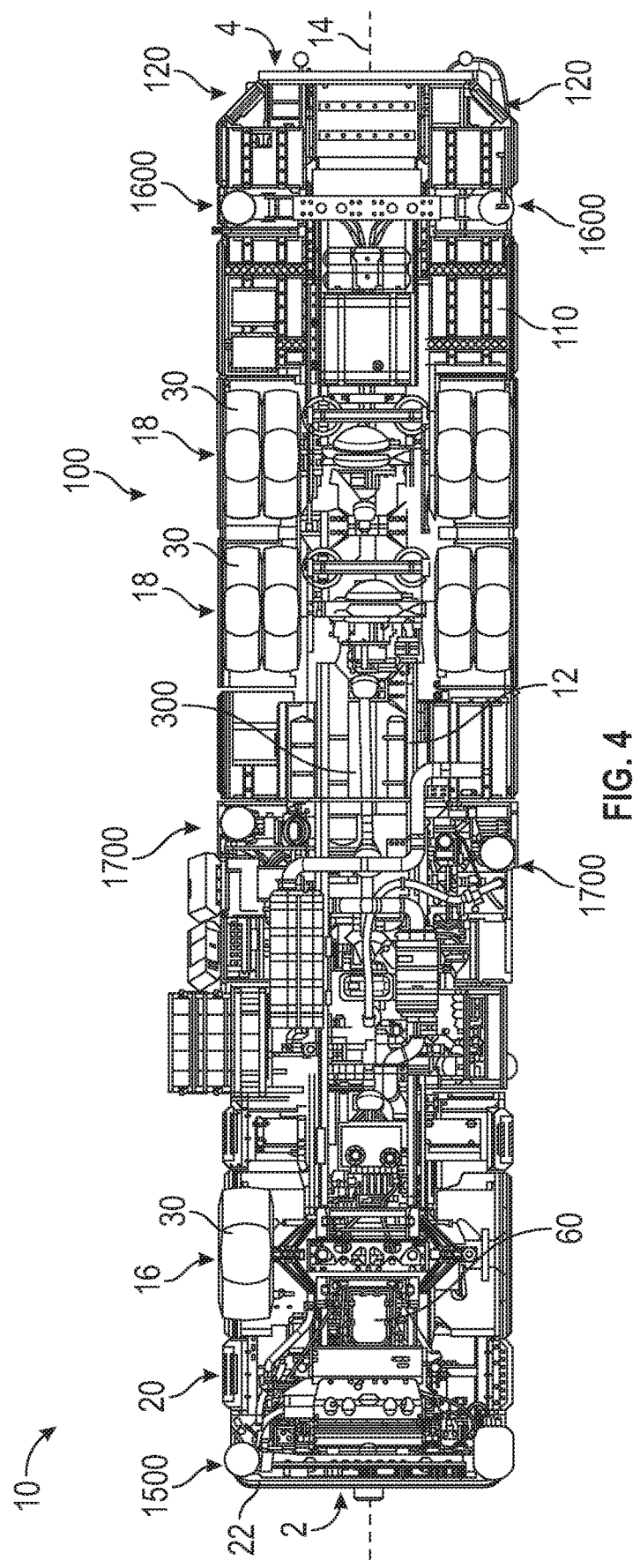
FIG. 4 is a bottom view of the mid-mount fire apparatus of FIG. 1, according to an exemplary embodiment.
Figure 5:
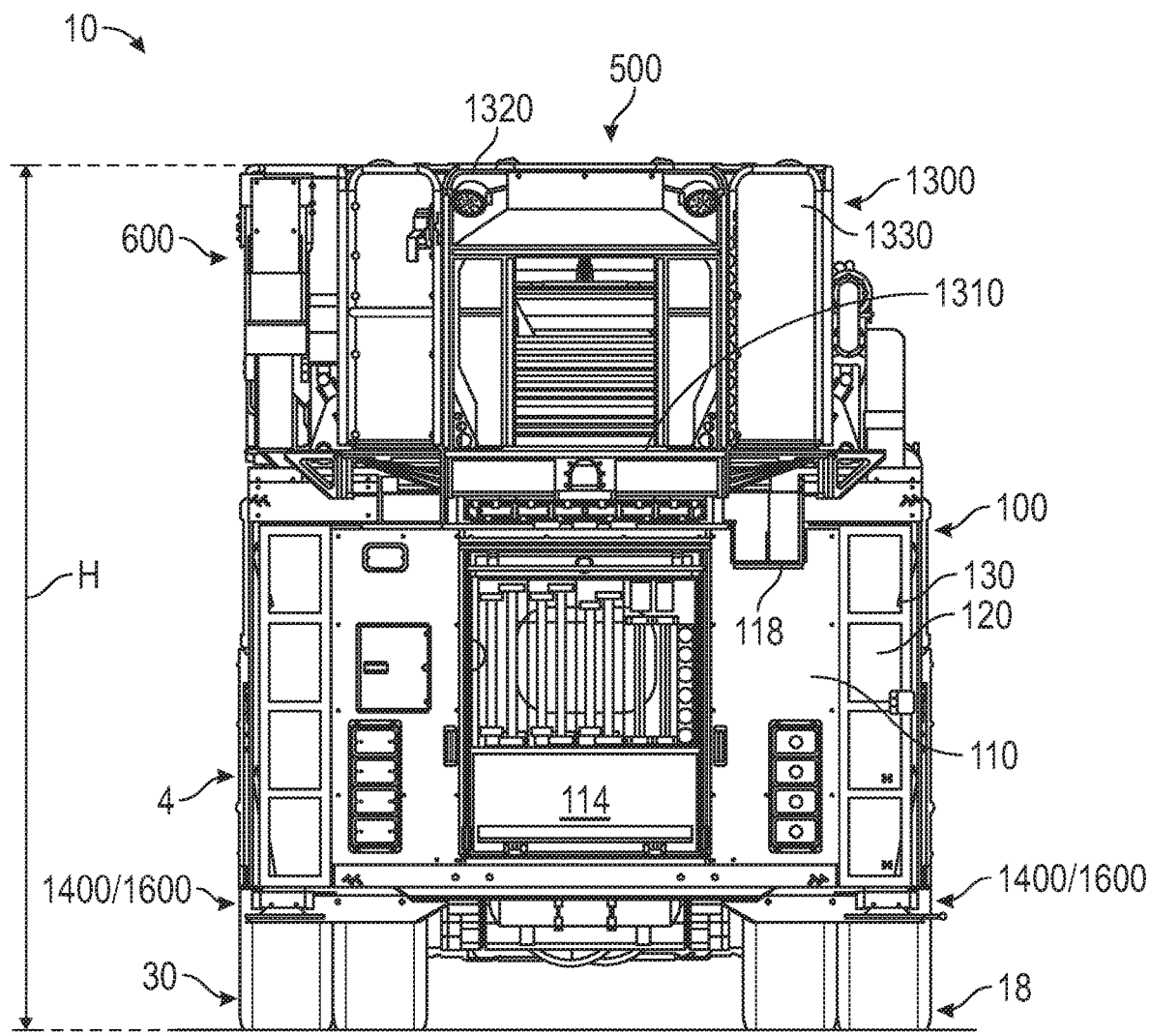
FIG. 5 is a rear view of the mid-mount fire apparatus of FIG. 1, according to an exemplary embodiment.
Figure 10:
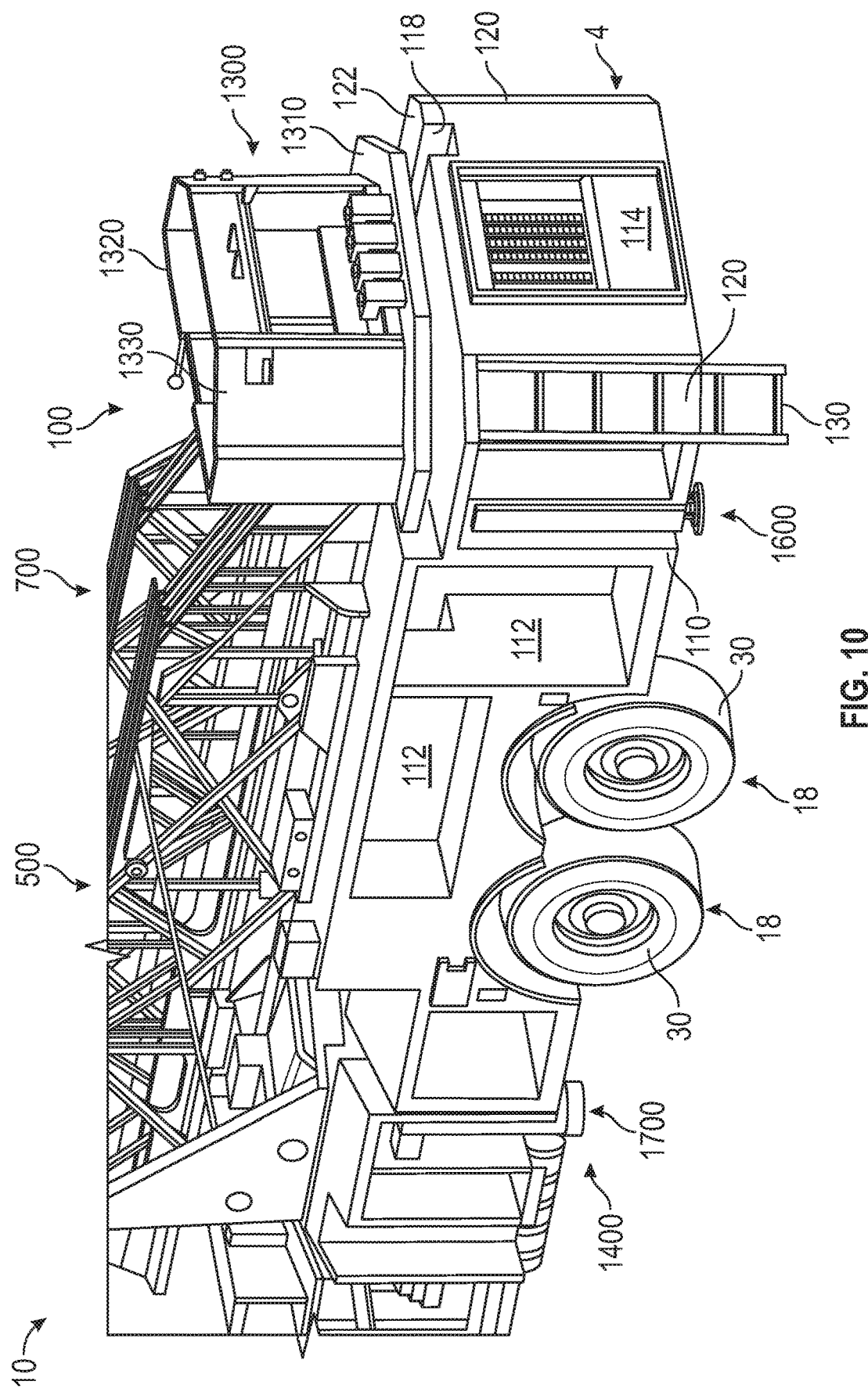
FIG. 10 is a rear perspective view of a rear assembly of the mid-mount fire apparatus of FIG. 1, according to an exemplary embodiment.
Figure 11:
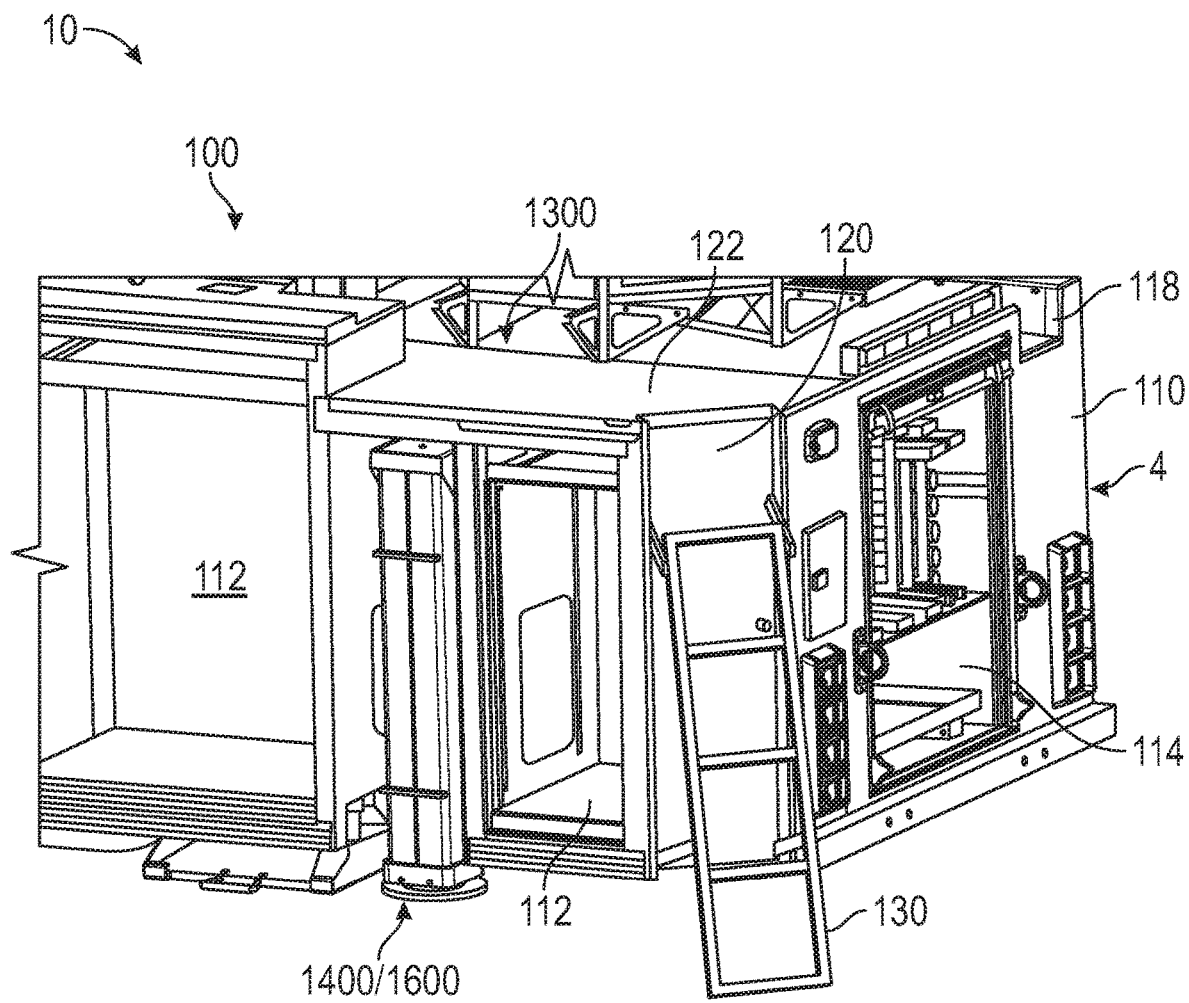
FIG. 11 is detailed rear perspective view of the rear assembly of FIGS. 10, according to an exemplary embodiment.

According to an exemplary embodiment, the work basket 1300 is configured to hold at least one of fire fighters and persons being aided by the fire fighters. As shown in FIGS. 3, 5, and 10, the work basket 1300 includes a platform, shown as basket platform 1310; a support, shown as railing 1320, extending around the periphery of the basket platform 1310; and angled doors, shown as basket doors 1330, coupled to the corners of the railing 1320 proximate the rear end 4 of the fire apparatus 10. According to an exemplary embodiment, the basket doors 1330 are angled to correspond with the chamfered corners 120 of the body 110.

In other embodiments, the aerial assembly 500 does not include the work basket 1300. In some embodiments, the work basket 1300 is replaced with or additionally includes a nozzle (e.g., a deluge gun, a water cannon, a water turret, etc.) or other tool. By way of example, the nozzle may be connected to a water source (e.g., the water tank 400, an external source, etc.) with a conduit extending along the aerial ladder assembly 700 (e.g., along the side of the aerial ladder assembly 700, beneath the aerial ladder assembly 700, in a channel provided in the aerial ladder assembly 700, etc.). By pivoting the aerial ladder assembly 700 into a raised position, the nozzle may be elevated to expel water from a higher elevation to facilitate suppressing a fire.

According to an exemplary embodiment, the pump system 200 (e.g., a pump house, etc.) is a mid-ship pump assembly. As shown in FIGS. 1, 2, 12, 17, and 18, the pump system 200 is positioned along the rear assembly 100 behind the front cabin 20 and forward of the vertical pivot axis 40 (e.g., forward of the turntable 510, the torque box 300, the pedestal 308, the slewing bearing 310, the heel pin 520, a front end of the body 110, etc.) such that the work platform 550 and the over-retracted portions of the aerial ladder assembly 700 overhang above the pump system 200 when the aerial ladder assembly 700 is retracted and stowed. According to an exemplary embodiment, the position of the pump system 200 forward of the vertical pivot axis 40 facilitates ease of install and serviceability. In other embodiments, the pump system 200 is positioned rearward of the vertical pivot axis 40.

Figure 19:
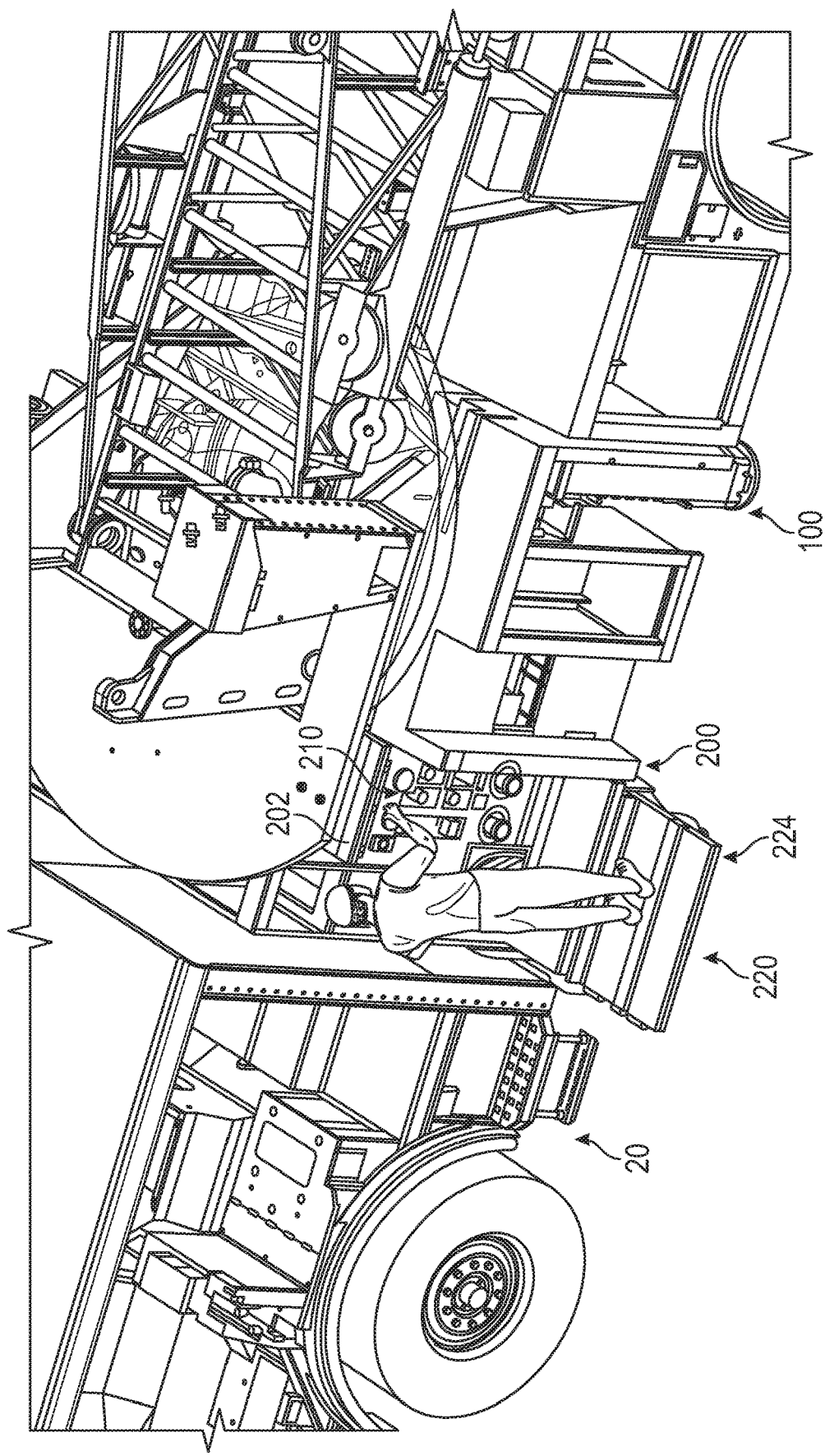
FIG. 19 is a side perspective view of the pump system of FIG. 18 with a platform in a deployed configuration, according to an exemplary embodiment.
Figure 20:
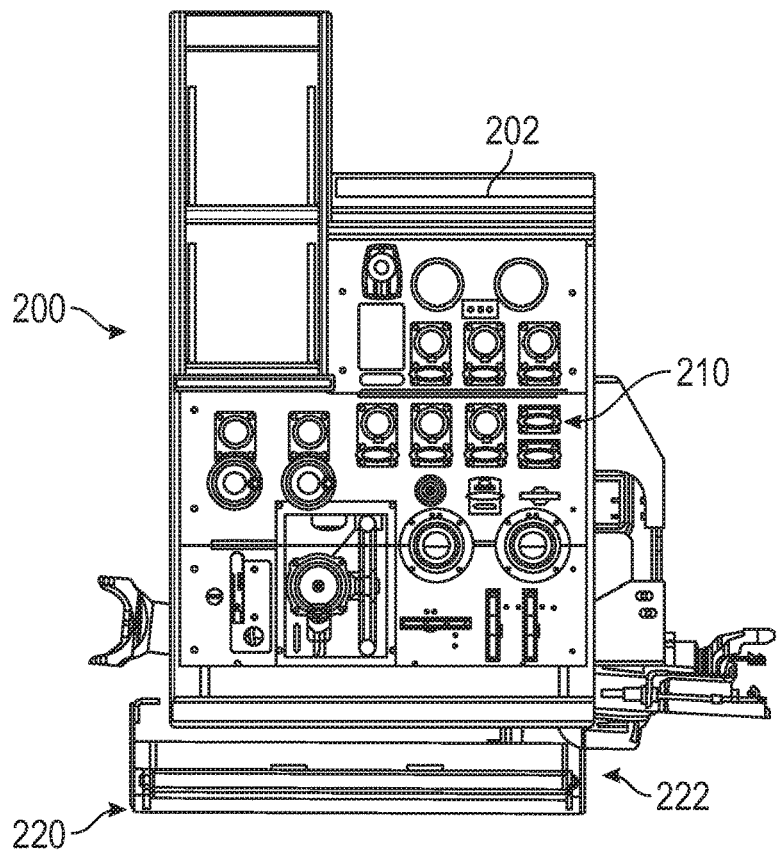
FIGS. 20 and 21 are opposing side views of the pump system of FIG. 18, according to an exemplary embodiment.
Figure 21:
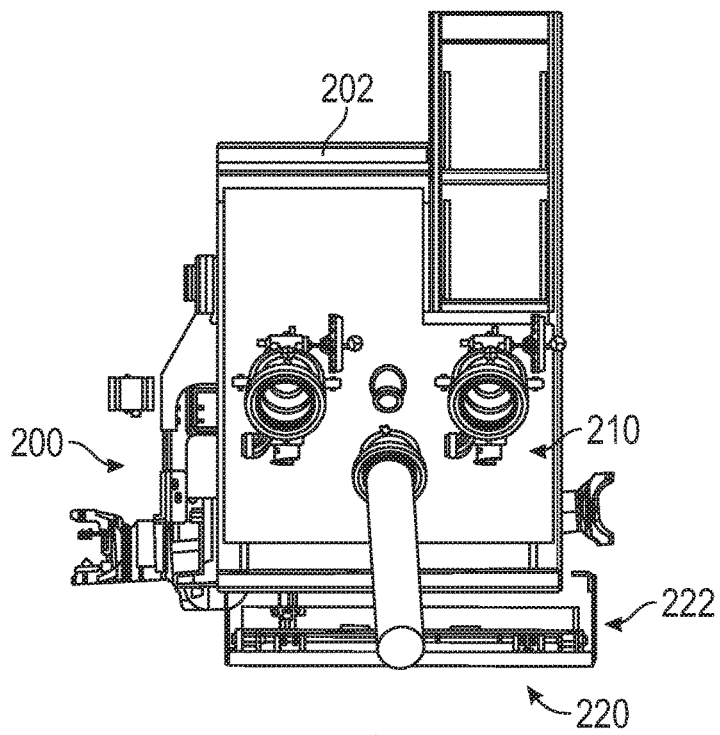

As shown in FIGS. 17-21, the pump system 200 includes a housing, shown as pump house 202. As shown in FIG. 17, the pump house 202 includes a selectively openable door, shown as pump door 204. As shown in FIGS. 18-21, the pump system 200 includes a pumping device, shown as pump assembly 210, disposed within the pump house 202. By way of example, the pump assembly 210 may include a pump panel having an inlet for the entrance of water from an external source (e.g., a fire hydrant, etc.), a pump, an outlet configured to engage a hose, various gauges, etc. The pump of the pump assembly 210 may pump fluid (e.g., water, agent, etc.) through a hose to extinguish a fire (e.g., water received at an inlet of the pump house 202, water stored in the water tank 400, etc.). As shown in FIGS. 19-21, the pump system 200 includes a selectively deployable (e.g., foldable, pivotable, collapsible, etc.) platform, shown as pump platform 220, pivotally coupled to the pump house 202. As shown in FIGS. 20 and 21, the pump platform 220 is in a first configuration, shown as stowed configuration 222, and as shown in FIG. 19, the pump platform 220 is in a second configuration, shown as deployed configuration 224.

Figure 6:
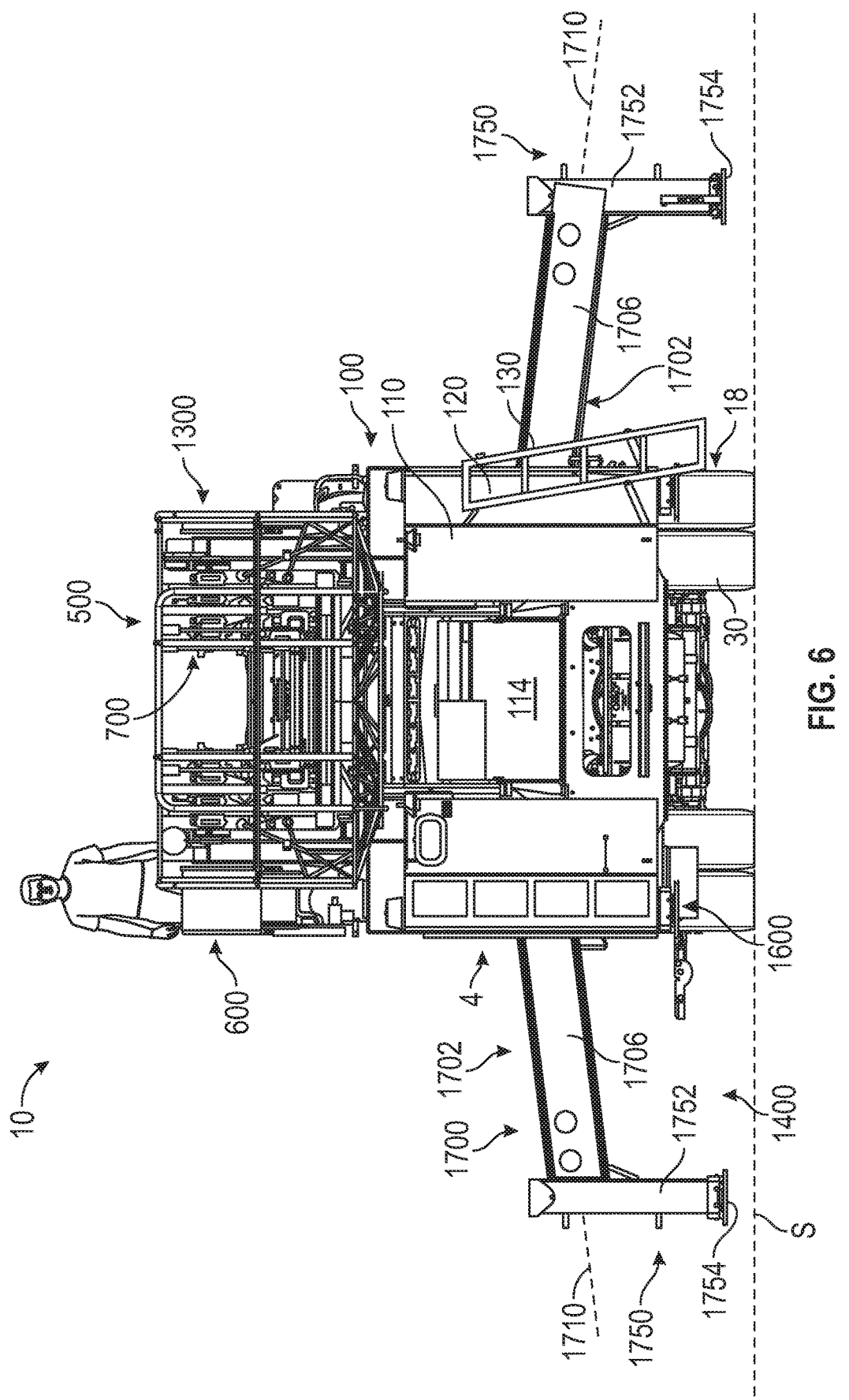
FIG. 6 is a is a rear view of the mid-mount fire apparatus of FIG. 1 having outriggers in an extended configuration, according to an exemplary embodiment.
Figure 7:
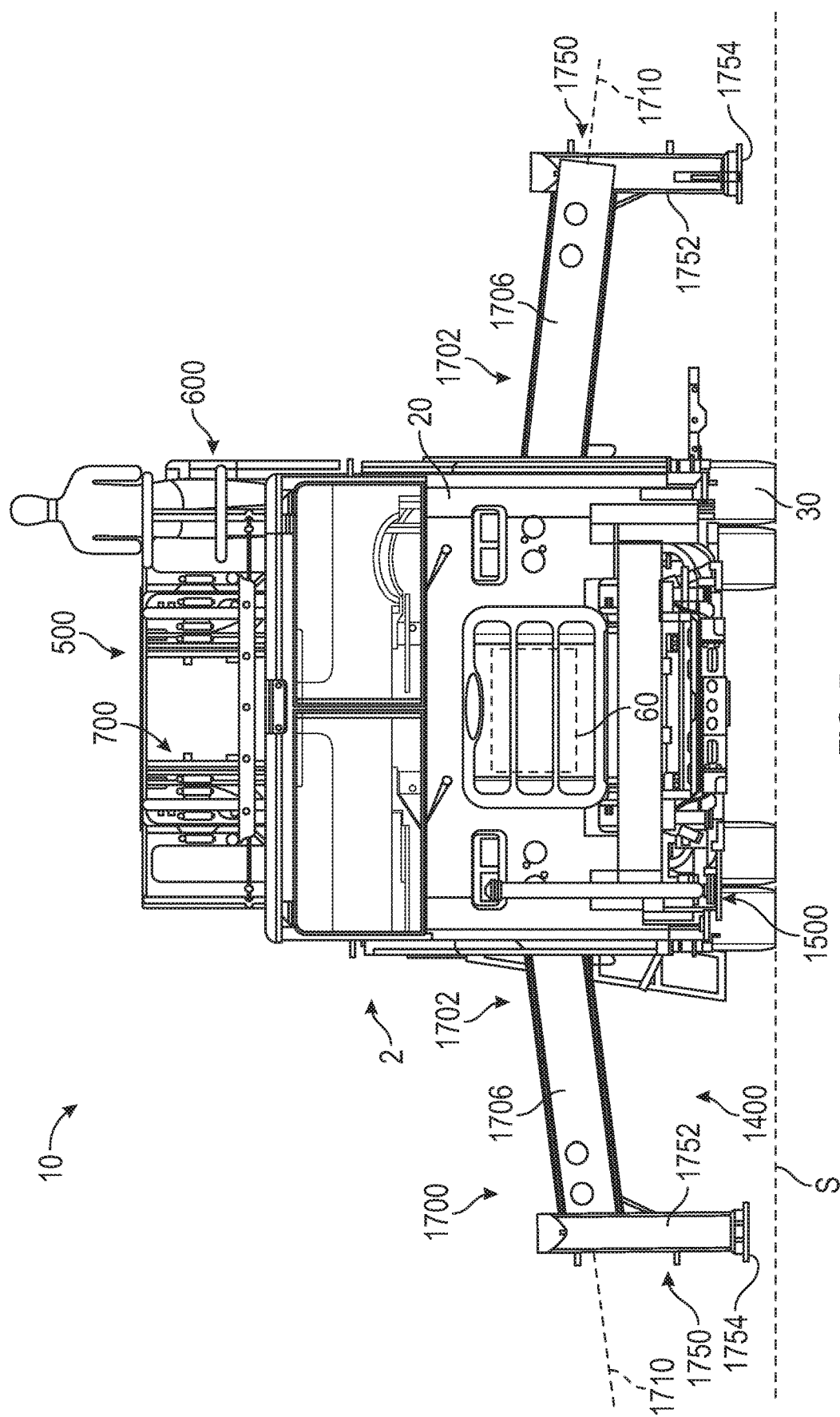
FIG. 7 is a front view of the mid-mount fire apparatus of FIG. 1 having outriggers in an extended configuration, according to an exemplary embodiment.

As shown in FIGS. 1, 2, 4, 6, 7, 10-12, 14, and 15, the fire apparatus 10 includes a stability system, shown as stability assembly 1400. As shown in FIGS. 1, 2, 4, and 7, the stability assembly 1400 includes first stabilizers, shown as front downriggers 1500, coupled to each lateral side of the front bumper 22 at the front end 2 of the front cabin 20. In other embodiments, the front downriggers 1500 are otherwise coupled to the fire apparatus 10 (e.g., to the front end 2 of the frame 12, etc.). According to an exemplary embodiment, the front downriggers 1500 are selectively deployable (e.g., extendable, etc.) downward to engage a ground surface. As shown in FIGS. 1, 2, 4-6, 10-12, 14, and 15, the stability assembly 1400 includes second stabilizers, shown as rear downriggers 1600, coupled to each lateral side of the rear end 4 of the frame 12 and/or the rear end 306 of the torque box 300. According to an exemplary embodiment, the rear downriggers 1600 are selectively deployable (e.g., extendable, etc.) downward to engage a ground surface. As shown in FIGS. 1, 2, 4, 6, 7, 10, 12, 14, 15, 17, and 18, the stability assembly 1400 includes third stabilizers, shown outriggers 1700, coupled to the front end 304 of the torque box 300 between the pedestal 308 and the body 302. As shown in FIGS. 6 and 7, the outriggers 1700 are selectively deployable (e.g., extendable, etc.) outward from each of the lateral sides of the body 110 and/or downward to engage a ground surface. According to an exemplary embodiment, the outriggers 1700 are extendable up to a distance of eighteen feet (e.g., measured between the center of a pad of a first outrigger and the center of a pad of a second outrigger, etc.). In other embodiments, the outriggers 1700 are extendable up to a distance of less than or greater than eighteen feet.

According to an exemplary embodiment, the front downriggers 1500, the rear downriggers 1600, and the outriggers 1700 are positioned to transfer the loading from the aerial ladder assembly 700 to the ground. For example, a load applied to the aerial ladder assembly 700 (e.g., a fire fighter at the distal end 704, a wind load, etc.) may be conveyed into to the turntable 510, through the pedestal 308 and the torque box 300, to the frame 12, and into the ground through the front downriggers 1500, the rear downriggers 1600, and/or the outriggers 1700. When the front downriggers 1500, the rear downriggers 1600, and/or the outriggers 1700 engage with a ground surface, portions of the fire apparatus 10 (e.g., the front end 2, the rear end 4, etc.) may be elevated relative to the ground surface. One or more of the wheel and tire assemblies 30 may remain in contact with the ground surface, but may not provide any load bearing support.

While the fire apparatus 10 is being driven or not in use, the front downriggers 1500, the rear downriggers 1600, and the outriggers 1700 may be retracted into a stored position.

According to an exemplary embodiment, with (i) the front downriggers 1500, the rear downriggers 1600, and/or the outriggers 1700 extended and (ii) the aerial ladder assembly 700 fully extended (e.g., at a horizontal reach of up to 96 feet, at a vertical reach of up to 100 feet, etc.), the fire apparatus 10 withstands a rated tip load (e.g., rated meaning that the fire apparatus 10 can, from a design-engineering perspective, withstand a greater tip load, with an associated factor of safety of at least two, meets National Fire Protection Association ("NFPA") requirements, etc.) of at least 1,000 pounds applied to the work basket 1300, in addition to the weight of the work basket 1300 itself (e.g., approximately 700 pounds, etc.). In embodiments where the aerial assembly 500 does not include the work basket 1300, the fire apparatus 10 may have a rated tip load of more than 1,000 pounds (e.g., 1,250 pounds, etc.) when the aerial ladder assembly 700 is fully extended.

According to an exemplary embodiment, the tandem rear axles 18 have a gross axle weight rating of up to 48,000 pounds and the fire apparatus 10 does not exceed the 48,000 pound tandem-rear axle rating. The front axle 16 may have a 24,000 pound axle rating. Traditionally, mid-mount fire trucks have greater than a 48,000 pound loading on the tandem rear-axles thereof. However, some state regulations prevent vehicles having such a high axle loading, and, therefore, the vehicles are unable to be sold and operated in such states. Advantageously, the fire apparatus 10 of the present disclosure has a gross axle weight loading of at most 48,000 pounds on the tandem rear axles 18, and, therefore, the fire apparatus 10 may be sold and operated in any state of the United States. In other embodiments, the rear tandem axle has a gross axle weight loading and/or an axle rating of more than 48,000 pounds.

Figure 8:
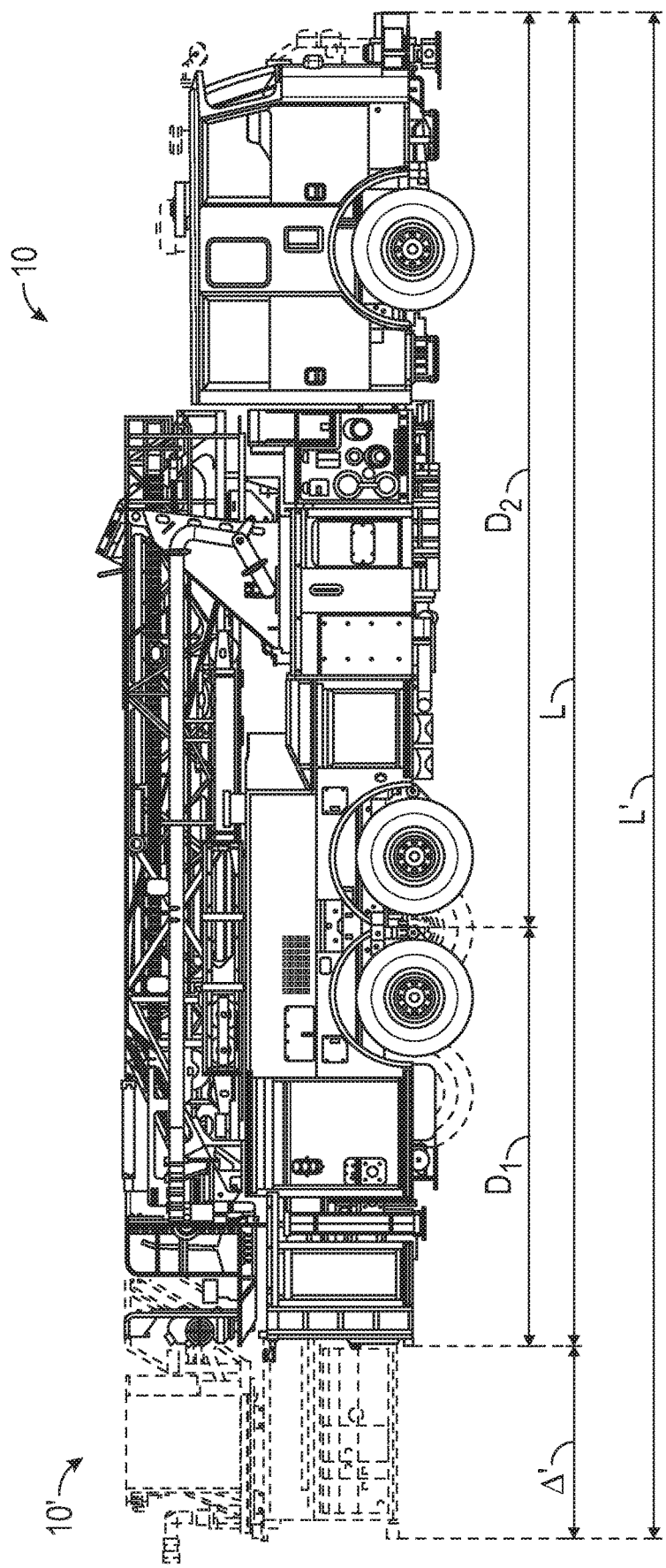
FIG. 8 is a side view of the mid-mount fire apparatus of FIG. 1 relative to a traditional mid-mount fire apparatus, according to an exemplary embodiment
Figure 9:
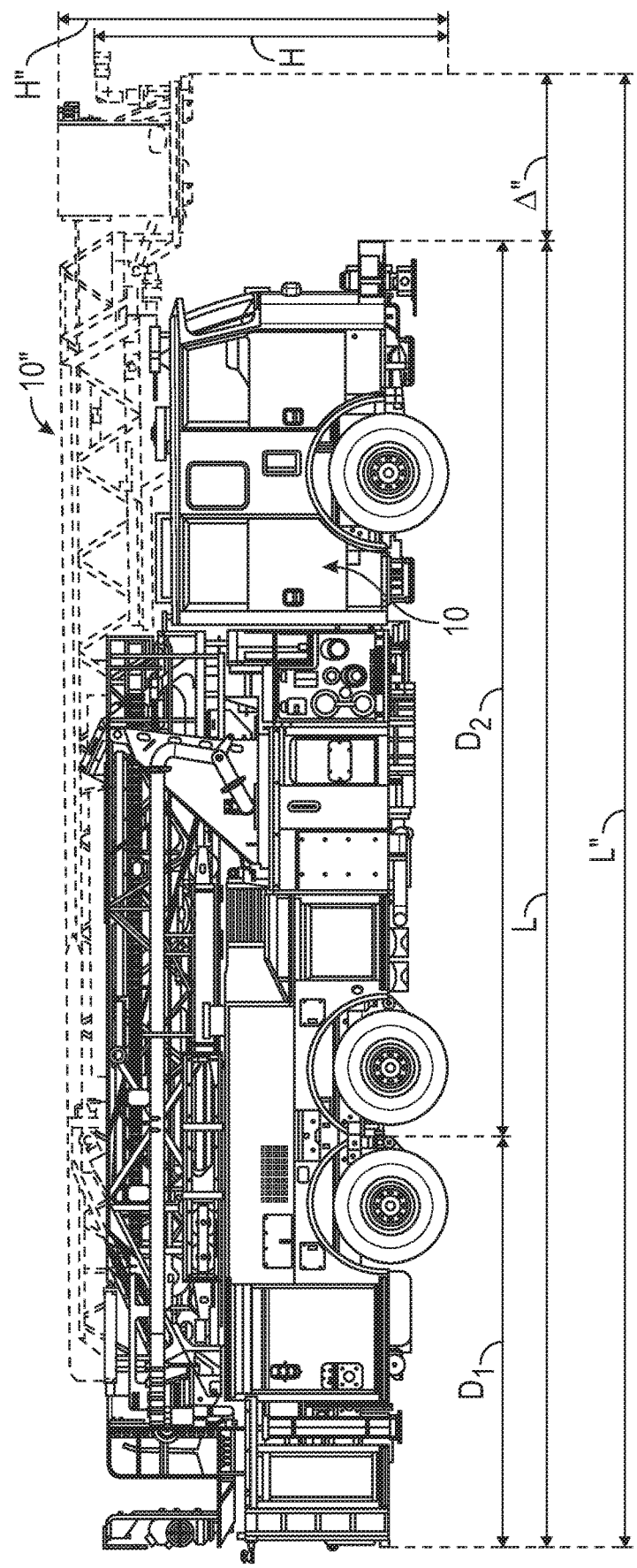
FIG. 9 is a side view of the mid-mount fire apparatus of FIG. 1 relative to a traditional rear-mount fire apparatus, according to an exemplary embodiment.

As shown in FIGS. 5 and 9, the fire apparatus 10 has a height H. According to an exemplary embodiment, the height H of the fire apparatus 10 is at most 128 inches (i.e., 10 feet, 8 inches). In other embodiments, the fire apparatus 10 has a height greater than 128 inches. As shown in FIGS. 8 and 9, the fire apparatus 10 has a longitudinal length L. According to an exemplary embodiment, the longitudinal length L of the fire apparatus 10 is at most 502 inches (i.e., 41 feet, 10 inches). In other embodiments, the fire apparatus 10 has a length L greater than 502 inches. As shown in FIGS. 8 and 9, the fire apparatus 10 has a distance $D_1$ between the rear end 4 of the body 110 and the middle of the tandem rear axles 18 (e.g., a body rear overhang portion, etc.). According to an exemplary embodiment, the distance $D_1$ of the fire apparatus 10 is at most 160 inches (i.e., 13 feet, 4 inches). In other embodiments, the fire apparatus 10 has a distance $D_1$ greater than 160 inches. As shown in FIGS. 8 and 9, the fire apparatus 10 has a distance $D_2$ between the front end 2 of the front cabin 20 (excluding the front bumper 22) and the middle of the tandem rear axles 18. According to an exemplary embodiment, the distance $D_2$ of the fire apparatus 10 is approximately twice or at least twice that of the distance $D_1$ (e.g., approximately 321 inches, approximately 323 inches, at least 320 inches, etc.).

As shown in FIG. 8, the longitudinal length L of the fire apparatus 10 is compared to the longitudinal length L' of a traditional mid-mount fire apparatus 10'. As shown in FIG. 8, when the front axles of the fire apparatus 10 and the fire apparatus 10' are aligned, the fire apparatus 10' extends beyond the longitudinal length L of the fire apparatus 10 a distance Δ'. The distance Δ' may be approximately the same as the amount of the body 110 rearward of the tandem rear axles 18 of the fire apparatus 10 such that the amount of body rearward of the tandem rear axle of the fire apparatus 10' is approximately double that of the fire apparatus 10. Decreasing the amount of the body 110 rearward of the tandem rear axles 18 improves drivability and maneuverability, and substantially reduces the amount of damage that fire departments may inflict on public and/or private property throughout a year of operating their fire trucks.

One solution to reducing the overall length of a fire truck is to configure the fire truck as a rear-mount fire truck with the ladder assembly overhanging the front cabin (e.g., in order to provide a ladder assembly with comparable extension capabilities, etc.). As shown in FIG. 9, the longitudinal length L of the fire apparatus 10 is compared to the longitudinal length L' of a traditional rear-mount fire apparatus 10". As shown in FIG. 9, when the front axles of the fire apparatus 10 and the fire apparatus 10" are aligned, the ladder assembly of the fire apparatus 10" extends beyond the longitudinal length L of the fire apparatus 10 a distance Δ" such that the ladder assembly overhangs past the front cabin. Overhanging the ladder assembly reduces driver visibility, as well as rear-mount fire trucks do not provide as much freedom when arriving at a scene on where and how to position the truck, which typically requires the truck to be reversed into position to provide the desired amount of reach (e.g., which wastes valuable time, etc.). Further, the height H" of the fire apparatus 10" is required to be higher than the height H of the fire apparatus 10 (e.g., by approximately one foot, etc.) so that the ladder assembly of the fire apparatus 10" can clear the front cabin thereof.

Integrated Ground Pad

Referring to FIGS. 6, 7, 14, and 15 the fire apparatus 10 includes a pair of outriggers 1700. The outriggers 1700 each include a first actuator assembly 1702 configured to extend in a primarily lateral direction. The first actuator assembly 1702 includes a first tubular member, shown as track 1704, that is fixedly coupled to the torque box 300 and the frame 12. The track 1704 receives a second tubular member, shown as telescoping section 1706, such that the telescoping section 1706 is slidably coupled to the track 1704. A first linear actuator, shown as hydraulic cylinder 1708, is positioned within and coupled to the track 1704 and the telescoping section 1706. The hydraulic cylinder 1708 is powered by pressurized hydraulic fluid. In other embodiments, the hydraulic cylinder 1708 is a linear actuator powered by air (e.g., pneumatic, etc.), electrically (e.g., by an alternating current, by a direct current, etc.), mechanically (e.g., a flywheel, etc.), or still another power source. The hydraulic cylinder 1708 is configured to control extension and retraction of the telescoping section 1706. As the hydraulic cylinder 1708 extends, the telescoping section 1706 translates along an axis of extension 1710. The orientation of the axis of extension 1710 is defined by the orientation of the track 1704.

Each outrigger 1700 further includes a second actuator assembly 1750 configured to extend in a substantially vertical direction. The second actuator assembly 1750 includes a third tubular member, shown as actuator receiver 1752. The actuator receiver 1752 is oriented substantially vertically and fixedly coupled to an end of the telescoping section 1706 opposite the frame 12. Accordingly, the second actuator assembly 1750 is indirectly coupled to the frame 12 and the torque box 300 by the first actuator assembly 1702. The actuator receiver 1752 receives and is coupled to a second linear actuator (e.g., a hydraulic cylinder). The second linear actuator is coupled to a foot 1754. Accordingly, when the second linear actuator extends, the foot 1754 extends downward toward a support surface S (e.g., the ground surface) shown in FIGS. 6 and 7. A ground pad 1756 extends directly between the foot 1754 and the support surface S. The ground pad 1756 has a larger surface area than the foot 1754. As the second linear actuator extends, the foot 1754 engages the ground pad 1756, and the ground pad 1756 engages the support surface. The second linear actuator applies an upward force on the frame 12 through the first actuator assembly 1702. The ground pad 1756 spreads the force of the second linear actuator out over an area.

Figure 22:
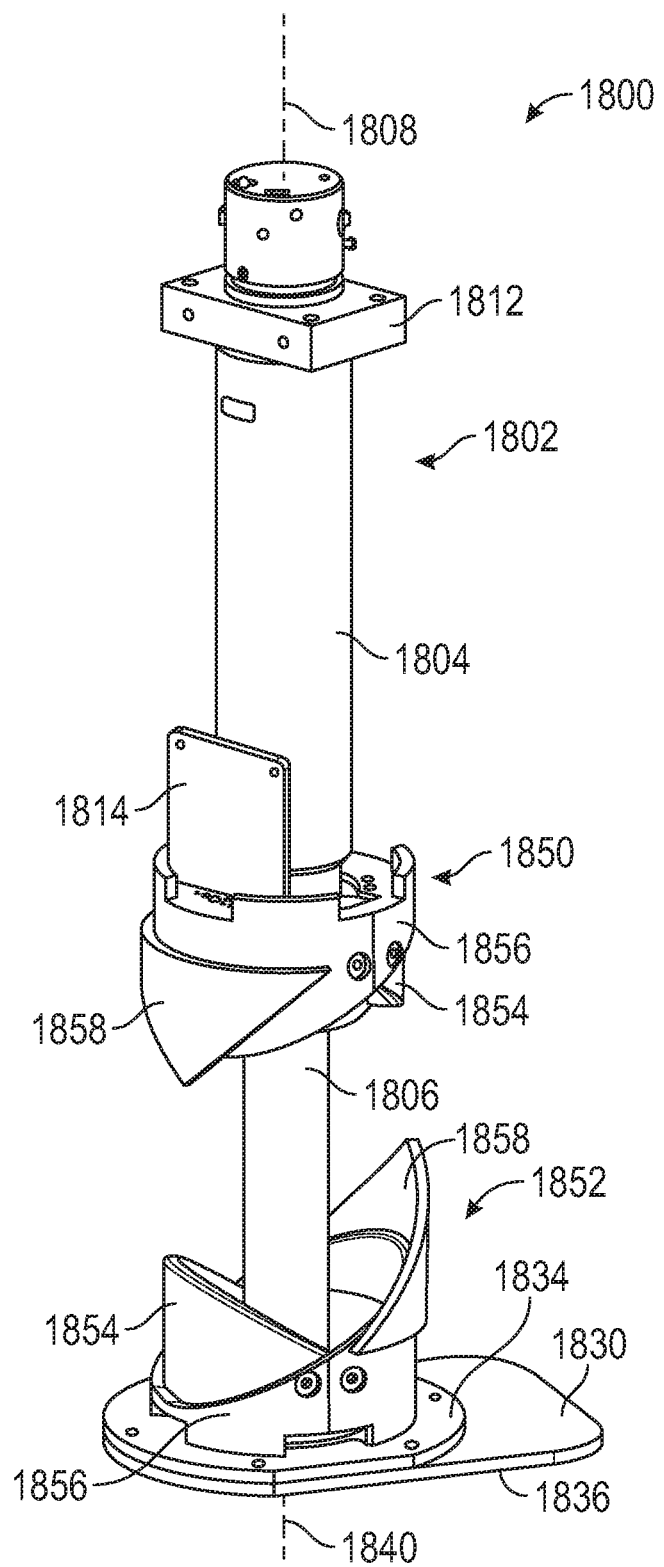
FIG. 22 is a perspective view of an actuator assembly of an outrigger of the mid-mount fire apparatus of FIG. 1, according to an exemplary embodiment.
Figure 23:
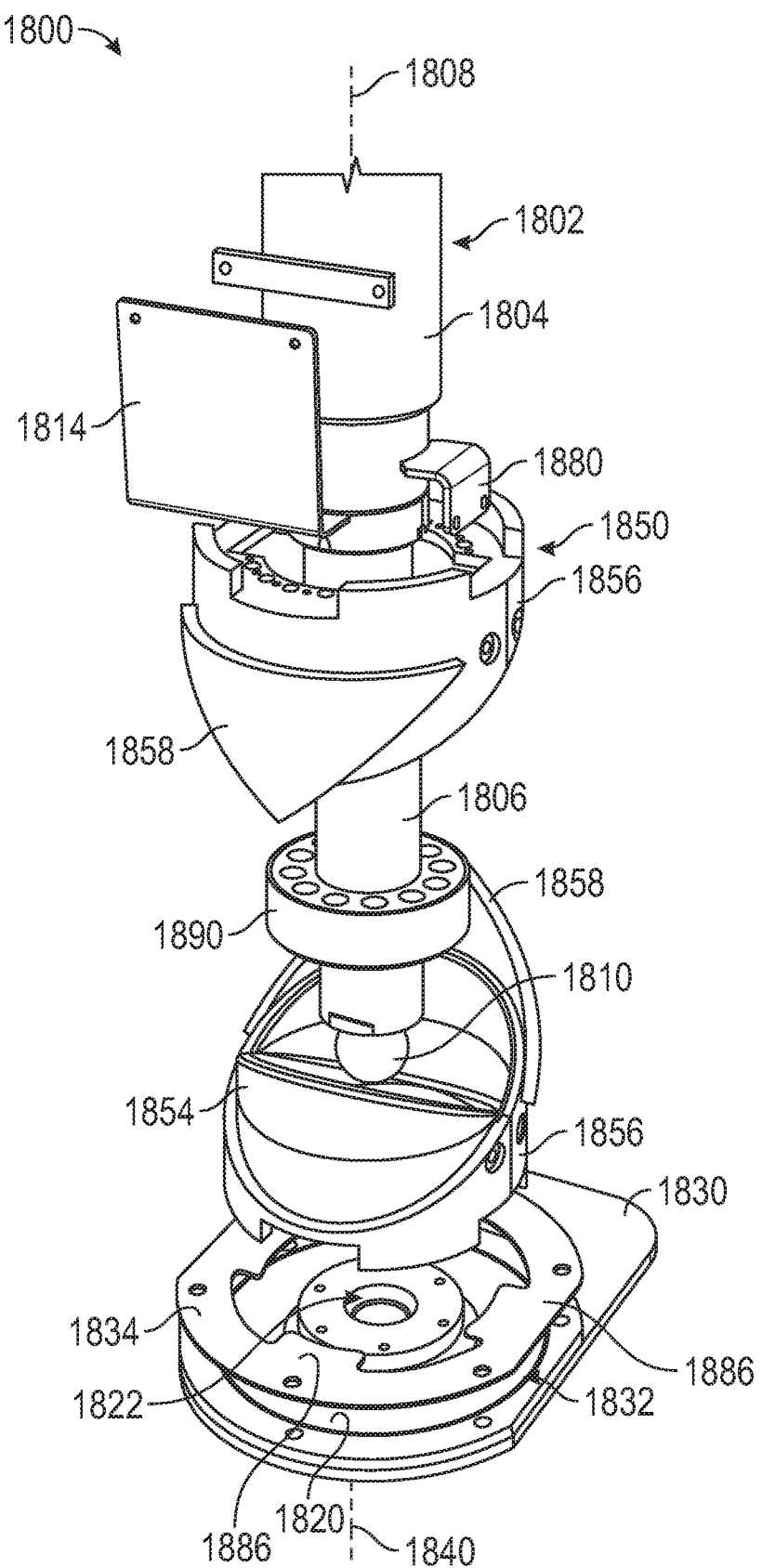
FIGS. 23 and 24 are exploded views of the actuator assembly of FIG. 22.
Figure 24:
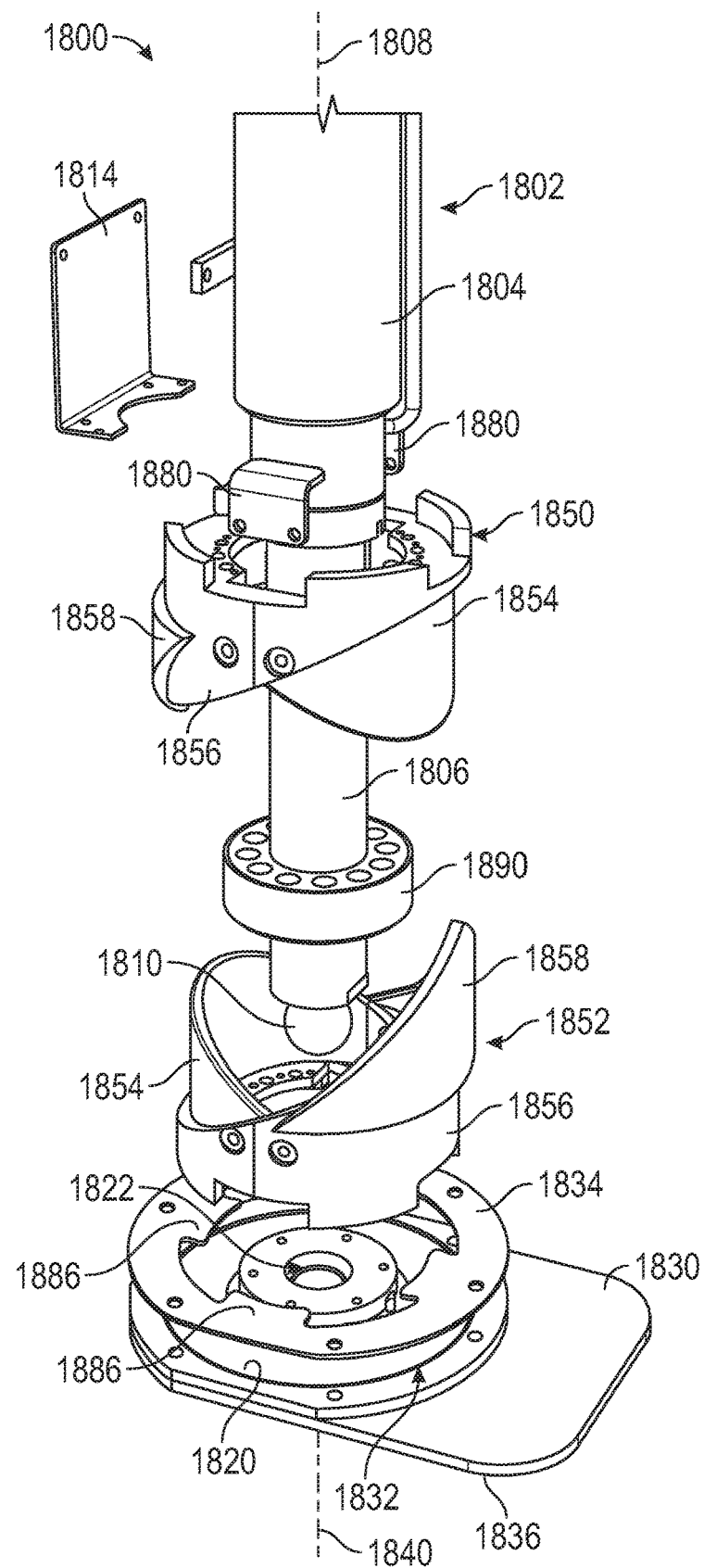
Figure 25:
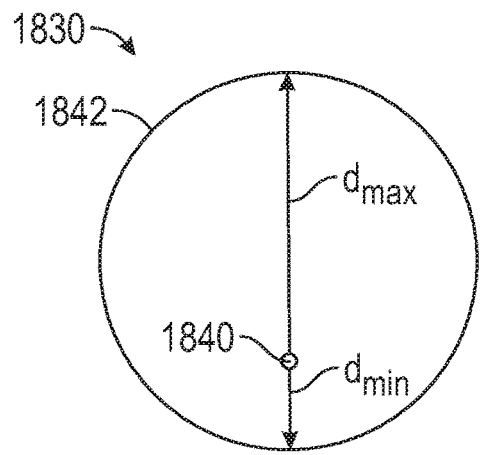
FIGS. 25-31 are top views of ground pads compatible with the actuator assembly of FIG. 22, according to various exemplary embodiments.
Figure 26:
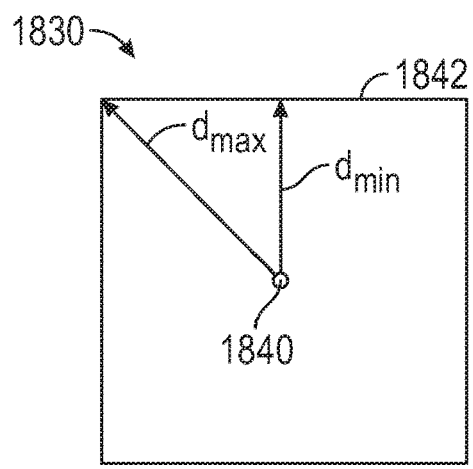
Figure 27:
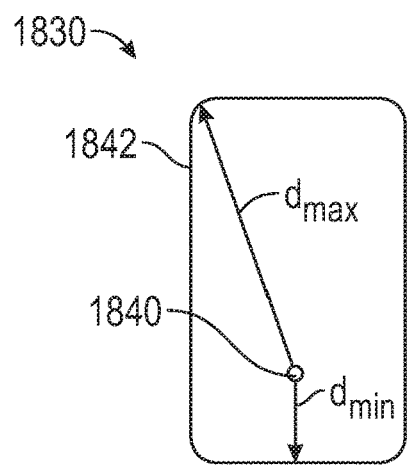
Figure 28:
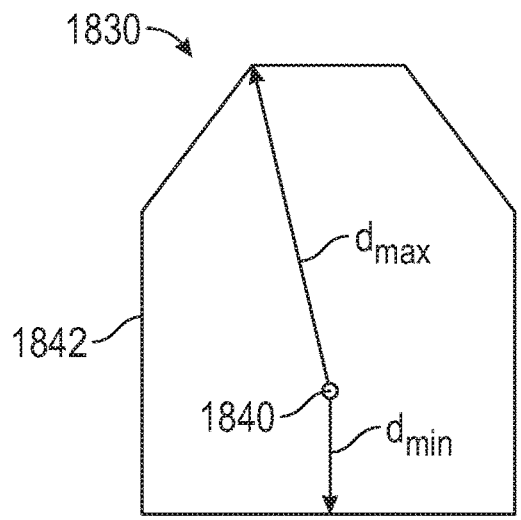
Figure 29:
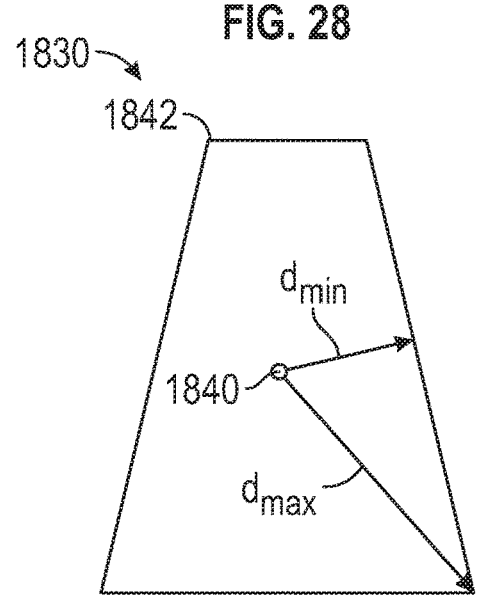
Figure 30:
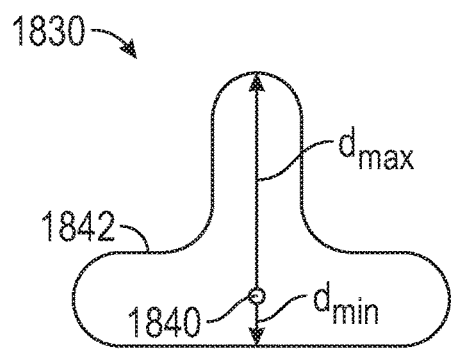
Figure 31:
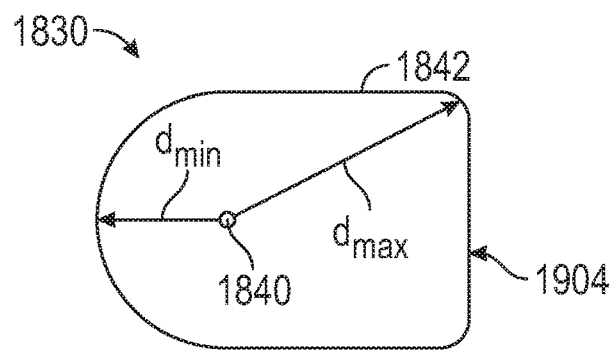
Figure 32:
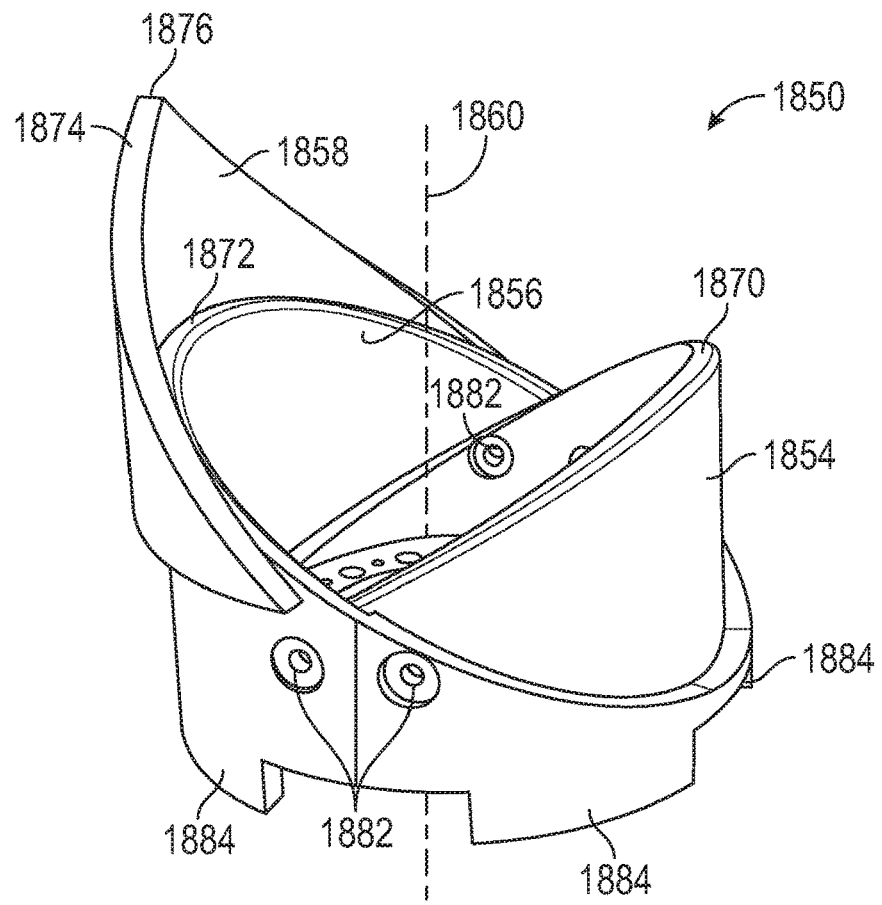
FIG. 32 is a perspective view of an alignment device of the actuator assembly of FIG. 22, according to an exemplary embodiment.

Referring to FIGS. 22-24, an actuator assembly 1800 is shown according to an exemplary embodiment. The actuator assembly 1800 is configured as an alternative to the second linear actuator, the foot 1754, and the ground pad 1756 of the second actuator assembly 1750. Specifically, the actuator assembly 1800 may extend within and be coupled to the actuator receiver 1752.

The actuator assembly 1800 includes a linear actuator assembly, shown as hydraulic cylinder 1802. The hydraulic cylinder 1802 includes a first member, shown as cylinder body 1804, and a second member, shown as cylinder rod 1806. The cylinder body 1804 defines an internal volume, into which the cylinder rod 1806 extends. The cylinder rod 1806 is configured to move linearly relative to the cylinder body 1804. A proximal end of the cylinder rod 1806 is coupled to a piston that divides the internal volume of the cylinder body 1804 into an extension volume and a retraction volume. A source of pressurized hydraulic fluid within the vehicle (e.g., a hydraulic pump) is selectively fluidly coupled (e.g., by one or more valves) to the extension volume or the retraction volume to extend or retract the hydraulic cylinder 1802, respectively. As the hydraulic cylinder 1802 extends or retracts, the cylinder rod 1806 translates along an axis of extension 1808 that extends through the center of the cylinder rod 1806. In other embodiments, the hydraulic cylinder 1802 is a linear actuator powered by air (e.g., pneumatic, etc.), electrically (e.g., by an alternating current, by a direct current, etc.), mechanically (e.g., a flywheel, etc.), or still another power source. As shown in FIGS. 22-24, the cylinder body 1804 and the cylinder rod 1806 each have a circular cross section. In other embodiments, the cylinder body 1804 and/or the cylinder rod 1806 are otherwise shaped.

An interface member or ball interface, shown as ball 1810, is fixedly coupled to a distal end portion of the cylinder rod 1806 opposite the cylinder body 1804. Accordingly, as the hydraulic cylinder 1802 extends or retracts, the ball 1810 moves down or up, respectively, relative to the first actuator assembly 102 and the chassis of the vehicle. The ball 1810 has a spherical curvature. In other embodiments, the ball 1810 is otherwise shaped (e.g., cylindrical).

The actuator assembly 1800 further includes a first mounting member, shown as block 1812, and a second mounting member, shown as plate 1814. The block 1812 and the plate 1814 are coupled to the cylinder body 1804. When the outriggers 1700 are assembled, the actuator assembly 1800 may be slid into the actuator receiver 1752. The block 1812 and the plate 1814 define apertures configured to receive fasteners. Fasteners may be extended through corresponding apertures in the actuator receiver 1752 and into the apertures of the block 1812 and the plate 1814 to couple the actuator assembly 1800 to the actuator receiver 1752.

The hydraulic cylinder 1802 is pivotably coupled to an interface member or intermediate member, shown as foot 1820. Specifically, the foot 1820 defines a recess, shown as receiver 1822. The receiver 1822 has a curvature corresponding to that of the ball 1810. Accordingly, the receiver 1822 is semispherical to facilitate receiving the ball 1810 therein. In some embodiments, the outrigger 1700 further includes one or more retainers (e.g., the retainers 1918) that are coupled to the foot 1820 and that extend along an upper surface of the ball 1810, containing the ball 1810 within the receiver 1822. This limits or prevents the risk of the foot 1820 separating from the hydraulic cylinder 1802 when the hydraulic cylinder 1802 is retracted. Accordingly, when the hydraulic cylinder 1802 is fully retracted, the foot 1820 is lifted above the support surface S and supported by the hydraulic cylinder 1802. Because the ball 1810 and receiver 1822 have matching curvatures, the foot 1820 is free to rotate about any axis relative to the cylinder rod 1806 (e.g., the axis of extension 1808, an axis perpendicular to the axis of extension 1808, etc.).

The foot 1820 is coupled to a weight distribution device or outrigger pad, shown as ground pad 1830. Specifically, the ground pad 1830 defines a recess, shown as receiver 1832, that is configured to receive the foot 1820. A retainer 1834 is coupled to the ground pad 1830 and extends along a top surface of the foot 1820, retaining the foot 1820 within the receiver 1832. In some embodiments, the ground pad 1830 is configured to rotate freely relative to the foot 1820. In other embodiments, the retainer 1834 and/or the ground pad 1830 limit or prevent rotation of the ground pad 1830 relative to the foot 1820. The ground pad 1830 has a bottom surface 1836 that is planar. Alternatively, the foot 1820 and the ground pad 1830 may be formed as a single piece. In such an embodiment, the receiver 1832 may be omitted, and the ground pad 1830 may define the receiver 1822.

When the hydraulic cylinder 1802 is extended, the ground pad 1830 moves downward until the bottom surface 1836 of the ground pad 1830 engages the support surface S. The hydraulic cylinder 1802 may then extend further, lifting the frame 12 upward. The ground pad 1830 spreads the force of the hydraulic cylinder 1802 (i.e., the portion of the weight of the fire apparatus 10 that is supported by the corresponding outrigger 1700) out over a large area, which reduces the pressure on the support surface S. Accordingly, the ground pad 1830 limits or prevents the outrigger 1700 from damaging and/or sinking into the support surface S when the outriggers 1700 lift the fire apparatus 10. Due to the shape of the ball 1810 and receiver 1822, the ground pad 1830 is free to rotate relative to the cylinder rod 1806. Accordingly, if the ground pad 1830 engages a support surface S that is not oriented perfectly perpendicular to the axis of extension 1808, the ground pad 1830 can freely rotate until the bottom surface 1836 is oriented parallel to the support surface S, facilitating support of the fire apparatus 10 on surfaces of various inclines. This rotation occurs automatically due to the force of the hydraulic cylinder 1802.

Conventional outrigger assemblies include a foot that is coupled to an actuator. A separate (i.e., uncoupled from the actuator) ground pad is placed on the ground beneath the foot, and the foot is lowered onto the ground pad to lift the vehicle. This ground pad is stored in the vehicle separately from the outrigger assembly and retrieved by an operator prior to use. The foot of a conventional outrigger assembly differs from the ground pad 1830 in that the conventional foot is considerably smaller than the ground pad 1830 to facilitate storage of the foot within the vehicle. Conventional vehicles do not include a ground pad coupled to an actuator. Because the ground pad 1830 is coupled to the hydraulic cylinder 1802, outrigger assemblies incorporating the actuator assembly 1800 can be lowered immediately without waiting for an operator to place a ground pad. Accordingly, the outrigger assemblies incorporating the actuator assembly 1800 require considerably less setup time than a conventional outrigger assembly. This is generally beneficial in all operating environments, as it reduces wasted time and frees operators to perform other tasks. This is also especially critical in emergency situations, such as evacuating a burning building, as the aerial assembly 500 may not be fully operable until the outriggers 1700 are deployed. Reducing the setup time of the fire apparatus 10 can result in getting firefighters to an emergency situation faster, saving lives.

Referring to FIGS. 22-31, the ground pad 1830 is configured to rotate relative to the hydraulic cylinder 1802 about an axis of rotation 1840 extending perpendicular to the bottom surface 1836. Specifically, the ground pad 1830 may rotate relative to the foot 1820, the ground pad 1830 and the foot 1820 may rotate relative to the cylinder rod 1806, and/or the ground pad 1830, the foot 1820, and the cylinder rod 1806 may rotate relative to the cylinder body 1804. FIGS. 25-31 show top views of various embodiments of the ground pad 1830. The ground pad 1830 is shaped and positioned such that a distance between an outer perimeter 1842 of the ground pad 1830 and the axis of rotation 1840 varies. The value of this distance is $d_{max}$ at its greatest and $d_{min}$ at its smallest. Because the ground pad 1830 is rotatable about the axis of rotation 1840 and $d_{min}$ is not equal to $d_{max}$, the ground pad 1830 may be rotated to avoid obstacles. By way of example, the fire apparatus 10 may park such that, with the outrigger 1700 fully extended, the ground pad 1830 is positioned near an obstacle, such as a large rock or curb, that is impractical to move away from the fire apparatus 10. The outrigger 1700 could be retracted partially to avoid the obstacle. However, this would reduce the stability of the fire apparatus. Instead, an operator may rotate the ground pad 1830 about the axis of rotation 1840 such that the portion of the ground pad 1830 corresponding to the distance $d_{min}$ is oriented toward the obstacle. Whereas the portion of the ground pad 1830 corresponding to the distance $d_{max}$ may have been large enough to contact the obstacle, the portion of the ground pad 1830 corresponding to the distance $d_{min}$ may avoid the obstacle. This configuration of the ground pad 1830 facilitates using the fire apparatus 10 in a greater variety of locations. Depending on the shape of the ground pad 1830 and the location of the axis of rotation 1840, the ratio of $d_{max}/d_{min}$ may be 1.25, 1.5, 2, 3, 5, or greater.

Referring to FIGS. 22-24 and 32, the actuator assembly 1800 further includes a first alignment assembly or first alignment device, shown as upper alignment assembly 1850, and a second alignment assembly or second alignment device, shown as lower alignment assembly 1852. The upper alignment assembly 1850 and the lower alignment assembly 1852 may be substantially identical. The upper alignment assembly 1850 and the lower alignment assembly 1852 each include a set of alignment devices: a first alignment member, shown as inner alignment member 1854, a second alignment member, shown as outer alignment member 1856, and a third alignment member, shown as offsetting member 1858. The inner alignment member 1854 and the offsetting member 1858 are each fixedly coupled to the outer alignment member 1856. In another embodiment, the actuator assembly 1800 additionally or alternatively includes a rotary actuator (e.g., a hydraulic actuator, a pneumatic actuator, etc.) configured to rotate the foot 1820 and the ground pad 1830 and a linear actuator (e.g., a hydraulic actuator, a pneumatic actuator, etc.) configured to lift and/or lower the foot 1820 and the ground pad 1830. A controller may selectively engage the rotary actuator to rotate the foot 1820 and the ground pad 1830 (e.g., into a storage orientation, into a use orientation, etc.) and thereafter selectively engage the linear actuator to lift and/or lower the foot 1820 and the ground pad 1830. In still another embodiment, the foot 1820 is coupled to one or more components of the actuator assembly 1800 with a plurality of linkages (e.g., in a four-bar linkage arrangement, etc.). An actuator (e.g., a rotary actuator, a linear actuator, etc.) may be engaged by a controller to selectively reposition the foot 1820 and the ground pad 1830 between a storage orientation and a use orientation. The foot 1820 and the ground pad 1830 may be positioned as shown in FIG. 22 when selectively repositioned into the use orientation. The foot 1820 and the ground pad 1830 may extend parallel to the axis of extension 1808 when selectively repositioned into the storage orientation (e.g., when viewed from the side, etc.).

Referring again to FIGS. 22-24 and 32, the inner alignment member 1854 and the outer alignment member 1856 are each tubular members having circular, annular cross sections. The inner alignment member 1854 and the outer alignment member 1856 are each concentrically aligned about an alignment axis 1860. The inner alignment member 1854 is smaller in diameter than the outer alignment member 1856 and is received within the outer alignment member 1856. The alignment axis 1860 of the upper alignment assembly 1850 is collinear with the axis of extension 1808. The alignment axis 1860 of the lower alignment assembly 1852 is collinear with the axis of rotation 1840. An upper surface of the inner alignment member 1854 defines a first engagement surface 1870. The first engagement surface 1870 lies substantially within a plane that intersects the alignment axis 1860. In some embodiments, this plane is angularly offset from the alignment axis 1860 by approximately 45 degrees. An upper surface of the outer alignment member 1856 defines a second engagement surface 1872. The second engagement surface 1872 lies substantially within a plane that intersects the alignment axis 1860. In some embodiments, this plane is angularly offset from the alignment axis 1860 by approximately 45 degrees. The inner alignment member 1854 and the outer alignment member 1856 are arranged in opposite angular orientations. Accordingly, the tallest section of first engagement surface 1870 is arranged diametrically opposite the tallest section of the second engagement surface 1872.

The offsetting member 1858 is formed from a rolled sheet of material and arranged such that the curvature of the offsetting member 1858 is centered about the alignment axis 1860. Were the offsetting member 1858 to be flattened, it would have a substantially triangular profile. The offsetting member 1858 defines a pair of third engagement surfaces 1874. The third engagement surfaces 1874 meet at an edge 1876 extending substantially perpendicular to the alignment axis 1860. The slopes of the first engagement surface 1870 and the second engagement surface 1872 (e.g., the change in height for a given angular displacement about the alignment axis 1860 along the surface) are substantially equal. The slopes of the third engagement surfaces 1874 are more greater than the slopes of the first engagement surface 1870 and the second engagement surface 1872. The offsetting member 1858 extends above both the inner alignment member 1854 and the outer alignment member 1856.

The upper alignment assembly 1850 is coupled to the cylinder body 1804. Specifically, a pair of brackets 1880 are coupled to and extend radially outward from the cylinder body 1804. The brackets 1880, the inner alignment member 1855, and the outer alignment member 1856 each define corresponding apertures 1882, through which fasteners extend to couple the upper alignment assembly 1850 to the cylinder body 1804. Accordingly, the upper alignment assembly 1850 is rotationally fixed relative to the cylinder body 1804.

The lower alignment assembly 1852 is coupled to the ground pad 1830. Specifically, the lower alignment assembly 1852 may be fastened to the foot 1820, which is in turn coupled to the ground pad 1830. Alternatively, the lower alignment assembly 1852 may be directly coupled to the ground pad 1830. The outer alignment member 1856 includes a series of projections 1884 that extend downward and define a series of slots therebetween. The retainer 1834 defines a series of projections 1886 that extend radially inward, defining a series of slots therebetween. The projections 1884 are received between the projections 1886 and vice versa, limiting or preventing rotation between the lower alignment assembly 1852 and the ground pad 1830.

Figure 33:
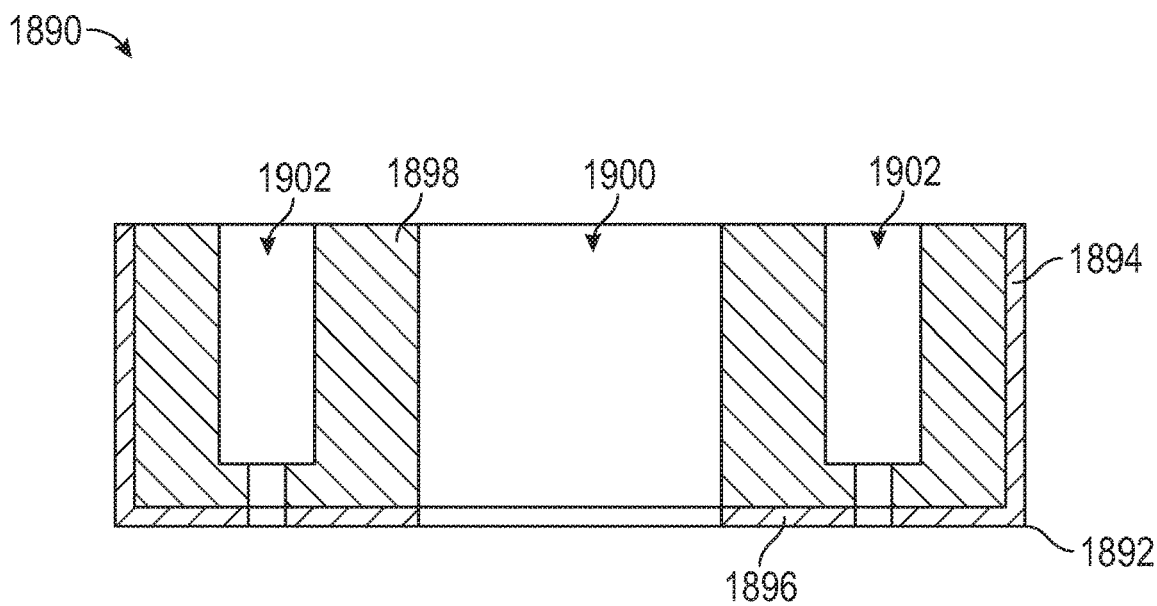
FIG. 33 is a side section view of a planar alignment device of the actuator assembly of FIG. 22, according to an exemplary embodiment.

Referring to FIGS. 23, 24, and 33, the actuator assembly 1800 further includes a biasing member assembly, shown as planar alignment device 1890. The planar alignment device 1890 includes an outer shell 1892 having a circumferential wall 1894 and a bottom wall 1896. The outer shell 1892 may be made from steel, aluminum, or another relatively inflexible material. Within the outer shell 1892, the planar alignment device 1890 further includes filler material, shown as spring section 1898, that is coupled to the outer shell 1892. The spring section 1898 is made from a material that is more flexible than the outer shell 1892, such as urethane rubber. An aperture 1900 extends through the center of the bottom wall 1896 and the spring section 1898 such that the planar alignment device 1890 is annular. The cylinder rod 1806 extends through the aperture 1900. In some embodiments, the aperture 1900 is sized to be substantially the same size and shape as or slightly larger than the outside surface of the cylinder rod 1806. A series of apertures 1902 extend through the bottom wall 1896 and the spring section 1898. The apertures 1902 are arranged in a circular pattern centered around the aperture 1900. Some of the apertures 1902 may have a constant size throughout planar alignment device 1890. Others of the apertures 1902 decrease in size near the bottom wall 1896, forming a counterbore configured to engage the head of a fastener. The planar alignment device 1890 is coupled to a top surface of the foot 1820. By way of example, a series of fasteners may pass through the apertures 1902 and into corresponding threaded apertures in the foot 1820.

The planar alignment device 1890 is configured to bias the foot 1820 and the ground pad 1830 to an orientation in which the planar alignment device 1890 extends parallel to the axis of extension 1808 and the bottom surface 1836 is perpendicular to the axis of extension 1808, referred to herein as a planar or unbiased orientation. When the ground pad 1830 is moved out of the unbiased orientation, the foot 1820 imparts a moment on the planar alignment device 1890, which forces the spring section 1898 against the rod 1906. This causes the spring section 1898 to deform, which is resisted by the flexible material of the spring section 1898. The spring section 1898 accordingly imparts a biasing force on the cylinder rod 1806 and the foot 1820, which results in a biasing torque on the ground pad 1830 that biases the ground pad 1830 toward the unbiased orientation. In the unbiased orientation, the planar alignment device 1890 imparts no biasing force or a minimal biasing force on the foot 1820. The planar alignment device 1890 does not impart a substantial biasing force on the ground pad 1830 when the ground pad 1830 is rotated solely about the axis of extension 1808, as this motion does not deform the spring section 1898. The size, shape, and quantity of the apertures 1902 as well as the size, shape, and flexibility (e.g., durometer) of the spring section 1898 may be varied to vary the spring response (e.g., the resistance to deformation) of the planar alignment device 1890.

Figure 34:
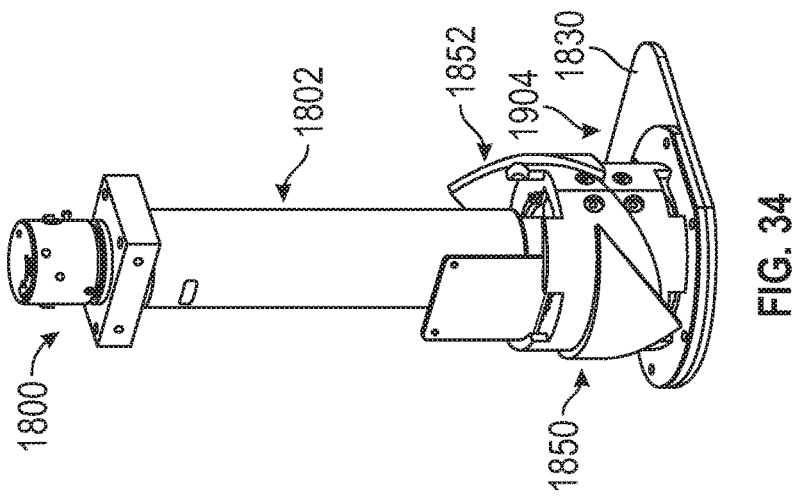

FIGS. 34-42, when taken together, illustrate an exemplary operational sequence of the outrigger assembly. In FIG. 34, the hydraulic cylinder 1802 is fully retracted (i.e., in a retracted position or raised position). In this position, the first engagement surfaces 1870 engage one another along substantially their entire lengths, and the second engagement surfaces 1872 engage one another along substantially their entire lengths. This holds the ground pad 1830 in an unbiased orientation, specifically an unbiased orientation in which the ground pad 1830 extends toward a longitudinal centerline of the fire apparatus 10. This orientation is referred to herein as the storage orientation of the ground pad 1830. While in the storage orientation, the ground pad 1830 protrudes minimally laterally outward, limiting or preventing the risk of the ground pad 1830 increasing the overall width of the vehicle. Accordingly, in the storage orientation, the portion of the ground pad 1830 corresponding to the dimension $d_{min}$ may be oriented laterally outward. As a secondary consideration, the ground pad 1830 may also be oriented to protrude minimally longitudinally forward or rearward, facilitating moving the ground pad 1830 laterally inward without interfering with other components of the fire apparatus 10. By way of example, an end 1904 of the ground pad 1830 shown in FIGS. 31 and 34 may be oriented toward a longitudinal centerline of the fire apparatus 10. This orientation minimizes the portion of the ground pad 1830 extending laterally outward and minimizes the portions of the ground pad extending longitudinally forward or rearward.

When both the hydraulic cylinder 1708 and the hydraulic cylinder 1802 are fully retracted, the ground pad 1830 is positioned in a storage position. In the storage position, the ground pad 1830 is both as high as possible and as close to a longitudinal centerline of the fire apparatus 10 as possible. The ground pad 1830 may be moved out of the storage position by extending the hydraulic cylinder 1708 and/or the hydraulic cylinder 1802.

Figure 36:
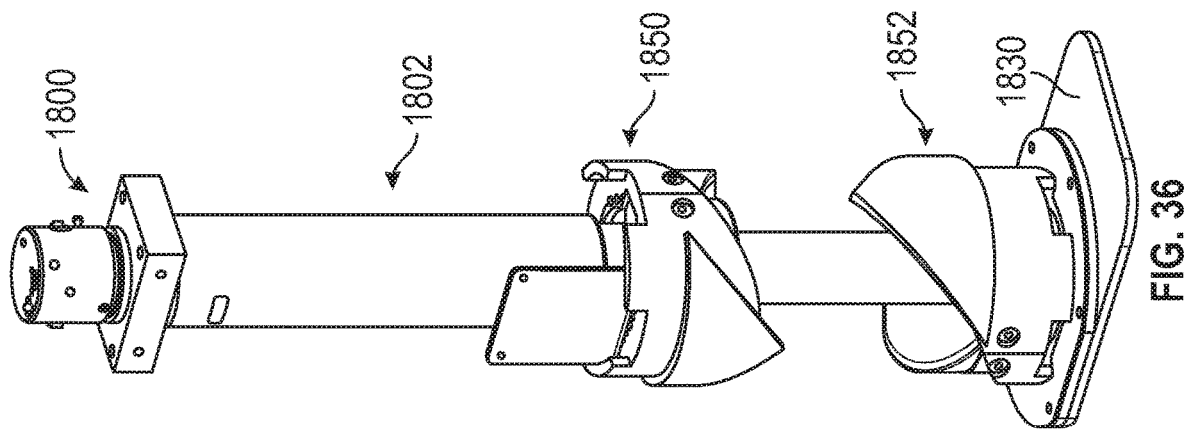
FIGS. 34-42 are perspective views of the actuator assembly of FIG. 22 at various points throughout an exemplary operational sequence.
Figure 35:
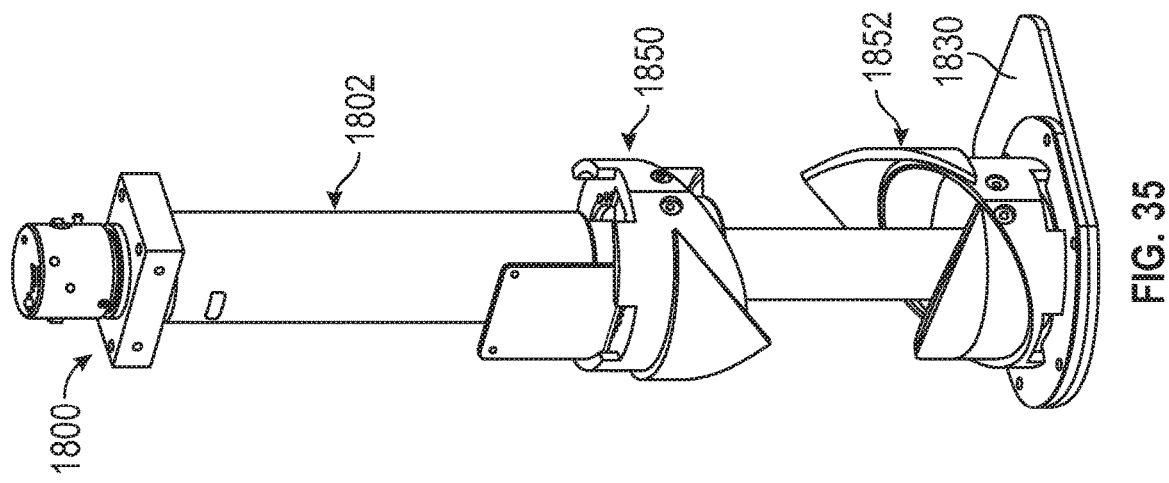
Figure 37:
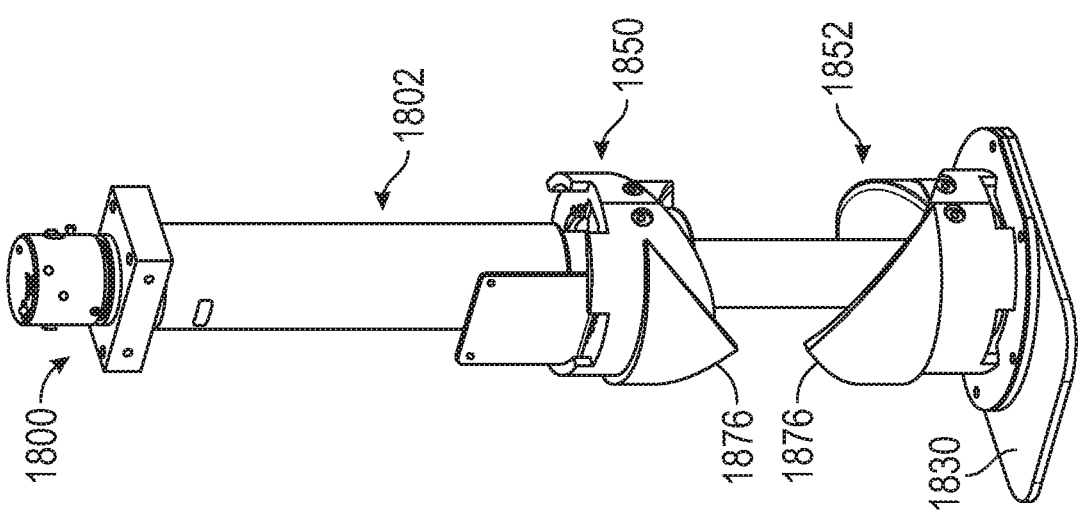

Referring to FIGS. 35-37, the actuator assembly 1800 is shown with the hydraulic cylinder 1802 in a partially extended position. With the hydraulic cylinder 1802 in the partially extended configuration, the lower alignment assembly 1852 is spaced away from the upper alignment assembly 1850 such that the ground pad 1830 can be rotated freely about the axis of rotation 1840 by an operator to avoid any obstacles on the support surface S. In some embodiments, the planar alignment device 1890 imparts a frictional force on the cylinder rod 1806, limiting or preventing the risk of unintentional rotation of the ground pad 1830 until a threshold torque is applied to the ground pad 1830. FIGS. 35-37 show the ground pad 1830 rotated about the axis of extension 1808 into various orientations. In some embodiments, the ground pad 1830 is rotatable a full 360 degrees about the axis of extension 1808. Once the operator is satisfied with the orientation of the ground pad 1830, the hydraulic cylinder 1802 may be further extended to a lifting position or lowered position in which the ground pad 1830 engages the support surface S and the hydraulic cylinder 1802 lifts the vehicle. If the support surface S is not perpendicular to the axis of extension 1808, the ground pad 1830 may rotate about an axis oriented perpendicular to the axis of extension 1808, deforming the planar alignment device 1890.

Referring to FIGS. 38-42, in order to return the ground pad 1830 to the storage position, the hydraulic cylinder 1802 is retracted toward the retracted position, lifting the ground pad 1830. As the ground pad 1830 is lifted out of contact with the support surface S, the planar alignment device 1890 biases the ground pad 1830 toward an unbiased orientation in which the planar alignment device 1890 is minimally deformed. When the hydraulic cylinder 1802 is retracted, the upper alignment assembly 1850 and the lower alignment assembly 1852 engage one another and force the ground pad 1830 to rotate about the axis of extension 1808 toward the storage orientation. The portions of the upper alignment assembly 1850 and the lower alignment assembly 1852 that contact each other vary depending on the orientation of the ground pad 1830 prior to the hydraulic cylinder 1802 being retracted. However, the upper alignment assembly 1850 and the lower alignment assembly 1852 are configured to return the ground pad 1830 to the storage orientation regardless of the orientation of the ground pad 1830 prior to the hydraulic cylinder 1802 being retracted.

Figure 39:
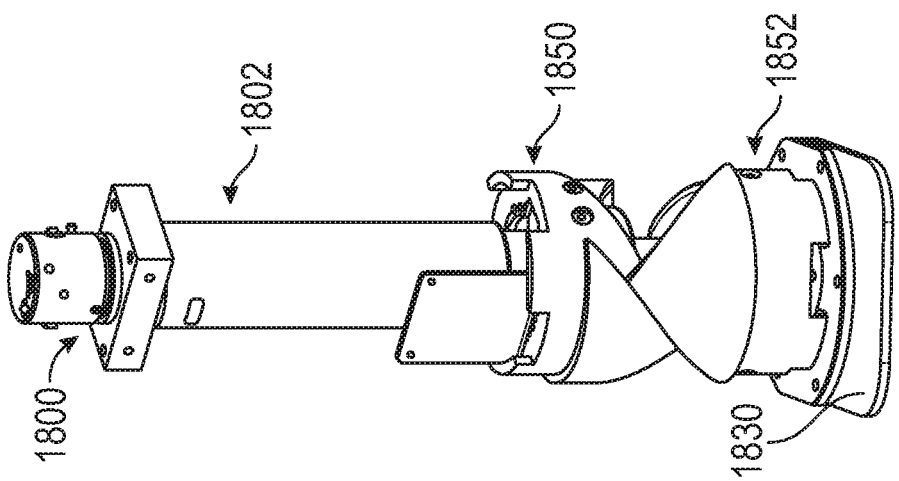
Figure 38:
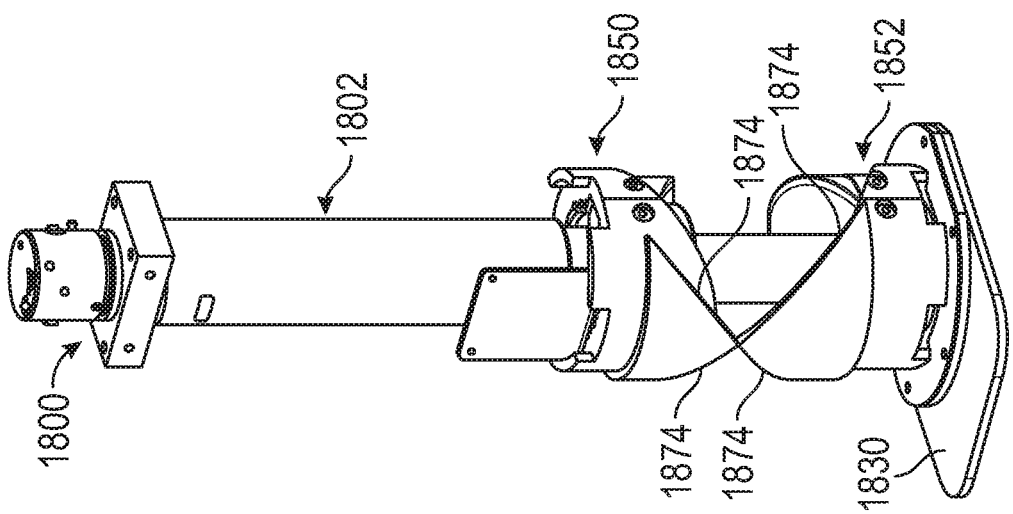
Figure 40:
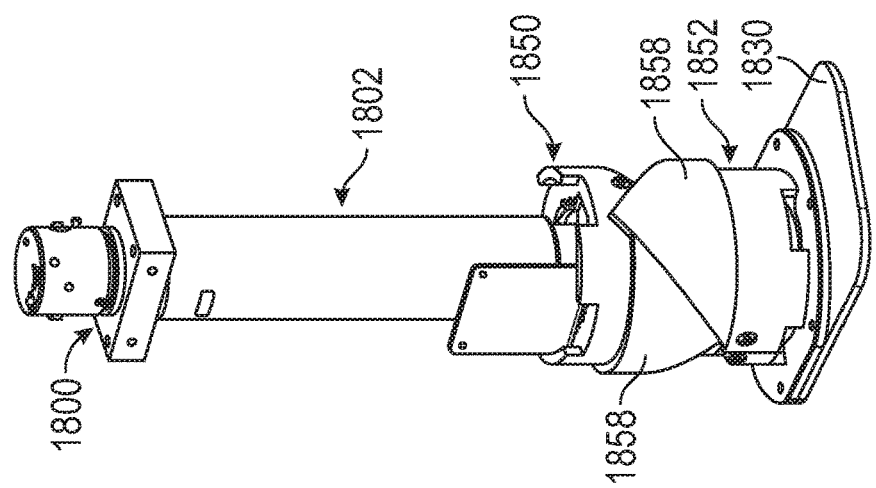

In the situation shown in FIG. 37, the ground pad 1830 begins the retraction process in an orientation that is directly opposite (i.e., offset 180 degrees from) the storage orientation. In this orientation, the edges 1876 are substantially aligned with one another. As the hydraulic cylinder 1802 is retracted, the first parts of the upper alignment assembly 1850 and the lower alignment assembly 1852 to come into contact are the edges 1876. Because both of the edges 1876 come to a point, the edge 1876 of the lower alignment assembly 1852 deflects away from the edge 1876 of the upper alignment assembly 1850 when the upper alignment assembly 1850 and the lower alignment assembly 1852 engage one another. The pointed configuration of the edges 1876 limits or prevents the risk of the upper alignment assembly 1850 and the lower alignment assembly 1852 locking against one another and not rotating. As shown in FIGS. 38-40, as the hydraulic cylinder 1802 is retracted further, one of the third engagement surfaces 1874 of the upper alignment assembly 1850 engages one of the third engagement surfaces 1874 of the lower alignment assembly 1852. Because the third engagement surfaces 1874 are angled, further retraction of the hydraulic cylinder 1802 causes the third engagement surfaces 1874 to impart a moment on the ground pad 1830 about the axis of rotation 1840, causing the ground pad 1830 to rotate toward the storage orientation.

Figure 42:
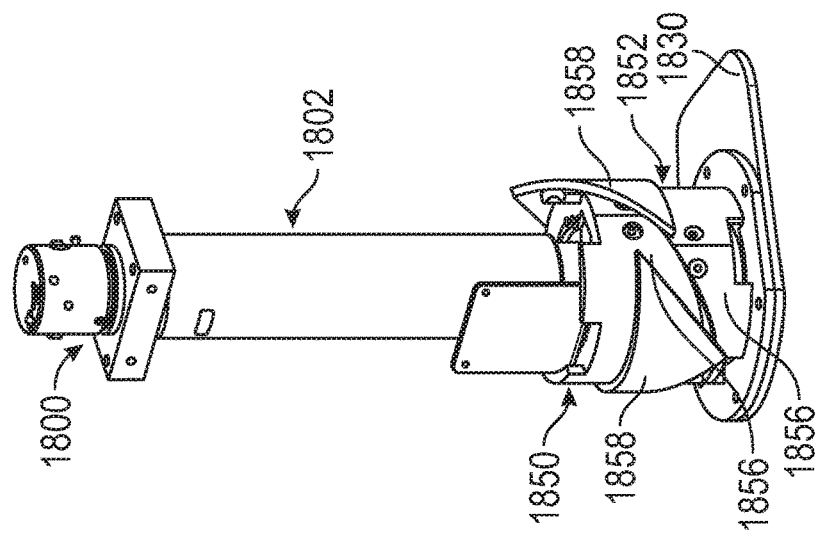
Figure 41:
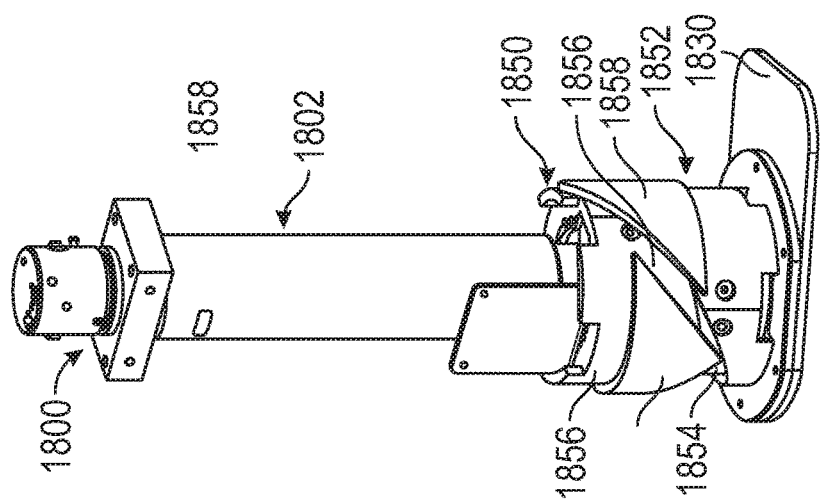

Referring to FIG. 40, as the hydraulic cylinder 1802 retracts further, the first engagement surfaces 1870 come into contact with one another and the second engagement surfaces 1872 come into contact with one another. Because the first engagement surfaces 1870 and the second engagement surfaces 1872 are angled, further retraction of the hydraulic cylinder 1802 causes the first and second engagement surfaces to impart a moment on the ground pad 1830 about the axis of rotation 1840, causing the ground pad 1830 to rotate toward the storage orientation. The slopes of the first engagement surfaces 1870 and the second engagement surfaces 1872 are substantially equal. This facilitates imparting equal force on the ground pad 1830 on both sides of the ball 1810, limiting or preventing the ground pad 1830 from being rotated out of the unbiased orientation. Additionally, the first engagement surfaces 1870 and the second engagement surfaces 1872 are both more shallowly angled (i.e., have shallower slopes, provide a greater rotation of the ground pad 1830 for a given amount of retraction of the hydraulic cylinder 1802) than the third engagement surfaces 1874. As shown in FIGS. 41 and 42, this causes the offsetting members 1858 to rotate away from one another, which limits or prevents the risk of the offsetting members 1858 engaging one another and interfering with the rotation driven by the first engagement surfaces 1870 and the second engagement surfaces 1872. After further retraction, the ground pad 1830 is again rotated into the storage orientation.

A similar process occurs when the hydraulic cylinder 1802 is retracted with the ground pad 1830 in a different orientation. By way of example, were the hydraulic cylinder 1802 to be retracted with the ground pad 1830 in the orientation shown in FIG. 36, the upper alignment assembly 1850 and the lower alignment assembly 1852 would first engage one another as shown in FIG. 40, essentially skipping the first portion of the reorienting process. Accordingly, the upper alignment assembly 1850 and the lower alignment assembly 1852 function with the ground pad 1830 in any orientation, skipping more of the reorienting process as the ground pad 1830 starts closer to the storage orientation. If the ground pad 1830 starts in the storage orientation prior to retraction of the hydraulic cylinder 1802, the upper alignment assembly 1850 and the lower alignment assembly 1852 do not reorient the ground pad 1830.

Figure 43:
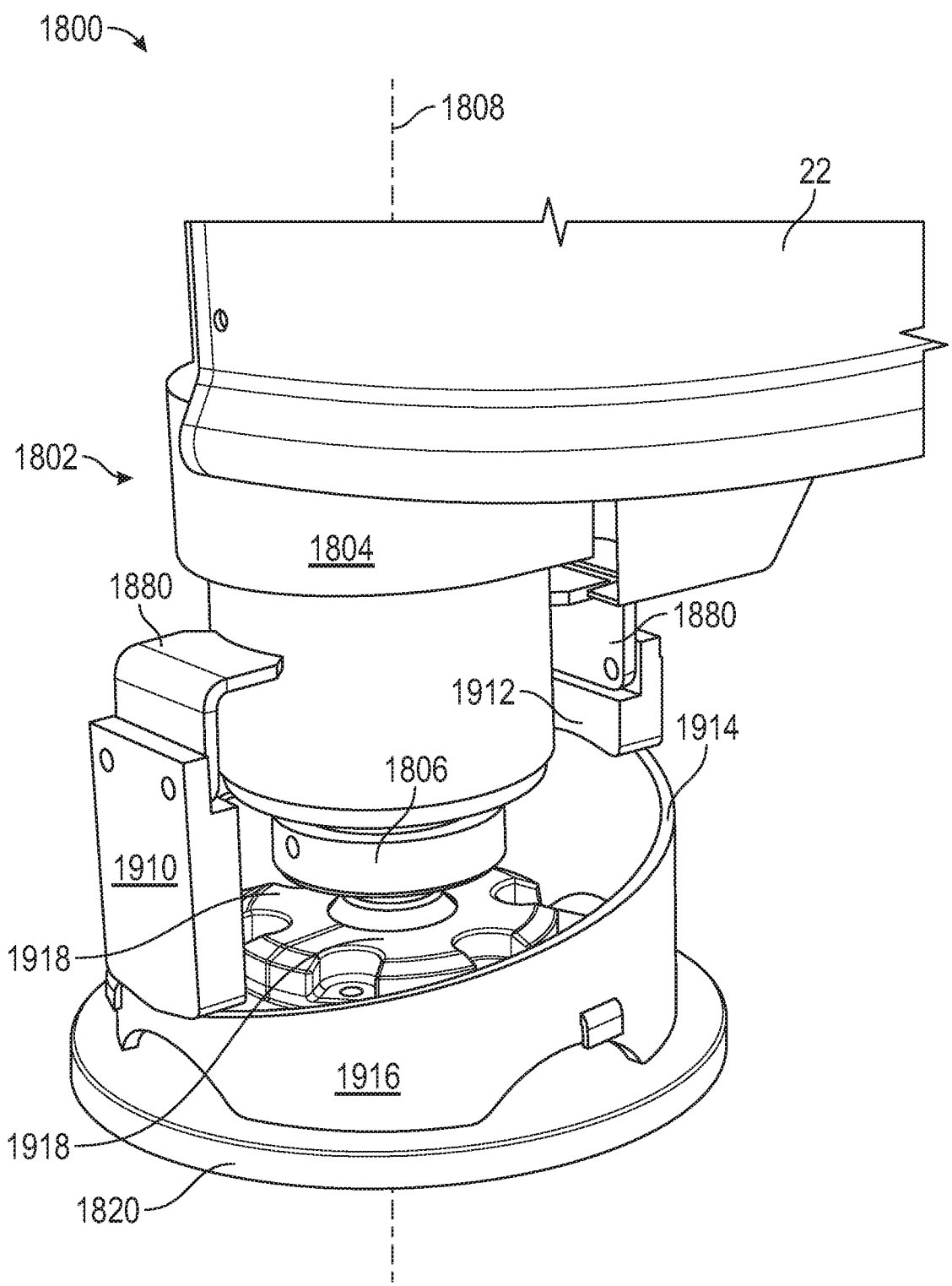
FIG. 43 is a perspective view of an actuator assembly of a downrigger of the mid-mount fire apparatus of FIG. 1 in a retracted position, according to another exemplary embodiment.
Figure 44:
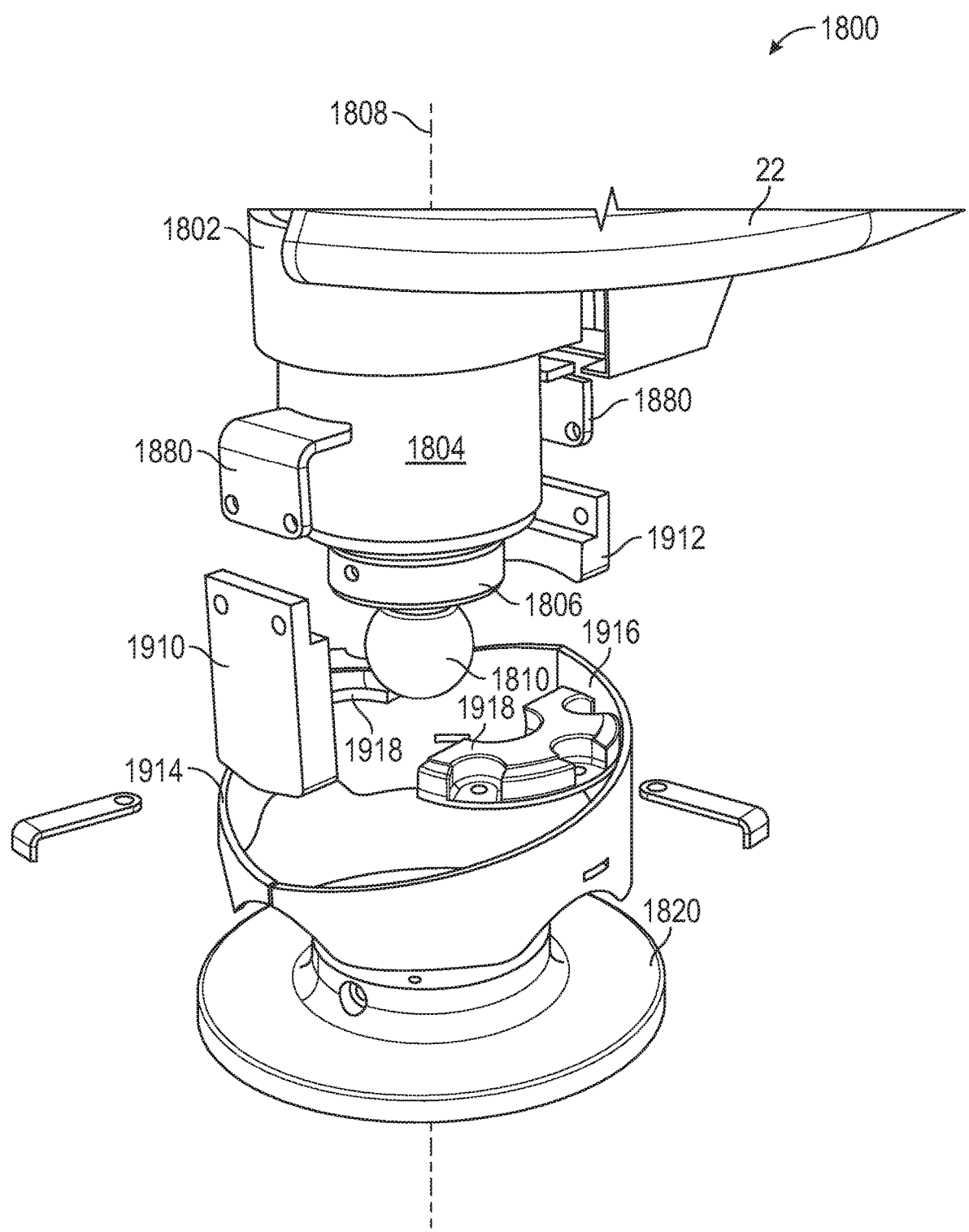
FIG. 44 is a perspective view of the actuator assembly of FIG. 43 in a lifting position.

Referring to FIGS. 43 and 44, the actuator assembly 1800 is shown according to an alternative embodiment. In this embodiment, the upper alignment assembly 1850 is omitted and replaced with a first alignment block 1910 and a second alignment block 1912. The first alignment block 1910 and the second alignment block 1912 are coupled to the bracket 1880. The first alignment block 1910 and the second alignment block 1912 are configured to engage an engagement surface 1914 of an alignment member 1916. The alignment member 1916 may be substantially similar to the inner alignment member 1854. The first alignment block 1910 is longer than the second alignment block 1912. The first alignment block 1910 and the second alignment block 1912 are diametrically opposed. Accordingly, the first alignment block 1910 and the second alignment block 1912 are configured to cooperate to rotate the foot 1820 into a storage orientation, similar to the upper alignment assembly 1850 and the lower alignment assembly 1852. The foot 1820 may be coupled to a ground pad 1830 such that rotation of the foot 1820 causes a corresponding rotation of the ground pad 1830. In this embodiment, the actuator assembly 1800 further includes a pair of retainers 1918 that couple to the foot 1820 and extend along an upper surface of the ball 1810, retaining the ball 1810 within the receiver 1822.

In the embodiment shown in FIGS. 43 and 44, the cylinder body 1804 is coupled to the front bumper 22 of the fire apparatus 10. The axis of extension 1808 is oriented vertically, and the actuator assembly is not actuated laterally by another actuator assembly. Accordingly, the actuator assembly 1800 acts as a downrigger in this embodiment instead of as part of an outrigger. Each of the actuator assemblies described herein may be incorporated into an outrigger (e.g., the outrigger 1700) or a downrigger (e.g., a front downrigger 1500, a rear downrigger 1600).

Figure 45:
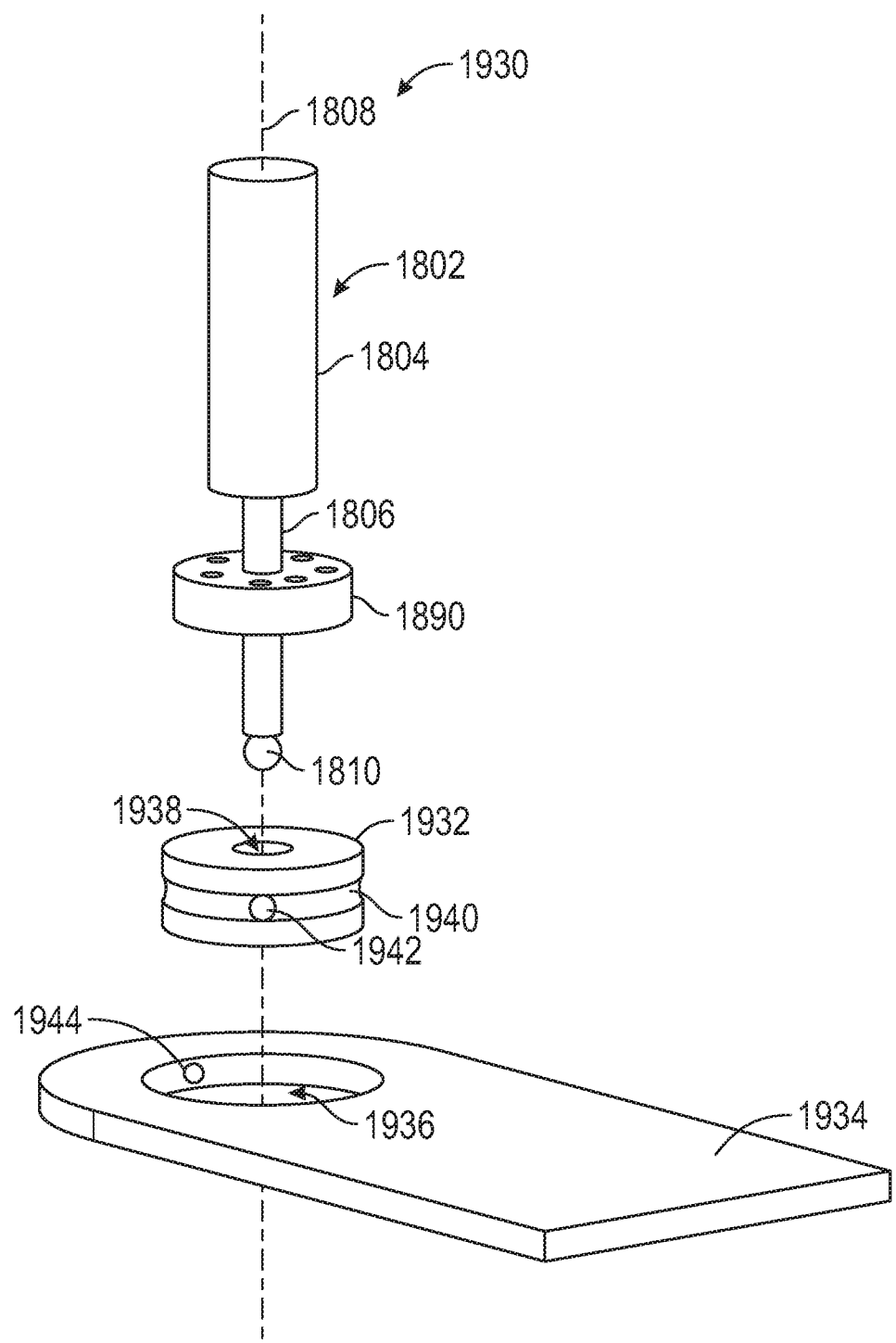
FIG. 45 is an exploded view of an actuator assembly of an outrigger of the mid-mount fire apparatus of FIG. 1, according to yet another exemplary embodiment.
Figure 46:
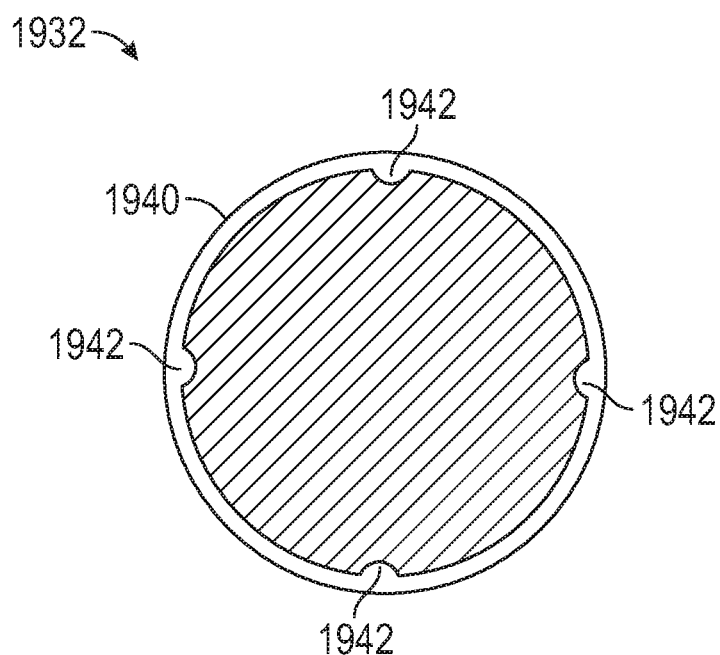
FIG. 46 is a top section view of a foot of the actuator assembly of FIG. 45, according to an exemplary embodiment.
Figure 47:
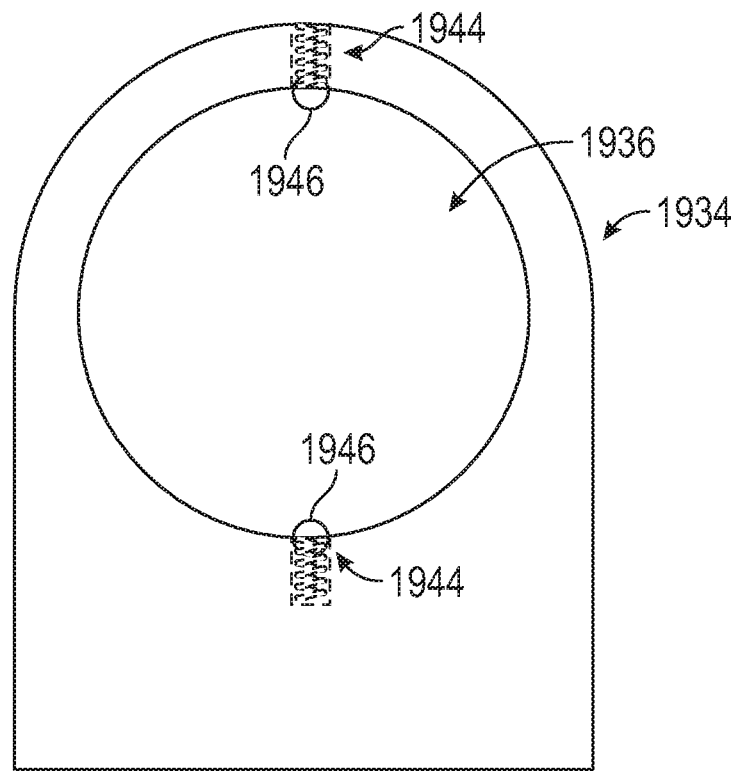
FIG. 47 is a top view of a ground pad of the actuator assembly of FIG. 45, according to an exemplary embodiment.

In other alternative embodiments, the upper alignment assembly 1850 and the lower alignment assembly 1852 are omitted, and an operator manually rotates the ground pad 1830 back into the storage orientation prior to moving the ground pad 1830 into the storage position. Referring to FIGS. 45-47, an actuator assembly 1930 is shown according to an exemplary embodiment. The actuator assembly 1930 may be substantially similar to the actuator assembly 1800 except as specified herein. In this embodiment, the foot 1820 is replaced with a foot 1932 and the ground pad 1830 is replaced with a ground pad 1934. The foot 1932 is received within a recess 1936 defined by the ground pad 1934. The foot 1932 and the recess 1936 are both substantially cylindrical to facilitate rotation of the ground pad 1934 relative to the foot 1932. The foot 1932 further defines a receiver 1938 substantially similar to the receiver 1822. The planar alignment device 1890 is coupled to a top surface of the foot 1932. The foot 1932 and/or the planar alignment device 1890 are configured to limit or prevent rotation of the foot 1932 relative to the cylinder rod 1806. By way of example, the aperture 1900 of the planar alignment device 1890 may be sized as a press fit to the cylinder rod 1806.

The foot 1932 defines a groove 1940 extending circumferentially along an outer surface of the foot 1932. The groove 1940 has a semicircular cross sectional curvature. At regular intervals along the groove 1940, the foot 1932 further defines a series of recesses, shown as notches 1942. Specifically, as shown in FIG. 46, the foot 1932 defines four notches 1942 arranged in diametrically opposed pairs. A pair of ball detents 1944 are coupled to the ground pad 1934 along the circumference of the recess 1936. Specifically, the ball detents 1944 are arranged diametrically opposed to one another. Each ball detent 1944 includes a ball bearing 1946 that is spherical and biased toward the center of the recess 1936 (e.g., by a compression spring, etc.). Once assembled, the ball bearings 1946 ride within the groove 1940, limiting or preventing the risk of the ground pad 1934 becoming separated from the foot 1932. The spherical shapes of the ball bearings 1946 facilitate rotation of the ball bearings 1946, thereby facilitating rotation of the ground pad 1934 relative to the foot 1932.

When the ground pad 1934 is rotated such that one or more of the ball detents 1944 are aligned with one or more of the notches 1942, the ball bearings 1946 are biased into the corresponding notches 1942. The engagement of the ball bearings 1946 holds the ground pad 1934 in place relative to the foot 1932 until a threshold torque is applied to the ground pad 1934. Once the threshold torque is applied, the ball bearings 1946 are forced out of the corresponding notches 1942, and ground pad 1934 is once again free to rotate. As shown, the ground pad 1934 is coupled to two ball detents 1944 offset 180 degrees from one another, and the foot 1932 defines four notches 1942, each offset from one another by 90 degrees. Accordingly, the ground pad 2030 is held in four different orientations, with both ball detents 1944 engaging notches 1942 in each orientation. In other embodiments, the actuator assembly 1930 includes more or fewer ball detents 1944 and/or notches 1942 that are arranged in various ways, thereby varying the number of orientations in which the ball detents 1944 engage the notches 1942.

In operation, the ground pad 1934 may normally be left in the storage orientation. In instances where the ground pad 1934 will not contact an obstacle, the ground pad 1934 may be left in the storage orientation. In instances where the ground pad 1934 requires a different orientation to avoid an obstacle, an operator may apply a torque to the ground pad 1934 until the ground pad 1934 is in the desired orientation. When moving the outrigger assemblies back into a storage position, the operator may then manually apply a torque to the ground pad 1934 until the ground pad 1934 is in the storage orientation.

Figure 48:
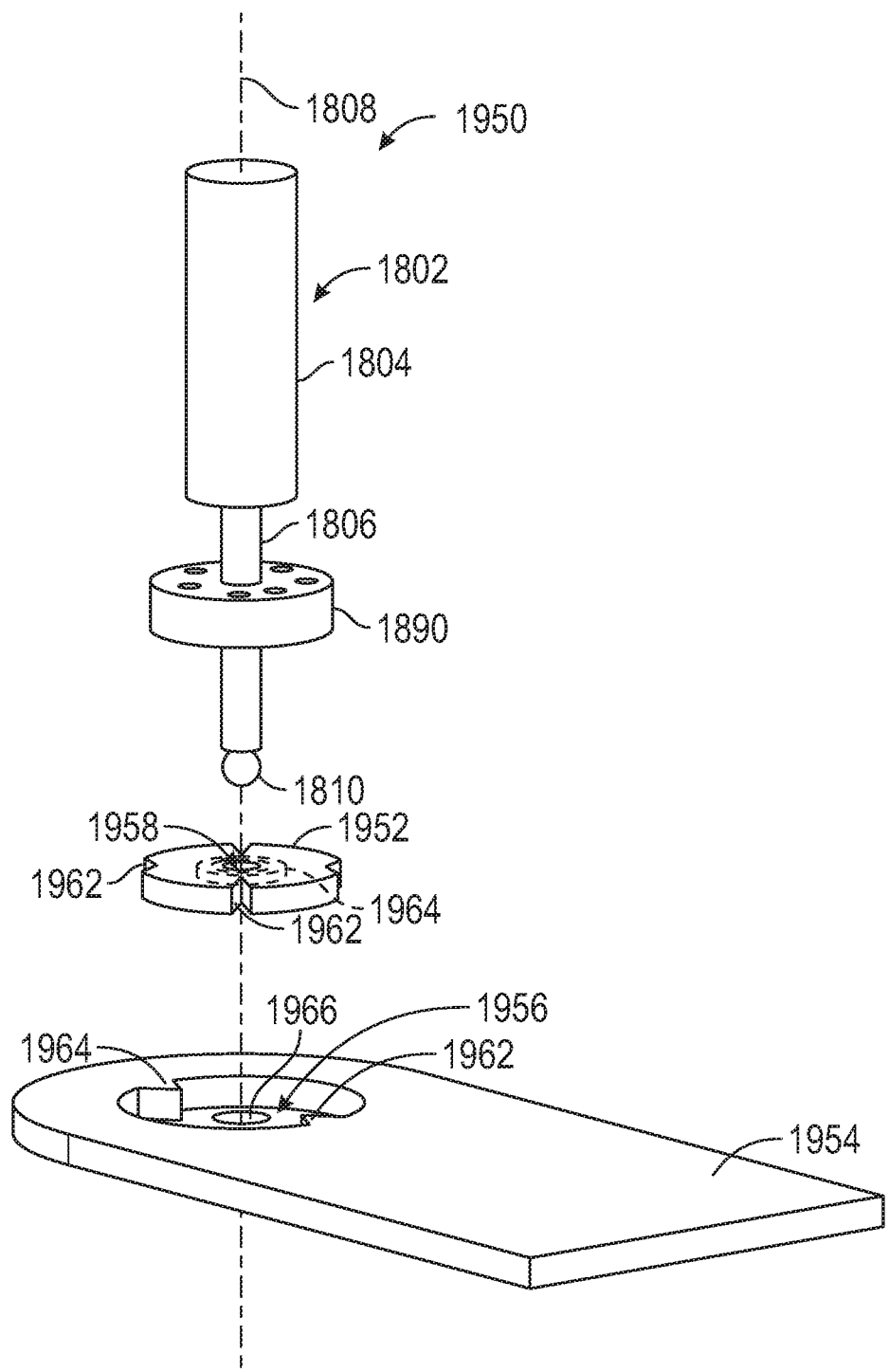
FIG. 48 is an exploded view of an actuator assembly of an outrigger of the mid-mount fire apparatus of FIG. 1, according to yet another exemplary embodiment.
Figure 49:
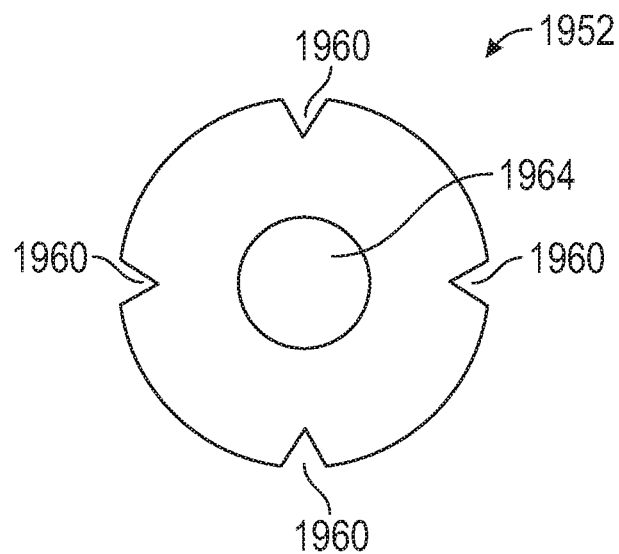
FIG. 49 is a bottom view of a foot of the actuator assembly of FIG. 48, according to an exemplary embodiment.
Figure 50:
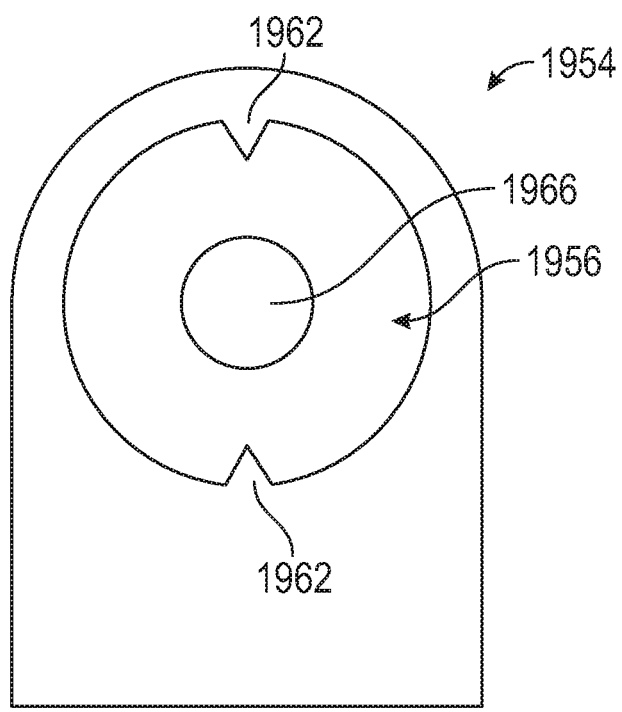
FIG. 50 is a top view of a ground pad of the actuator assembly of FIG. 48, according to an exemplary embodiment.

Referring to FIGS. 48-50, an actuator assembly 1950 is shown according to an exemplary embodiment. The actuator assembly 1950 may be substantially similar to the actuator assembly 1800 except as specified herein. In this embodiment, the foot 1820 is replaced with a foot 1952 and the ground pad 1830 is replaced with a ground pad 1954. The foot 1952 is received within a recess 1956 defined by the ground pad 1954. The foot 1952 further defines a receiver 1958 substantially similar to the receiver 1822. The planar alignment device 1890 is coupled to a top surface of the foot 1952. The foot 1952 and/or the planar alignment device 1890 are configured to limit or prevent rotation of the foot 1952 relative to the cylinder rod 1806. By way of example, the aperture 1900 of the planar alignment device 1890 may be sized as a press fit to the cylinder rod 1806.

The foot 1952 defines a series of recesses, shown as notches 1960, positioned along a circumference of the foot 1952. As shown in FIG. 49, the foot 1952 defines four notches 1960 each arranged in diametrically opposed pairs. The ground pad 1954 defines a series of protrusions 1962 that extend radially inward into the recess 1956. The protrusions 1962 are sized and shaped to fit into the notches 1960 and engage the foot 1952. When the protrusions 1962 extend into the notches 1960, the ground pad 1954 is limited or prevented from rotating relative to the foot 1952.

The actuator assembly 1950 further includes a first magnet 1964 and a second magnet 1966. The first magnet 1964 is fixedly coupled to the foot 1952. The foot 1952 may define a recess that receives the first magnet 1964 such that the first magnet 1964 is arranged substantially flush with a bottom surface of the foot 1952. The second magnet 1966 is fixedly coupled to the ground pad 1954. The ground pad 1954 may define a recess that receives the second magnet 1966 such that the second magnet 1966 is arranged substantially flush with a top surface of the ground pad 1954. Both the first magnet 1964 and the second magnet 1966 are positioned along the axis of extension 1808, and consequently, near the center of the recess 1956. The first magnet 1964 and the second magnet 1966 are configured to hold the foot 1952 within the recess 1956 such that the protrusions 1962 enter the notches 1960.

In operation, the ground pad 1954 may normally be left in the storage orientation. In instances where the ground pad 1954 will not contact an obstacle, the ground pad 1954 may be left in the storage orientation. In instances where the ground pad 1954 requires a different orientation to avoid an obstacle, an operator may apply a downward force onto the ground pad 1954, breaking the hold of the first magnet 1964 and the second magnet 1966 and removing the foot 1952 from the recess 1956. The operator may then reorient the ground pad 1954 into an orientation in which both (a) the ground pad 1954 avoids the obstacle and (b) the protrusions 1962 align with notches 1960. The operator may then insert the foot 1952 into the recess 1956 until the first magnet 1964 and the second magnet 1966 pull the ground pad 1954 back into contact with the foot 1952. When moving the outrigger 1700 back into a storage position, the operator may follow a similar process to move the ground pad 1954 back into the storage orientation.

Figure 51:
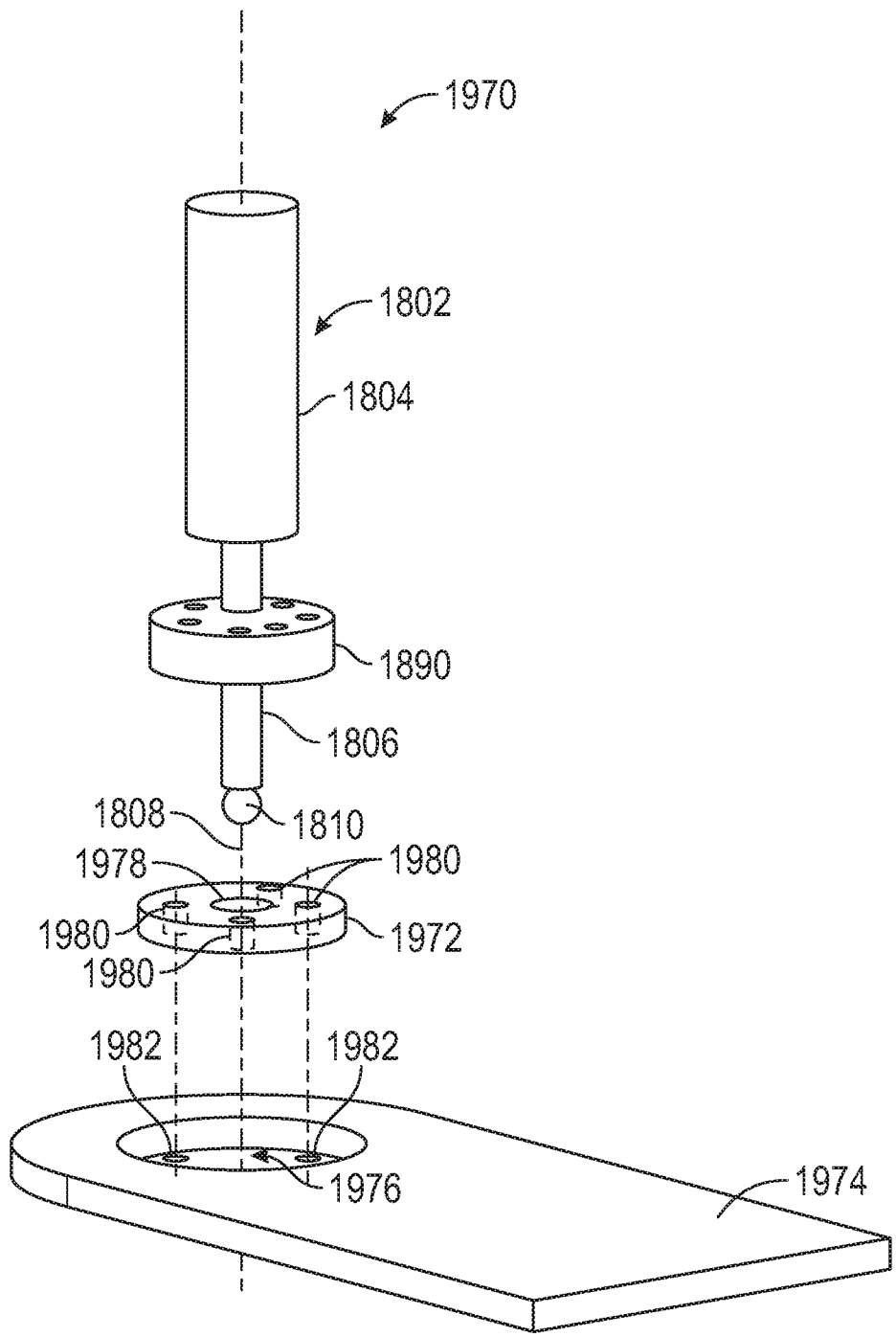
FIG. 51 is an exploded view of an actuator assembly of an outrigger of the mid-mount fire apparatus of FIG. 1, according to yet another exemplary embodiment.
Figure 52:
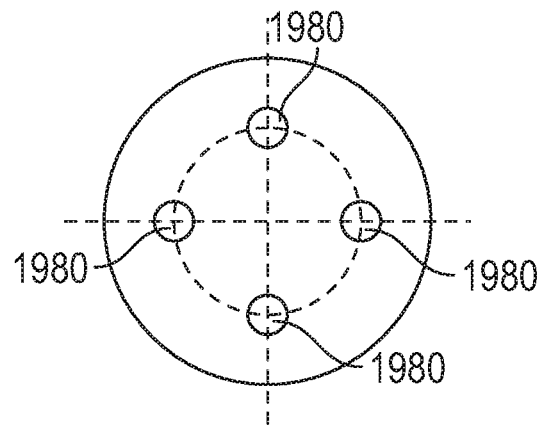
FIG. 52 is a bottom view of a foot of the actuator assembly of FIG. 51, according to an exemplary embodiment.
Figure 53:
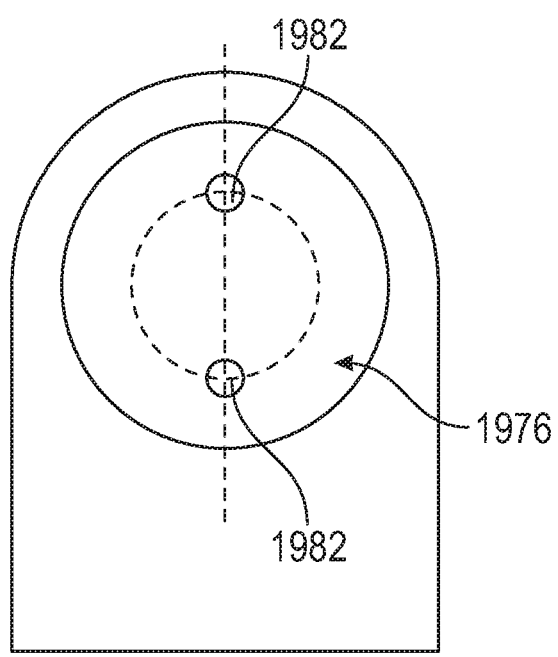
FIG. 53 is a top view of a ground pad of the actuator assembly of FIG. 51, according to an exemplary embodiment.

Referring to FIGS. 51-53, an actuator assembly 1970 is shown according to an exemplary embodiment. The actuator assembly 1970 may be substantially similar to the actuator assembly 1800 except as specified herein. In this embodiment, the foot 1820 is replaced with a foot 1972 and the ground pad 1830 is replaced with a ground pad 1974. The foot 1972 is received within a recess 1976 defined by the ground pad 1974. The foot 1972 and the recess 1976 are both substantially cylindrical to facilitate rotation of the ground pad 1974 relative to the foot 1972. The foot 1972 further defines a receiver 1978 substantially similar to the receiver 1822. The planar alignment device 1890 is coupled to a top surface of the foot 1972. The foot 1972 and/or the planar alignment device 1890 are configured to limit or prevent rotation of the foot 1972 relative to the cylinder rod 1806. By way of example, the aperture 1900 of the planar alignment device 1890 may be sized as a press fit to the cylinder rod 1806.

The actuator assembly 1970 further includes a series of first magnets 1980 and a series of second magnets 1982. The first magnets 1980 are fixedly coupled to the foot 1972. Specifically, the first magnets 1980 are arranged in a circular pattern centered about the center of the foot 1972. The actuator assembly 1970 includes four first magnets 1980 arranged in diametrically opposed pairs. The foot 1972 may define recesses that receive the first magnets 1980 such that the first magnets 1980 are arranged substantially flush with a bottom surface of the foot 1972. The second magnets 1982 are fixedly coupled to the ground pad 1974. Specifically, the second magnets 1982 are arranged in a circular pattern centered about the center of the recess 1956. The circular pattern of the first magnets 1980 and the circular pattern of the second magnets 1982 have the same radius such that the first magnets 1980 align with the second magnets 1982. The actuator assembly 1970 includes two second magnets 1982 arranged in a diametrically opposed pair. The ground pad 1974 may define recesses that receive the second magnets 1982 such that the second magnets 1982 are arranged substantially flush with a top surface of the ground pad 1974.

When aligned, the first magnets 1980 and the second magnets 1982 are configured to attract one another to hold the foot 1972 in place within the recess 1976. The attractive forces between the first magnets 1980 and the second magnets 1982 oppose both (a) movement of the foot 1972 out of the recess 1976 and (b) rotation of the ground pad 1974 relative to the foot 1972. When a threshold torque or a threshold downward force is applied to the ground pad 1974, the attractive forces are overcome, and the ground pad 1974 may move freely relative to the foot 1972. Alternatively, the actuator assembly 1970 may include a retainer (e.g., a flange coupled to the ground pad 1974 that extends along a top surface of the foot 1972) that limits or prevents the risk of the foot 1972 being removed from the recess 1976. As the foot 1972 includes two pairs of diametrically opposed first magnets 1980 and the ground pad 1974 includes two diametrically opposed second magnets 1982, the first magnets 1980 align with the second magnets 1982 in four different orientations of the ground pad 1974, each offset 90 degrees from one another. In each of these orientations, both of the second magnets 1982 align with corresponding first magnets 1980, increasing the threshold torque required to rotate the ground pad 1974 compared to an embodiment where only one second magnet 1982 is aligned with a first magnet 1980. In other embodiments, the actuator assembly 1970 includes more or fewer first magnets 1980 and/or second magnets 1982 that are arranged in various ways, thereby varying the number of orientations in which the first magnets 1980 align with the second magnets 1982.

In operation, the ground pad 1974 may normally be left in the storage orientation. In instances where the ground pad 1974 will not contact an obstacle, the ground pad 1974 may be left in the storage orientation. In instances where the ground pad 1974 requires a different orientation to avoid an obstacle, an operator may apply a torque on the ground pad 1974, breaking the hold of the first magnets 1980 and the second magnets 1982 and facilitating rotation of the ground pad 1974 relative to the foot 1972. The operator may then continue rotating the ground pad 1974 until ground pad 1974 reaches an orientation in which the first magnets 1980 and the second magnets 1982 align. This process may be repeated until the ground pad 1974 is in a desired orientation. When moving the outrigger 1700 back into a storage position, the operator may follow a similar process to move the ground pad 1974 back into the storage orientation.

Figure 54:
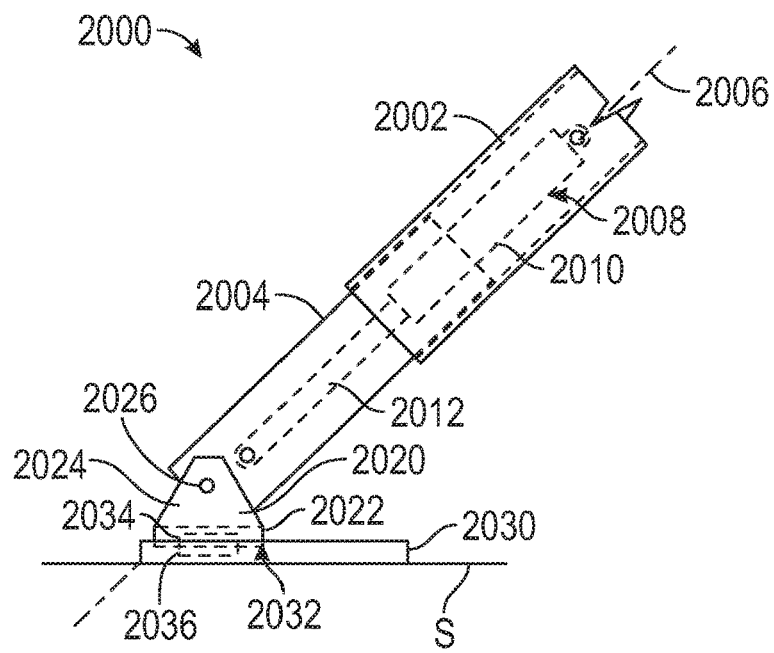
FIG. 54 is a side view of an outrigger, according to yet another exemplary embodiment.

The concept of a ground pad coupled being integrated into an outrigger assembly is usable with other types of outriggers as well. Referring to FIG. 54, an outrigger 2000 is shown. The outrigger 2000 includes a first tubular member, shown as outer telescoping member 2002, and a second tubular member, shown as inner telescoping member 2004. The outer telescoping member 2002 and the inner telescoping member 2004 may have rectangular, circular, or other types of cross sections. The outer telescoping member 2002 is configured to be coupled to a frame of a vehicle (e.g., the frame 12). The outer telescoping member 2002 may be fixedly coupled to the frame 12 (e.g., welded directly to the frame 12). Alternatively, the outer telescoping member 2002 may be coupled to the frame 12 by an actuator assembly (e.g., the first actuator assembly 1702) that selectively moves the outer telescoping member 2002 laterally toward or away from the frame 12. The inner telescoping member 2004 is received within the outer telescoping member 2002 and sized such that the inner telescoping member 2004 is configured to telescope in and out of the outer telescoping member 2002 about an axis of extension 2006. A linear actuator, shown as hydraulic cylinder 2008, is configured to control the extension and retraction of the inner telescoping member 2004. The hydraulic cylinder 2008 may be substantially similar to the hydraulic cylinder 1802. The hydraulic cylinder 2008 includes a cylinder body 2010 that receives a rod 2012. The cylinder body 2010 is coupled to the outer telescoping member 2002, and the rod 2012 is coupled to the inner telescoping member 2004. Accordingly, the inner telescoping member 2004 extends as the hydraulic cylinder 2008 extends.

Figure 55:
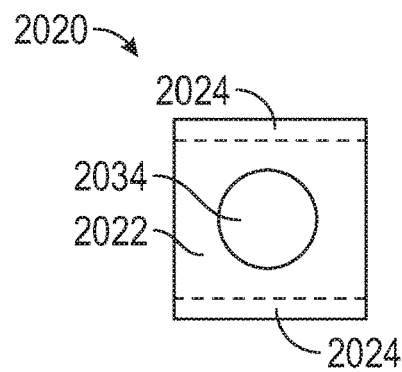
FIG. 55 is a bottom view of a foot of the outrigger of FIG. 54, according to an exemplary embodiment.
Figure 56:
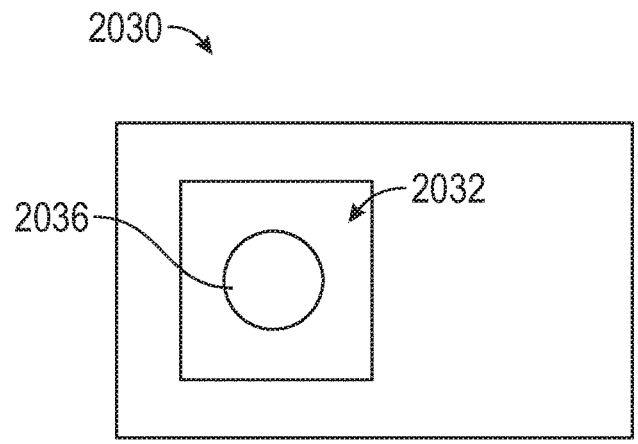
FIG. 56 is a top view of a ground pad of the outrigger of FIG. 54, according to an exemplary embodiment.
Figure 57:
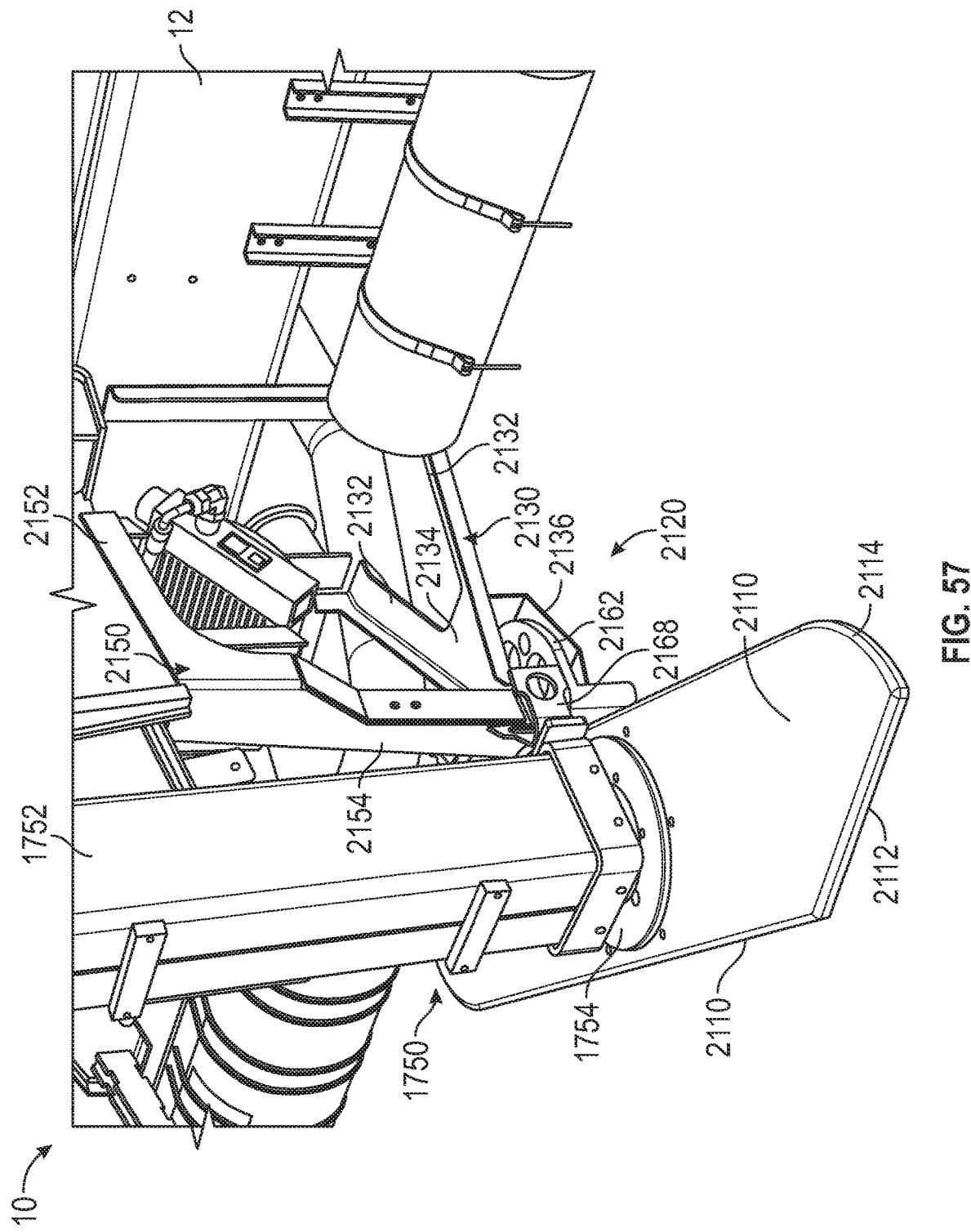
FIGS. 57 and 58 are perspective views of an alignment assembly for an outrigger, according to an exemplary embodiment.
Figure 58:
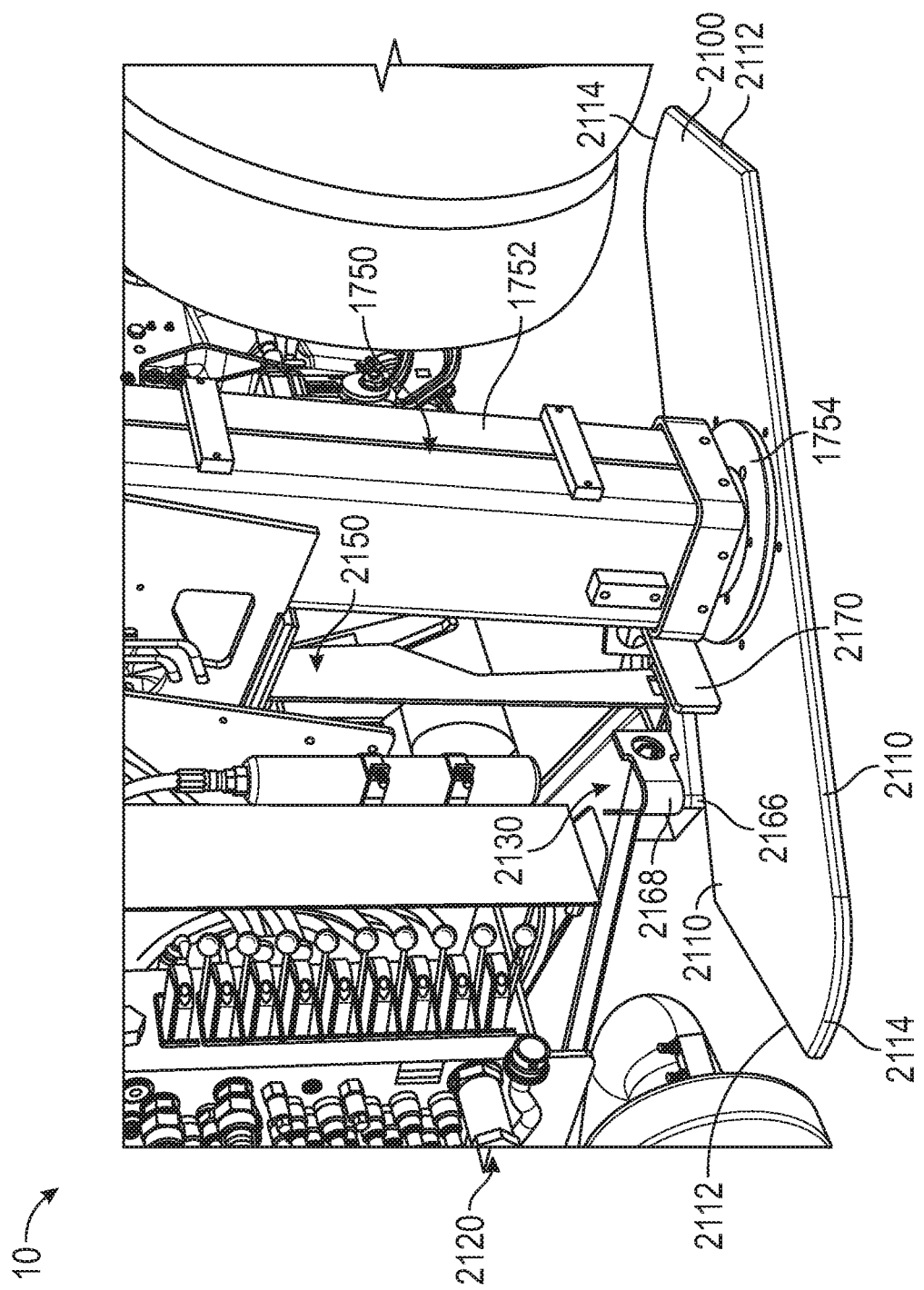

Referring to FIGS. 54-56, a distal end portion of the inner telescoping member 2004 (i.e., an end portion opposite the outer telescoping member 2002) is pivotably coupled to a foot 2020. The foot 2020 includes a base 2022 and a pair of legs 2024 extending upward from the base 2022, receiving the inner telescoping member 2004 therebetween. The base 2022 is shown as square, however, in other embodiments, the base 2022 is otherwise shaped (e.g., circular). A pin 2026 extends through corresponding apertures defined in the legs 2024 and the inner telescoping member 2004, pivotably coupling the foot 2020 to the inner telescoping member 2004. The foot 2020 is configured to pivot relative to the inner telescoping member 2004 about a longitudinal axis extending perpendicular to the axis of extension 2006.

The outrigger 2000 further includes a ground pad 2030 that is configured to engage the support surface S when the hydraulic cylinder 2008 is extended. The ground pad 2030 defines a recess 2032 that is configured to receive the base 2022. The recess 2032 is similarly sized and shaped to the base 2022. Due to the square shape of the base 2022, the ground pad 2030 is limited or prevented from rotating relative to the foot 2020.

The outrigger 2000 further includes a first magnet 2034 and a second magnet 2036. The first magnet 2034 is fixedly coupled to the foot 2020. The foot 2020 may define a recess that receives the first magnet 2034 such that the first magnet 2034 is arranged substantially flush with a bottom surface of the foot 2020. The second magnet 2036 is fixedly coupled to the ground pad 2030. The ground pad 2030 may define a recess that receives the second magnet 2036 such that the second magnet 2036 is arranged substantially flush with a top surface of the ground pad 2030. The first magnet 2034 and the second magnet 2036 are near the center of the base 2022 and the recess 2032, respectively. The first magnet 2034 and the second magnet 2036 are configured to hold the foot 2020 within the recess 2032, and the shape of the recess 2032 limits or prevents rotation of the ground pad 2030 relative to the foot 2020.

In operation, the ground pad 2030 may normally be left in a storage orientation (e.g., the orientation shown in FIG. 54 in which the ground pad 2030 extends minimally laterally outwards). In instances where the ground pad 2030 will not contact an obstacle, the ground pad 2030 may be left in the storage orientation. In instances where the ground pad 2030 requires a different orientation to avoid an obstacle, an operator may apply a downward force onto the ground pad 2030, breaking the hold of the first magnet 2034 and the second magnet 2036 and removing the foot 2020 from the recess 2032. The operator may then reorient the ground pad 2030 into an orientation in which both (a) the ground pad 2030 avoids the obstacle and (b) the base 2022 aligns with the recess 2032. The operator may then insert the foot 2020 into the recess 2032 until the first magnet 2034 and the second magnet 2036 pull the ground pad 2030 back into contact with the foot 2020. When moving the outrigger assemblies back into a storage position, the operator may follow a similar process to move the ground pad 2030 back into the storage orientation.

In some embodiments, portions of the outrigger assemblies described herein are provided as a retrofit kit or upgrade kit used to improve the performance of an existing, conventional stabilizer, such as an outrigger or downrigger. The retrofit kit may be sold as an aftermarket product and may be usable with a variety of different stabilizers on a variety of different vehicles. The stabilizer to be upgraded may include an actuator assembly having a body, a rod extendable relative to the body, and a foot rotatably coupled to the rod (e.g., similar to the cylinder body 1804, the cylinder rod 1806, and the foot 1820, respectively). The retrofit kit may include a ground pad 1830, a upper alignment assembly 1850, a lower alignment assembly 1852, and a planar alignment device 1890. To install the retrofit kit, the foot may first be decoupled from the rod. The upper alignment assembly 1850 may be coupled to the body and lower alignment assembly 1852 and the planar alignment device 1890 may be slid onto the rod. The foot may then be coupled to the rod. The ground pad 1830 may be coupled to the lower alignment assembly 1852, the planar alignment device 1890, and the foot 1820.

It should be understood that the outrigger 1700, the outrigger 2000, and the various actuator assemblies described herein may be used with any type of vehicle that utilizes outriggers or downriggers and are not limited to use with the fire apparatus 10. By way of example, the actuator assembly 1800 may be used with mobile lifts designed to carry operators, materials, and/or equipment, such as boom lifts, scissor lifts, aerial work platforms, vertical mast lifts, telehandlers, and/or mobile cranes. By way of another example, the actuator assembly 1800 may be used with various types of earth moving equipment, such as excavators or backhoes.

Referring to FIGS. 6, 7, 14, and 15, in some embodiments, the track 1704 is oriented such that the axis of extension 1710 extends downward and outward from a longitudinal centerline of the fire apparatus 10. Accordingly, when extending the actuator assemblies 1750 laterally outward to increase the stability of the fire apparatus 10, the actuator assemblies 1750 simultaneously move downward. Depending on the topography of the support surface S, the space between the foot 1754 and the support surface S may be very small when the actuator assemblies 1750 are extended fully laterally outward. Accordingly, ground pad alignment systems that require some vertical extension and/or retraction of the actuator assemblies 1750 to function may not be useful in such scenarios. In such scenarios, it may be desirable to utilize an alignment system that does not require vertical extension of the actuator assemblies 1750 to function and can instead be sued with the actuator assemblies 1750 fully retracted.

Referring to FIGS. 57-62, a ground pad 2100 is configured for use with the actuator assembly 1750. Specifically, the ground pad 2100 is configured to be coupled to the foot 1754. The ground pad 2100 defines a central recess 2102 configured to receive and center the foot 1754 on the ground pad 2100. The foot 1754 may be fastened or otherwise coupled to the ground pad 2100 once the foot 1754 is received within the central recess 2102. The foot 1754 and/or the ground pad 2100 may be rotatable such that the ground pad 2100 is free to rotate about a vertical axis.

Figure 59:
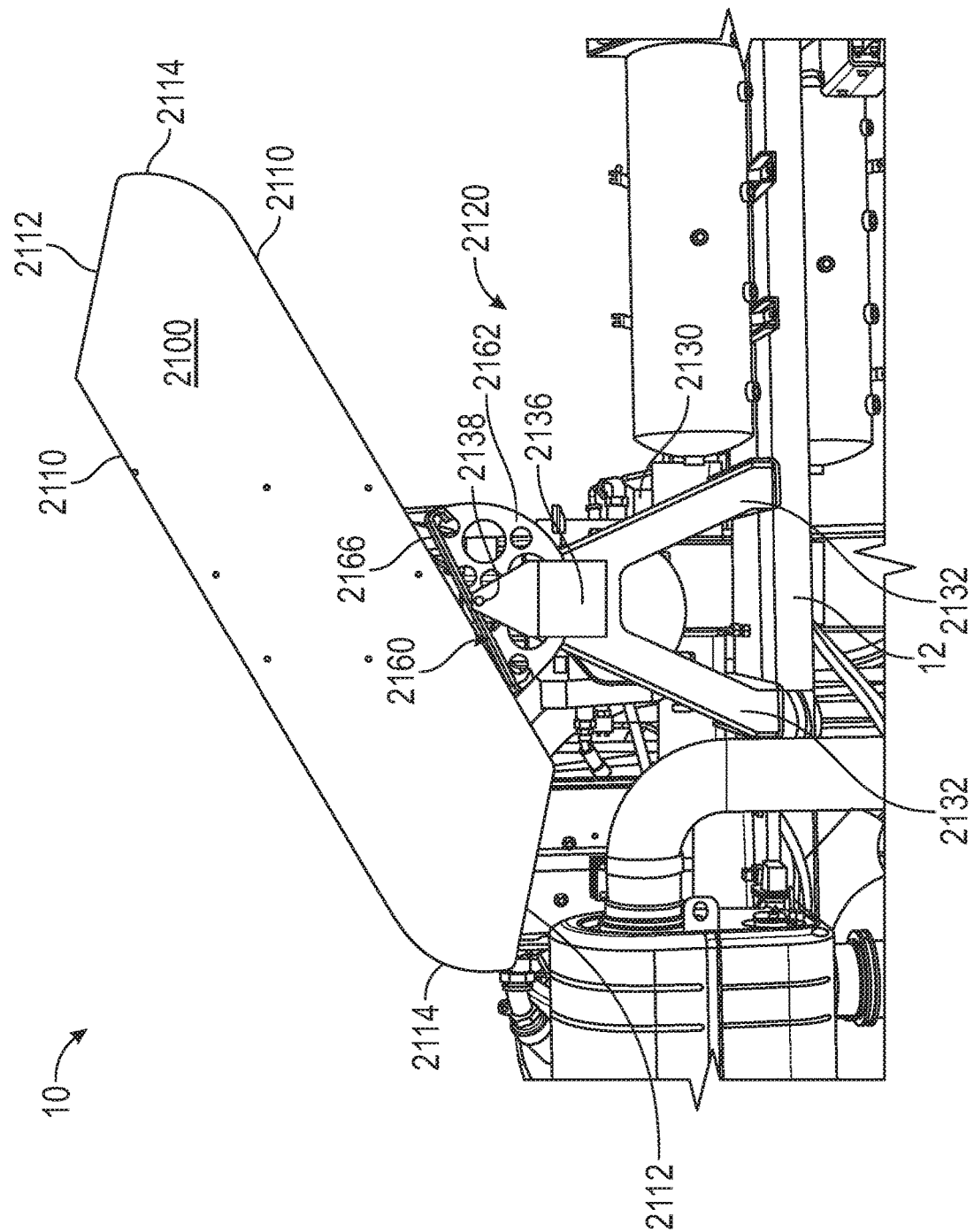
FIG. 59 is a bottom view of the alignment assembly of FIG. 57.
Figure 60:
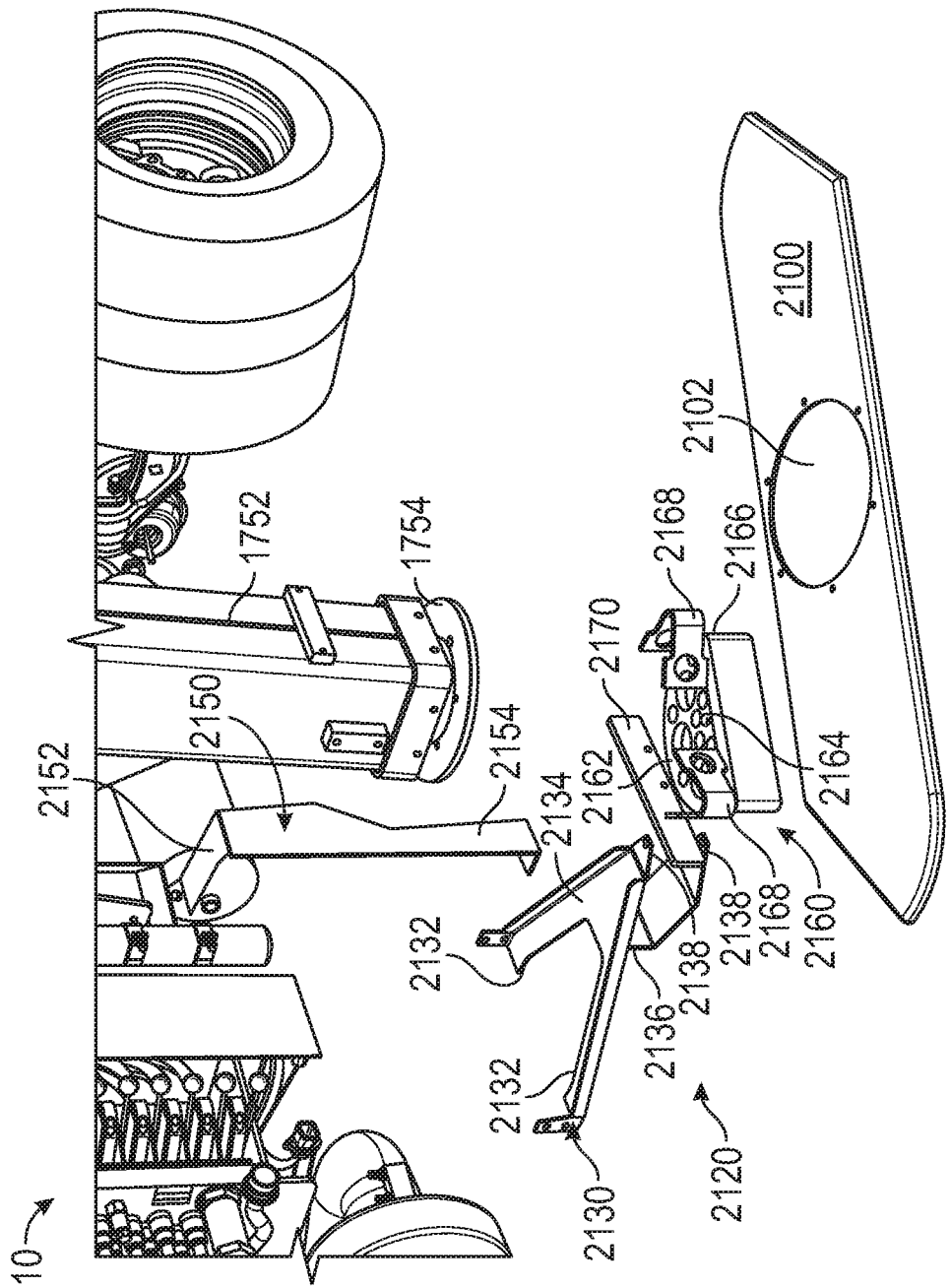
FIGS. 60 and 61 are exploded views of the alignment assembly of FIG. 57.
Figure 61:
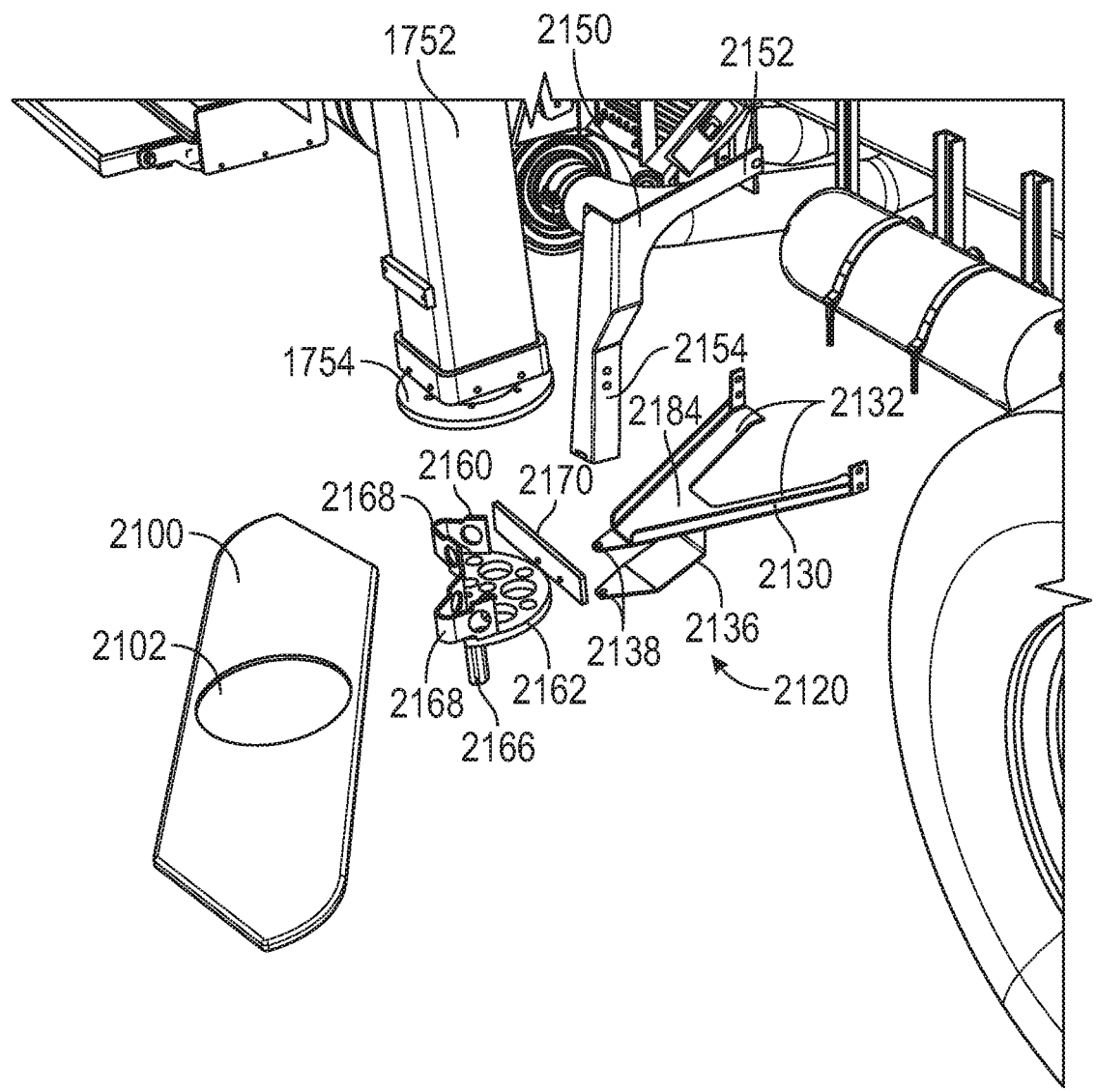
Figure 62:
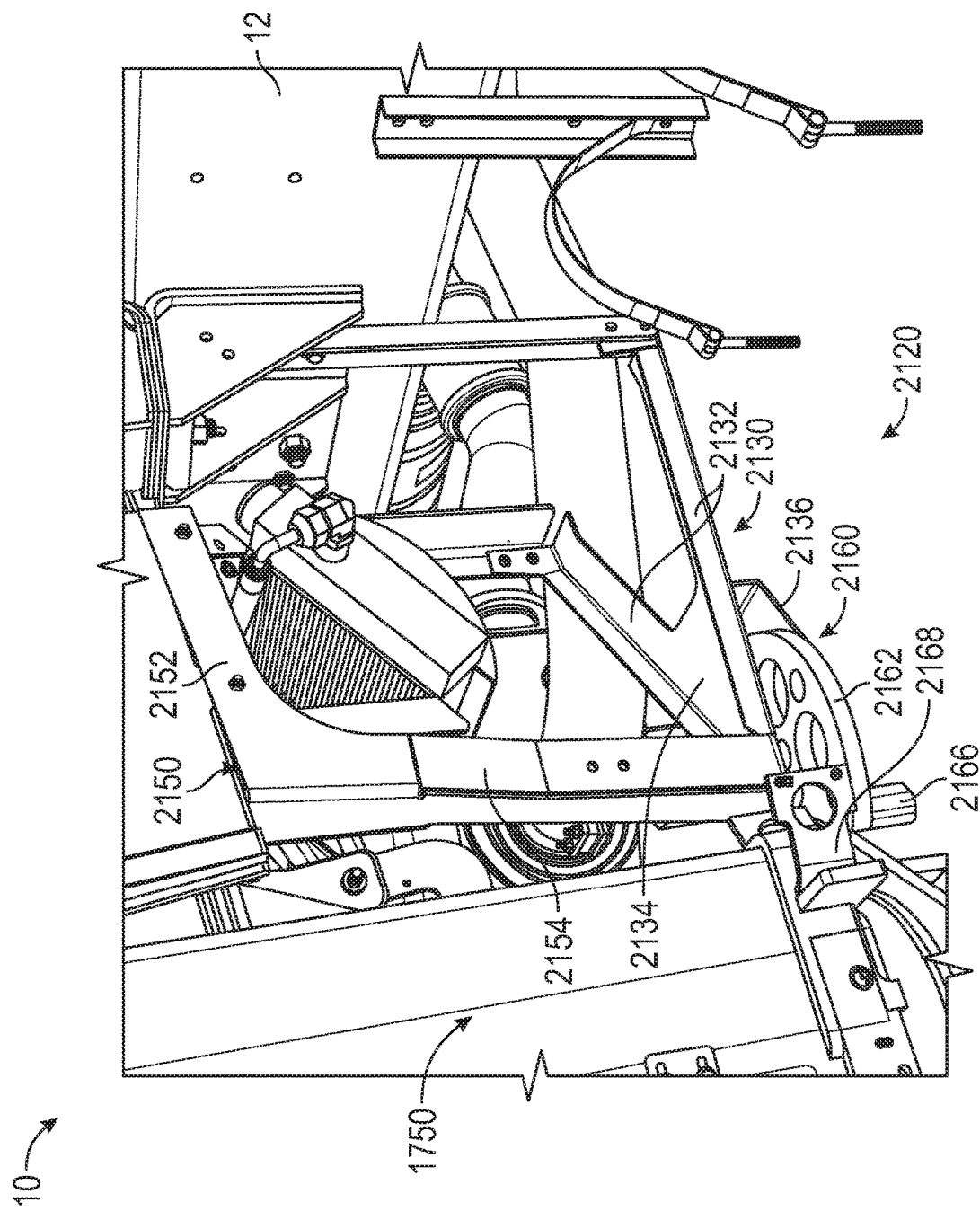
FIG. 62 is another perspective view of the alignment assembly of FIG. 57.

Referring to FIG. 59, the ground pad 2100 is elongate and has a series of different edge profiles (e.g., as viewed from above or below). The ground pad 2100 includes a first pair of edges, shown as elongated straight edges 2110. The elongated straight edges 2110 are substantially straight, substantially parallel to one another, and extend along the majority of the length of the ground pad 2100. A second pair of edges, shown as angled edges 2112, extend toward a lengthwise centerline of the ground pad 2100 from the elongated straight edges 2110. The angled edges 2112 are substantially straight and extend substantially parallel to one another. The angled edges 2112 are significantly shorter than the elongated straight edges 2110. A third pair of edges, shown as rounded edges 2114, extend between the elongated straight edges 2110 and the angled edges 2112. The rounded edges 2114 are convex. The angled edges 2112 and the rounded edges 2114 are arranged such that, at no point along these edges, can a line that passes through the center of the ground pad 2100 (e.g., the axis about which the ground pad 2100 and the foot 1754 rotate) be perpendicular to the edge. This arrangement facilitates alignment of the ground pad 2100, as a force pushing squarely against these edges will cause the ground pad 2100 to rotate.

Referring to FIGS. 57-62, an alignment assembly or alignment device, shown as alignment assembly 2120, is configured for use with the actuator assembly 1750 and the ground pad 2100. Specifically, the alignment assembly 2120 is configured to align the elongated straight edges 2110 substantially parallel with the frame 12. The alignment assembly 2120 includes a first frame assembly, shown as disc support 2130. The disc support 2130 includes a pair of legs 2132 coupled to the frame 12 and extending toward one another. The legs 2132 meet and form a top plate 2134. The legs 2132 and the top plate 2134 may be integrally formed. A flange, shown as bottom plate 2136, is fixedly coupled to the top plate 2134 and extends below the top plate 2134. The top plate 2134 and the bottom plate 2136 define a pair of vertically-aligned apertures, shown as pivot apertures 2138. The pivot apertures 2138 are substantially aligned along a vertical axis and configured to receive a pin, shaft, or fastener.

A second frame assembly, shown as upright support 2150, is configured to strengthen the disc support 2130. The upright support 2150 includes a first, top, or horizontal member, shown as horizontal member 2152. The horizontal member 2152 extends substantially horizontally and is coupled to the frame 12 (e.g., directly, indirectly, etc.). A second, bottom, or vertical member, shown as vertical member 2154, is fixedly coupled to the horizontal member 2152. The vertical member 2154 extends downward from the horizontal member 2152 and couples to the top plate 2134.

Together, the disc support 2130 and the upright support 2150 are configured to support a deflector, rotator, redirector, or torque transfer device, shown as cam wheel 2160. Specifically, the cam wheel 2160 is received between the top plate 2134 and the bottom plate 2136. The cam wheel 2160 includes a main body, shown as disc 2162. The disc 2162 may be semicircular or otherwise shaped. Near the center of the disc 2162, the disc 2162 defines an aperture, shown as pivot aperture 2164. The pivot aperture 2164 is substantially aligned with the pivot apertures 2138 and configured to receive a pin, shaft, or fastener to pivotally couple the cam wheel 2160 to the disc support 2130. Specifically, the cam wheel 2160 is configured to rotate about a substantially vertical axis.

The cam wheel 2160 includes a first alignment member (e.g., a plate) or ground pad interface plate, shown as interface plate 2166, fixedly coupled to the disc 2162. The interface plate 2166 extends below the disc 2162 and into the plane of the ground pad 2100 when the actuator assembly 1750 is fully retracted. The interface plate 2166 has a substantially flat surface facing the ground pad 2100. The cam wheel 2160 further includes a pair of second alignment members, flanges, or protrusions, shown as rockers 2168, fixedly coupled to the disc 2162. The rockers 2168 extend above the disc 2162 and above the plane of the ground pad 2100. A plate, slider, or interface, shown as bearing plate 2170, is coupled to the actuator receiver 1752 and faces the rockers 2168. The bearing plate 2170 is substantially flat and configured to slide relative to rockers 2168. The bearing plate 2170 and the rockers 2168 lie in substantially the same plane.

During operation, the cam wheel 2160 is configured to return the ground pad 2100 to a storage orientation. Specifically, the elongated straight edges 2110 are substantially parallel to the frame 12 in the storage orientation. The storage orientation reduces the overall width of the fire apparatus 10 relative to other orientations of the ground pad 2100. To return the ground pad 2100 to the storage orientation, the actuator assembly 1750 is fully retracted. By fully retracting the actuator assembly 1750, the ground pad 2100 is brought into a predetermined vertical position. Subsequently, the actuator assembly 1702 is retracted.

As the ground pad 2100 moves laterally toward the frame 12, one of the edges of the ground pad 2100 comes into contact with the interface plate 2166. The cam wheel 2160 may rotate until the interface plate 2166 squarely engages the edge. If the edge of the ground pad 2100 that contacts the interface plate 2166 is one of the angled edges 2112 or one of the rounded edges 2114, the interface plate 2166 will force the ground pad 2100 to rotate until the interface plate 2166 is in contact with one of the elongated straight edges 2110. Further retraction of the actuator assemblies 1702 will cause the interface plate 2166 and the elongated straight edge 2110 to become substantially parallel with one another, limiting (e.g., preventing) relative rotation between the interface plate 2166 and the ground pad 2100.

While the orientation of the ground pad 2100 may be constrained relative to the interface plate 2166 at this point, the cam wheel 2160 may still have some potential to rotate. To constrain the cam wheel 2160 and the ground pad 2100 relative to the frame 12, the actuator assembly 1702 is retracted until one of the rockers 2168 engages the bearing plate 2170. This imparts a moment on the cam wheel 2160, causing the cam wheel 2160 to rotate until both rockers 2168 engage the bearing plate 2170. This moment is transferred to the ground pad 2100 through the interface plate 2166. At this point, the ground pad 2100 is held in the storage orientation until the actuator assembly 1702 and/or the actuator assembly 1750 are again extended.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A stabilizer for a vehicle, the stabilizer comprising:
an actuator assembly configured to be coupled to a chassis of the vehicle, wherein the actuator assembly is selectively repositionable between an extended position and a retracted position to reconfigure the stabilizer between a lifting configuration and a storage configuration;
a ground pad coupled to the actuator assembly, the ground pad having a bottom surface configured to engage a support surface below the chassis, wherein the ground pad is rotatable relative to the actuator assembly about a substantially vertical axis that intersects the ground pad; and
an alignment member configured to be coupled to the chassis, wherein the alignment member is configured to selectively limit rotation of the ground pad about the substantially vertical axis,
wherein when the stabilizer is in the lifting configuration, the bottom surface of the ground pad engages the support surface, and when the stabilizer is in the storage configuration, the ground pad is not in contact with the support surface; and
wherein the actuator assembly is configured to move a surface of the ground pad into engagement with the alignment member when the actuator assembly is moved toward the retracted position, and wherein the surface of the ground pad is shaped to cause rotation of the ground pad about the substantially vertical axis and relative to the chassis when the surface engages the alignment member.

2. The stabilizer of claim 1, wherein the alignment member is configured to limit rotation of the ground pad relative to the actuator assembly based on a position of the actuator assembly.

3. The stabilizer of claim 2, wherein the stabilizer is selectively reconfigurable into a partially extended configuration between the storage configuration and the lifting configuration, wherein the ground pad can be freely rotated when the stabilizer is in the partially extended configuration, and wherein the alignment member is configured to limit rotation of the ground pad when the stabilizer is in the storage configuration.

4. The stabilizer of claim 3, wherein the actuator assembly moves the ground pad laterally relative to the chassis when moved from the extended position to the retracted position.

5. The stabilizer of claim 1, wherein the alignment member is configured to rotate the ground pad toward a storage orientation in response to the actuator assembly moving toward the retracted position.

6. The stabilizer of claim 1, wherein the actuator assembly is a first actuator assembly, the extended position is a first extended position, and the retracted position is a first retracted position, further comprising a second actuator assembly coupled to the first actuator assembly, wherein the second actuator assembly is selectively repositionable between a second extended position and a second retracted position to reconfigure the stabilizer between the storage configuration and the lifting configuration, and wherein the first actuator assembly is configured to move the second actuator assembly relative to the chassis when moved between the first extended position and the first retracted position.

7. The stabilizer of claim 1, wherein the ground pad is selectively rotatable relative to the actuator assembly between a first orientation and a second orientation, and wherein the bottom surface of the ground pad is oriented substantially parallel to a horizontal plane in both the first orientation and the second orientation.

8. The stabilizer of claim 7, wherein the first orientation of the ground pad is rotationally offset relative to the second orientation of the ground pad about the substantially vertical axis, and wherein a distance between the substantially vertical axis and an outer perimeter of the ground pad varies along the outer perimeter.

9. A vehicle comprising:
a chassis;
a plurality of tractive assemblies coupled to the chassis; and
a stabilizer, comprising:
an actuator assembly coupled to the chassis, wherein the actuator assembly is selectively repositionable between an extended position and a retracted position to reconfigure the stabilizer between a lifting configuration and a storage configuration;
a ground pad coupled to the actuator assembly, the ground pad having a bottom surface configured to engage a support surface below the chassis, wherein the ground pad is selectively rotatable relative to the chassis about a substantially vertical axis; and
an alignment member coupled to the chassis and configured to cause rotation of the ground pad about the substantially vertical axis in response to the actuator assembly moving from the extended position to the retracted position,
wherein the actuator assembly is configured to move a surface of the ground pad into engagement with the alignment member when the actuator assembly is moved toward the retracted position, and wherein the surface of the ground pad is shaped to cause rotation of the ground pad relative to the chassis when the surface engages the alignment member.

10. The vehicle of claim 9, wherein the alignment member is configured to selectively limit rotation of the ground pad relative to the chassis based on a position of the actuator assembly.

11. The vehicle of claim 9, wherein the actuator assembly is a first actuator assembly, wherein the stabilizer further comprises a second actuator assembly coupling the ground pad to the first actuator assembly, wherein the first actuator assembly is configured to move the ground pad laterally relative to the chassis, and wherein the second actuator assembly is configured to move the ground pad vertically relative to the chassis.

12. The vehicle of claim 9, wherein the substantially vertical axis intersects the ground pad.

* * * * *